(12) United States Patent
Inoue

(10) Patent No.: US 6,559,595 B1
(45) Date of Patent: May 6, 2003

(54) ACTIVE MATRIX LIQUID CRYSTAL DISPLAY DEVICE AND ITS MANUFACTURING METHOD

(75) Inventor: Satoshi Inoue, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/818,964

(22) Filed: Mar. 28, 2001

Related U.S. Application Data

(62) Division of application No. 08/862,144, filed on May 22, 1997, now Pat. No. 6,275,273.

(51) Int. Cl.[7] .............................................. H05B 33/00
(52) U.S. Cl. ...................................... 313/506; 349/110
(58) Field of Search ................................. 313/504, 506, 313/503, 512; 349/42, 43, 54, 110

(56) References Cited

U.S. PATENT DOCUMENTS

| | | | |
|---|---|---|---|
| 4,904,056 A | 2/1990 | Castleberry | 349/110 |
| 5,327,001 A | 7/1994 | Wakai et al. | 349/110 |
| 5,708,485 A * | 1/1998 | Sato et al. | 349/42 |
| 5,790,220 A | 8/1998 | Sakamoto et al. | 349/110 |
| 5,977,562 A * | 11/1999 | Hirakata et al. | 257/72 |

* cited by examiner

Primary Examiner—Vip Patel
Assistant Examiner—Joseph Williams
(74) Attorney, Agent, or Firm—Oliff & Berridge, PLC

(57) ABSTRACT

An active matrix liquid crystal display device includes a thin film transistor substrate having a thin film transistor, an opposing substrate having an opposing electrode, a liquid crystal element interposed between the thin film transistor substrate and the opposing substrate, a protective film layer, a pixel electrode and a black matrix. By forming a protective film layer between the pixel electrodes and the black matrix, there is no negative influence on image quality even when the specific resistance of the black matrix is low. Also, Na contamination, and the like, from the dyes, and the like, used for the light-blocking material can be prevented. At this time, by etching the protective film layer using the pattern of the black matrix as a mask, one sheet is enough for the masks necessary for elimination of the protective film on the pixel electrode section. By this, it becomes possible to stop the increase of number of processes to a minimum. Furthermore, by performing etching of the protective film layer by anisotropic etching, rubbing defects caused by the processed shape of the black matrix can also be prevented.

15 Claims, 70 Drawing Sheets

ACTIVE MATRIX LIQUID CRYSTAL DISPLAY DEVICE AND ITS MANUFACTURING METHOD

This is a Divisional Continuation-in-Part of application Ser. No. 08/862,144 filed May 22, 1997, now U.S. Pat. No. 6,275,273. The entire disclosure of the prior application(s) is hereby incorporated by reference herein in its entirety.

BACKGROUND OF THE INVENTION

1. Field of Invention

The present invention relates to an active matrix liquid crystal display device using a thin film transistor and its manufacturing method.

2. Description of Related Art

From the past, there have been known active matrix liquid crystal display devices and liquid crystal panels of a structure having interposed twisted nematic (TN) liquid crystal or ferroelectric liquid crystal, used as an optically modulated material, between a thin film transistor substrate and an opposing substrate. In these liquid crystal display devices, a thin film transistor (TFT) and a pixel electrode selectively driven by the TFT are provided on a thin film-transistor substrate, and the opposing electrode is provided on the opposing substrate.

FIG. 1 shows one example of a conventional liquid crystal display device. The size of the thin film transistor in the drawings is shown larger than its actual size in order to clearly represent the structure of the thin film transistor. Liquid crystal 103 is interposed between thin film transistor substrate 101 and opposing substrate 102. Opposing substrate 102 are formed a black matrix 104 composed of a light-blocking film such as chrome, and red, green, and blue color filter sections 105, 106, 107 formed by gelatin dyed with red, green, and blue color. On these are formed a protective insulation film 108 and an opposing electrode 109 composed of a transparent conductive film. Meanwhile, on the inside of thin film transistor substrate 101 are formed a thin film transistor 115 constituted by a gate insulation film 110, gate line 111, source line 112, interlevel insulator film 113, and contact hole 114, and a selectively driven pixel electrode 116 composed of a transparent conductive film. Alignment films 117 and 118 are formed on pixel electrode 116 and opposing electrode 109, and they are applied with rubbing processing. On source line 112 is formed an insulation film 119 composed of a protective film, and this insulation film is removed on the top of pixel electrode 116, opening a window. Thus, source line 112 can be protected. In addition, the insulation film helps prevent the reduction of voltage applied to the liquid crystal. The distance between pixel electrode and opposing electrode is generally called a cell gap, and it is a parameter that greatly controls the optical properties. This cell gap deviates more easily as the liquid crystal panel becomes larger. Therefore, uniformity is maintained in a large liquid crystal panel by using a gap member (spacer) 120.

However, there are four major problems in the above-mentioned previous technology, as described below.

First, when matching a thin film transistor and an opposing substrate, it is necessary to take a large margin for alignment of the pixel electrodes formed on the thin film transistor and the color filters and black matrix formed on the opposing substrate. This greatly reduces the aperture size. It is understood that this problem can be improved somewhat by forming the black matrix on the thin film transistor substrate, and various companies are conducting examinations. For example, in Japanese Laid-Open Patent No. 2-207222, a method is disclosed whereby a light-blocking film for becoming a black matrix is formed on a thin film transistor substrate.

When forming a black matrix on the side of the thin film transistor substrate, a resist having a light-blocking material added, such as black resist is considered to be the most superior material to compose the black matrix. However, use of a resist presents three further problems.

Problem 1-1 is possible contamination from Na, and the like. There are known black resists having mixed red, green, and blue dyes, but these resists contain a large quantity of impurities. Thus, there is a concern of degradation of thin film transistor properties due to Na contamination.

Problem 1-2 is alignment defects. The relationship between film thickness and the light-shielding property in a black resist such as that mentioned above is shown in FIG. 2. In order to obtain a more sufficient light-blocking property (light transmissivity less than or equal to 1.5%, OD value greater than or equal to 1.8), it is clear that at least a film thickness 1.5 $\mu$m or more becomes necessary. In this case, rubbing can no longer be performed well due to the difference of levels, and alignment defects of the liquid crystal are caused following the pattern of the black matrix.

On the other hand, specific resistance is also important. When trying to form a pattern so as to cross the space between pixel electrodes, it is required that the specific resistance be sufficiently high in relation to the liquid crystal. Also, the light-blocking property and specific resistance are reciprocal, and establishing both of them is difficult. The specific resistance in the above-mentioned black resist depends also on the film thickness, but it is about $10^8$ $\Omega$cm, and it does not meet the specification.

Alignment defects may also be caused by the processed shape of the black resist. An example of that is shown in FIG. 3. The black resist has an overhang structure, and the part under the overhang (point A of FIG. 3) is in a location where rubbing is difficult to perform.

Problem 1-3 is the increase of number of processes. Even the number of masks necessarily on the thin film transistor substrate increases by one sheet.

The second major problem of the previous technology is the degradation of properties of a thin film transistor due to ultraviolet light. FIG. 4 is a comparison of the properties of a thin film transistor before and after ultraviolet irradiation. It is clear that the properties are degraded due to irradiation by ultraviolet radiation as shown in FIG. 4. Ultraviolet-hardened adhesives are used widely when matching a thin film transistor substrate and an opposing substrate. Also, because the thin film transistors are also exposed to ultraviolet radiation during actual use, ultraviolet radiation has become a great obstacle against assuring reliability of thin film transistors.

The third major problem is the use of spacers. If the process of scattering spacers can be omitted, an increase in throughput and a reduction of cost can be realized.

The fourth major problem is the etching of anti-static wiring. Although it was not explained in the above-mentioned previous technology, in order to protect yield from static electricity when forming a thin film transistor substrate, a method is used whereby the gate line patterns are first shorted, and then separated. Nevertheless, this is creates an undesired increase in the number of processes.

SUMMARY OF THE INVENTION

The present invention provides an approach to solve the technical problems described above by making it possible to form a black matrix on the side of a thin film transistor substrate without increasing the number of processes or creating alignment defects. Similarly, it becomes possible to perform etching of anti-static wiring without increasing the number of processes. Furthermore, degradation of properties of the thin film transistor due to ultraviolet radiation is prevented, and it becomes possible to omit the process of scattering spacers.

In order to solve the above-mentioned problems, the invention includes a protective film layer formed between the pixel electrode and the black matrix. By this, a low specific resistance of the black matrix no longer causes an influence in image quality.

The invention also includes an ultraviolet light-blocking layer formed on the thin film transistor for preventing the degradation of properties.

The invention also provides the black matrix serving as an ultraviolet light-blocking layer. Consequently, it becomes possible to prevent the increase in the number of processes due to forming an ultraviolet light-blocking layer.

The invention further provides the black matrix serving as a spacer. By this, the process of scattering spacers can be omitted, resulting in an improvement of throughput and reduction of cost.

The invention further provides that the pattern composed of the black matrix and the insulation film formed on its upper layer serve as a spacer.

The invention also provides that the pattern composed of the black matrix and the protective film formed on its lower layer serves as a spacer.

The invention provides a black matrix on the pixel electrode with anti-static wiring formed on its lower part separated using this pattern as a mask. Anti-static wiring is generally provided outside the display area. Meanwhile, a black matrix is for blocking light in the perimeter of the pixel electrodes. Consequently, even when the pattern of a black matrix is formed for the purpose of separating the anti-static wiring, it does not cause a bad influence in the display properties. By this invention, it has become possible to reduce the number of processes and the cost.

The invention also provides a pattern of protective film formed on the pixel electrode, and anti-static wiring formed on the lower part that is separated using this pattern as a mask. Anti-static wiring is generally provided outside the display area. Meanwhile, the pattern of a protective film is for opening windows on the pixel electrodes. Consequently, even when the pattern of a protective film is formed for the purpose of separating the anti-static wiring, it does not cause a bad influence in the display properties. Therefore, by this invention, it is possible to reduce the number of processes and the cost.

The invention further provides a protective film layer formed on the pixel electrode, a black matrix further provided on an upper layer of the liquid crystal display device, the protective film layer etched to be self-aligning in relation to the pattern of said black matrix, and anti-static wiring formed on the lower part separated using this pattern as a mask. Anti-static wiring is generally provided outside the display area. Meanwhile, the patterns of a black matrix and a protective film are for blocking light in the perimeter of the pixel electrodes and for opening windows on the pixel electrodes. Consequently, even when the pattern of a black matrix is formed for the purpose of separating the anti-static wiring, it does not cause a bad influence in the display properties. By this invention, it has become possible to reduce the number of processes and the cost.

The invention also provides anti-static wiring partially exposed when opening a contact hole for connecting a source line or pixel electrode. The anti-static wiring is separated using the pattern of the black matrix provided on the pixel electrode as a mask. Anti-static wiring is commonly performed with gate lines, but in addition to this, an interlevel insulator film is formed. Consequently, before separation, a part of the anti-static wiring should be partially exposed when opening contact holes so that it can be separated without undue trouble. Also, anti-static wiring is generally provided outside the display area. Meanwhile, a black matrix is provided for blocking light in the perimeter of the pixel electrodes. Consequently, even when the pattern of a black matrix is formed for the purpose of separating the anti-static wiring, the protective film does not cause a bad influence in the display properties. By this invention, it has become possible to reduce the number of processes and the cost.

The invention also provides anti-static wiring partially exposed when opening a contact hole for connecting a source line or pixel electrode. Again, the anti-static wiring is separated using the pattern of the protective film provided on the pixel electrode as a mask. Anti-static wiring is commonly performed with gate lines, but in addition to this, an interlevel insulator film is formed. Consequently, before separation, a part of the anti-static wiring should be partially exposed when opening contact holes so that it can be separated without undue trouble. Also, anti-static wiring is generally provided outside the display area. Meanwhile, the pattern of a protective film is provided for opening a window the pixel electrodes. Consequently, even when the pattern of a protective film is formed for the purpose of separating the anti-static wiring, the protective film does not cause a bad influence in the display properties. By this invention, it has become possible to reduce the number of processes and the cost.

The invention also provides anti-static wiring partially exposed when opening a contact hole for connecting a source line or pixel electrode, where the anti-static wiring is separated using the pattern of the protective film provided on the pixel electrode as a mask. Anti-static wiring is commonly performed with gate lines, but in addition to this, an interlevel insulator film is formed. Consequently, before separation, a part of the anti-static wiring should be partially exposed when opening contact holes so that it can be separated without undue trouble. Also, anti-static wiring is generally provided outside the display area. Meanwhile, the patterns of a black matrix and a protective film are provided for blocking light in the perimeter of the pixel electrodes and for opening a window the pixel electrodes. Consequently, even when the pattern of a protective film is formed for the purpose of separating the anti-static wiring, the protective film does not cause a bad influence in the display properties. By this invention, it has become possible to reduce the number of processes and the cost.

It is a further object of the invention to form a protective film layer between the pixel electrodes and the black matrix without any influence on image quality even when the specific resistance of the black matrix is low. Also, Na contamination, and the like, from the dyes, and the like, used for the light-blocking material can be revented.

By etching the protective film layer on the lower part of the liquid crystal display device using the pattern of the black matrix as a mask, one sheet is sufficient for the masks necessary for elimination of the protective film on the pixel electrode section. By this, it becomes possible to maintain a minimum number of processes. Furthermore, by performing etching of the protective film layer by anisotropic etching, rubbing defects caused by the processed shape of the black matrix can also be prevented.

By also forming the pattern of a black matrix also in the seal section, the pattern of the black matrix becomes a part of the protective film of the seal section, and thus improves reliability. Also, even when etching the protective film on the lower layer of the liquid crystal display device with the pattern of the black matrix as a mask, exposing of the wiring can be prevented.

By forming the pattern of the black matrix as a guide when matching the opposing substrate with the thin film transistor substrate, there are no occurrences of irregularities when matching the opposing substrate, even when the black matrix material covers substantially the entirety of the thin film transistor substrate.

By also forming the pattern of a black matrix on the driver section in an active matrix liquid crystal display device having a driver installed inside, the pattern of the black matrix becomes a part of the driver section, thus improving reliability. Also, etching the protective film on the lower layer of the liquid crystal display device with the pattern of the black matrix as a mask prevents the exposing of the wiring.

In addition, forming an ultraviolet light-blocking layer on the thin film transistor substrate prevents the degradation of the properties of the substrate. Thus, it becomes possible to prevent an increase in the number of processes because the black matrix serves as the ultraviolet light-blocking layer.

Further, because the protective films formed above and below the black matrix serve as spacers, the process of scattering spacers can be omitted, which increases throughput and reduces cost.

Also, by forming the pattern doubling as spacers only in the direction of the source lines, injection of the liquid crystal becomes easy. In this case, since the gate lines or the capacitance lines serve as the black matrix in the direction of the gate lines, it is no longer necessary to separately form a black matrix in the direction of the gate lines, and thus respective increases of cost avoided. Also, since the liquid crystal injection port is formed in the direction of the source lines, injection of the liquid crystal can be performed in an even shorter time and with good yield.

Further, by forming the pattern doubling as spacers only in the direction of the gate lines, the gate lines or the capacitance lines serve as the black matrix in the direction of the source lines. Therefore, it is no longer necessary to separately form a black matrix in the direction of the source lines. Also, since the liquid crystal injection port is formed in the direction of the gate lines, injection of the liquid crystal can be performed in an even shorter time and with good yield.

In addition, by separating the anti-static wiring formed on the lower part of the liquid crystal display device using the pattern from the black matrix or protective film or the pattern of the contact hole as a mask, it becomes possible to reduce the number of processes and the cost.

Other objects, advantages and salient features of the invention will become apparent to one skilled in the art from reading the detailed description taken in conjunction with the annexed drawings which disclose preferred embodiments.

DETAILED DESCRIPTION OF PREFERRED EMBODIMENTS

Figure 1:
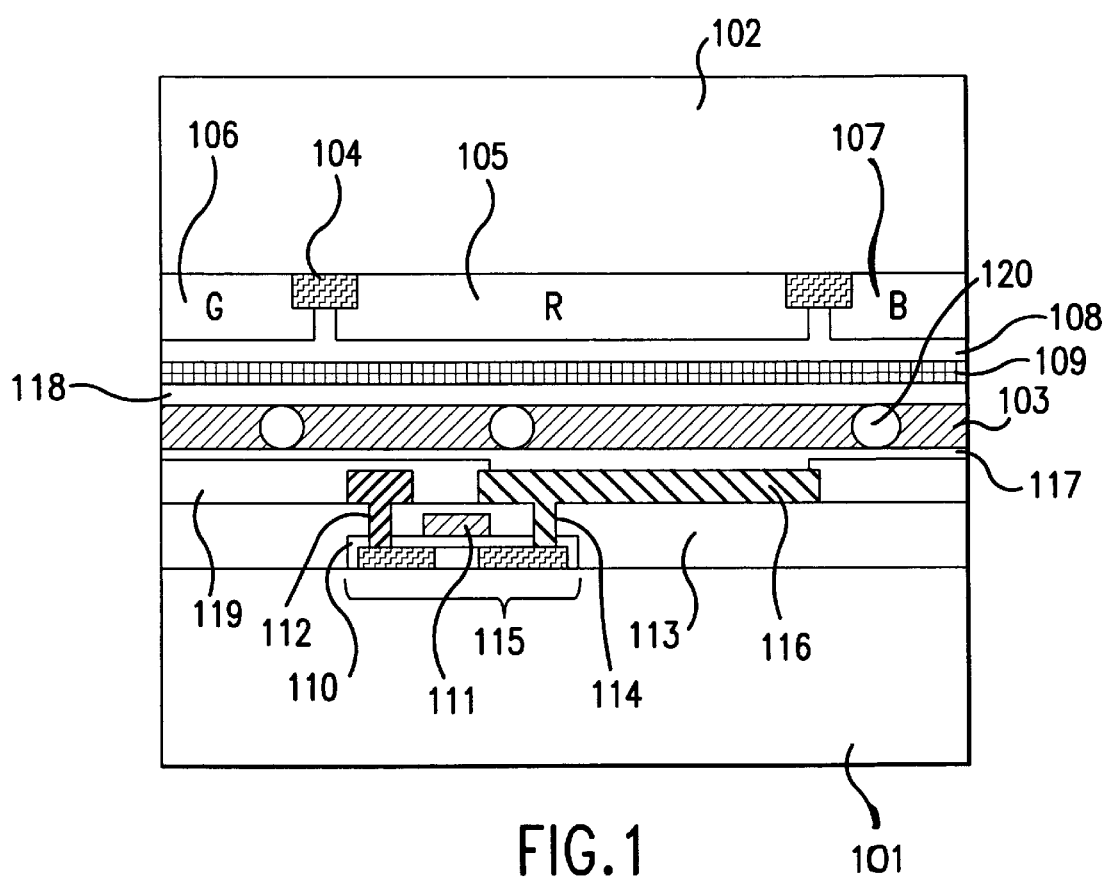
FIG. 1 is a drawing showing one example of a conventional liquid crystal display device.
Figure 2:
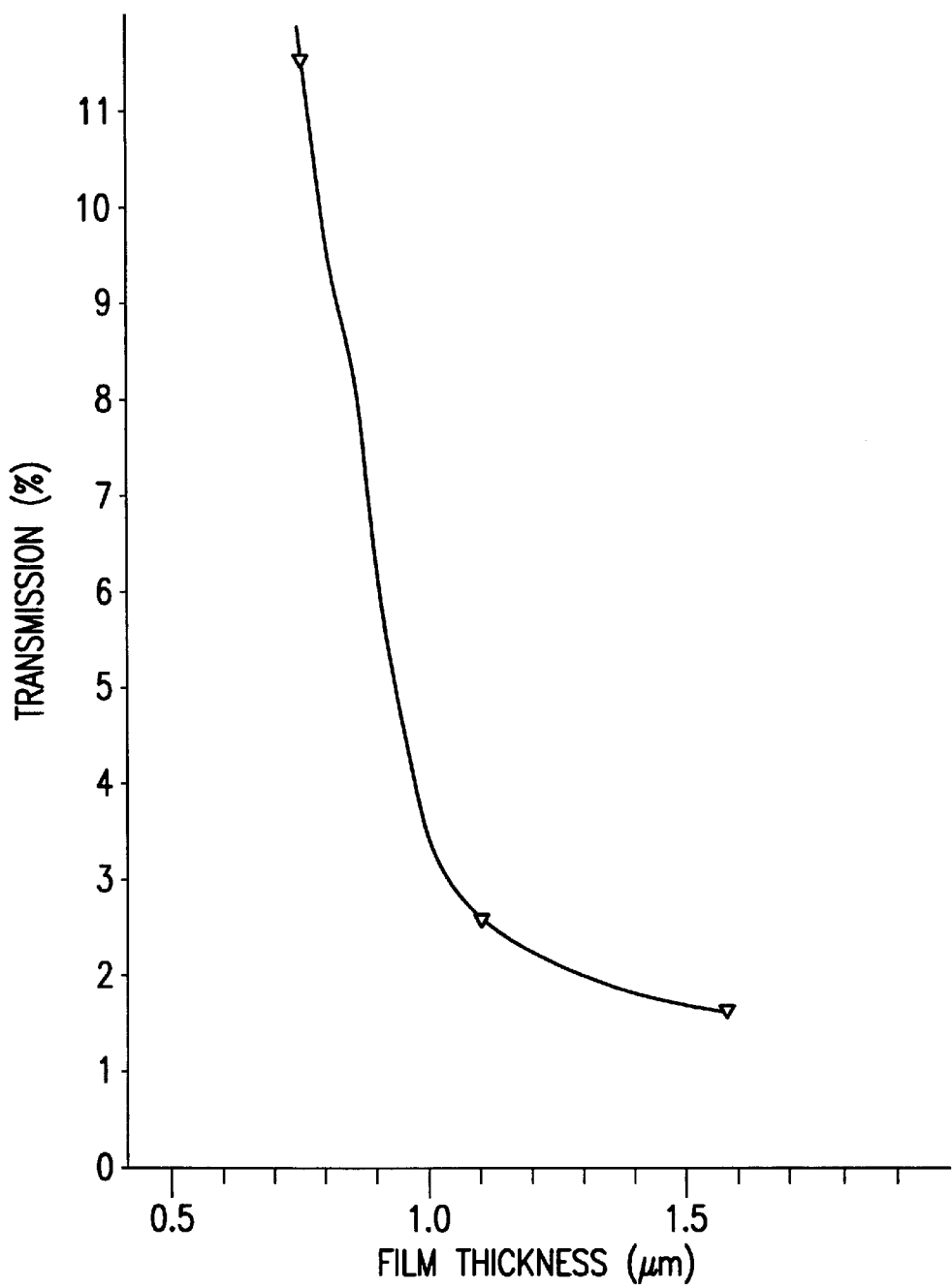
FIG. 2 is a drawing showing the relationship between film thickness and light-blocking properties in a black resist having added red, green, and blue dyes as light-blocking materials.

Embodiments of the present invention are explained in detail below using the drawings. The size of the thin film transistors is represented larger in the drawings than the actual size in order to more clearly represent the structure of a thin film transistor.

Embodiment 1

Figure 5:
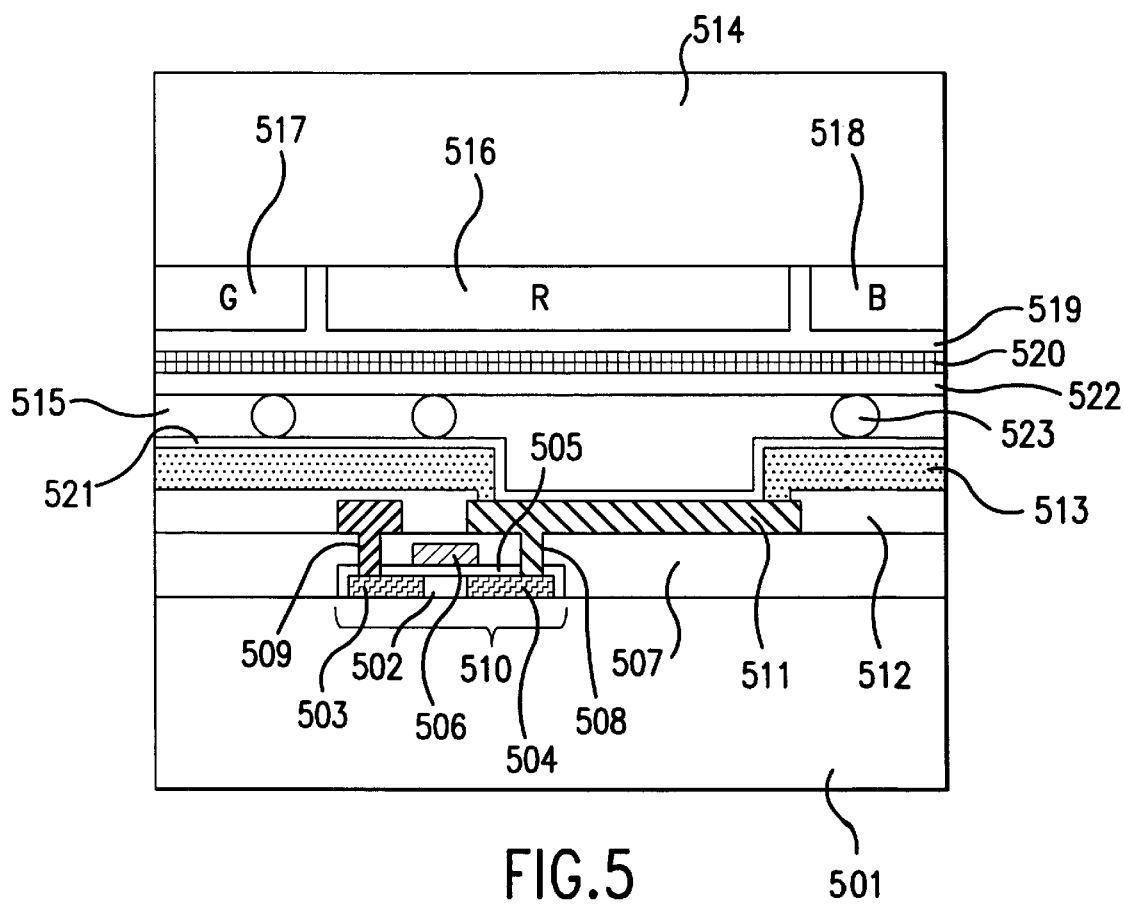
FIG. 5 is a cross-sectional view showing the structure of the first embodiment of the present invention.

The first embodiment of the present invention is explained in detail using FIG. 5 and is a structural cross-sectional view showing one example of an active matrix liquid crystal display device having a protective film layer provided over the pixel electrode of the thin film transistor substrate, and further having a black matrix formed over this upper layer.

A thin film transistor 510 is provided on the inner side of thin film transistor substrate 501, having a channel region 502, source region 503, drain region 504, gate insulation film 505, gate line 506, interlevel insulator film 507, contact hole 508, and source line 509, and the like, and a pixel electrode 511 driven by the thin film transistor 510 and having a transparent conductive film arranged in a stripe, mosaic, triangle or like pattern.

An insulation film 512 is formed as a protective film over source line 509. However, this insulation film is removed on the top of pixel electrode 511 and a window is opened. Thus, source line 509 can be protected, and the voltage applied to the liquid crystal is not reduced due to the existence of the insulation film 512.

Furthermore, a black matrix 513 is formed over protective film 512 in a shape that blocks the light in the gap between pixel electrodes 511.

As a black matrix material, a dye distributed black resist, or the like, for example, having a red, green, blue or like dye distributed in the resist, can be used. There is no particular limitation for the dye that is distributed in the resist. However, perylene, anthraquinone, dianthraquinone, azo, diazo, quinacridone, anthracene, and like dyes can be used, for example, for the red dye. Also, halogenated phthalocyanine and like dyes can be used, for example, as a green dye. Also, metallic phthalocyanine, indanthrone, indophenol, and like dyes can be used, for example, as a blue dye. In addition to these, purple, yellow, cyanine, and magenta dyes, and the like, can be used in combination.

The black resist of the present embodiment may be positive or negative. As a negative resist, for example, solvents (ethyl-3-ethoxypropionate, methoxypropyl acetate, cyclohexane, 3-methoxybutyl acetate, and the like), resins (methacrylic resin, and the like), and monomers (polyfunctional acrylic monomers, and the like) can be considered.

A thickness of about 1.3 $\mu$m–2.0 $\mu$m, for example, can be considered for the film thickness of the black matrix.

In the past, this black matrix was formed by a light-blocking film made of chrome, or the like. Therefore, there were such problems as cracks being caused by stress, and glare being caused by reflection of the chrome, and the like. As opposed to this, in the present embodiment, because the black matrix is formed by an insulation film having a dye added, there is no occurrence of such cracking and glare.

Also, according to the present embodiment, because there is no parasitic capacitance between the pixel electrode and the gate line, degradation of image quality, and the like, can be prevented.

Thin film transistor substrate 501 is matched with opposing substrate 514, and liquid crystal 515 is interposed between them. Red, green, and blue color filter sections 516, 517, and 518 are formed on opposing substrate 514 by gelatin dyed with red, green, and blue color. In addition to gelatin, casein, fish glue, polyvinyl alcohol, polyvinyl providone, polyvinyl alcohol, polyimide, polyamide, polyurea, polyurethane, polycinnamic acid, acrylic resin, and their derivatives, and the like, can be used as a dyeing medium. Also, acidic dyes and reactive dyes, and the like, can be used as a dye solution.

A red dye solution can be made from, for example, mealing red RS (manufactured by Nippon Kayaku), acetic acid and water. A green dye solution can be made from, for example, blue (manufactured by Hoechst), yellow MR (manufactured by Sumitomo Chemical), acetic acid and water. A blue dye solution can be made from, for example, cyanine 6B (manufactured by Nippon Kayaku), acetic acid and water.

Of course, the dye solutions are not limited to these examples. There are various methods of forming a colored layer (color filter) by dyeing method. Generally, a red colored layer is formed, for example, by patterning a dyeing medium by light exposure and developing, and then soaking in a red dye solution. Blue and green colored layers are also formed similarly.

A protective insulation film 519 and opposing electrodes 520 composed of a transparent conductive film are formed on these color filter sections 516–518.

Orientation films 521 and 522 are formed on pixel electrodes 511 and on opposing electrodes 520 applied with rubbing processing. The distance between the pixel electrode and the opposing electrode is generally called a cell gap, and it is a parameter that greatly controls the optical properties of a liquid crystal display device. This cell gap deviates more easily as the liquid crystal panel becomes larger. Therefore, uniformity is maintained in a large liquid crystal panel by using a gap material (spacer) 523.

According to the present embodiment, by forming a protective film layer 519 between the pixel electrodes 511 and the black matrix 513, the image quality is no longer influenced even when the specific resistance of the black matrix is low. Also, when using a dye distribution black resist as the black matrix material, the protective film layer can prevent Na contamination, and the like from dye.

Embodiment 2

Figure 6:
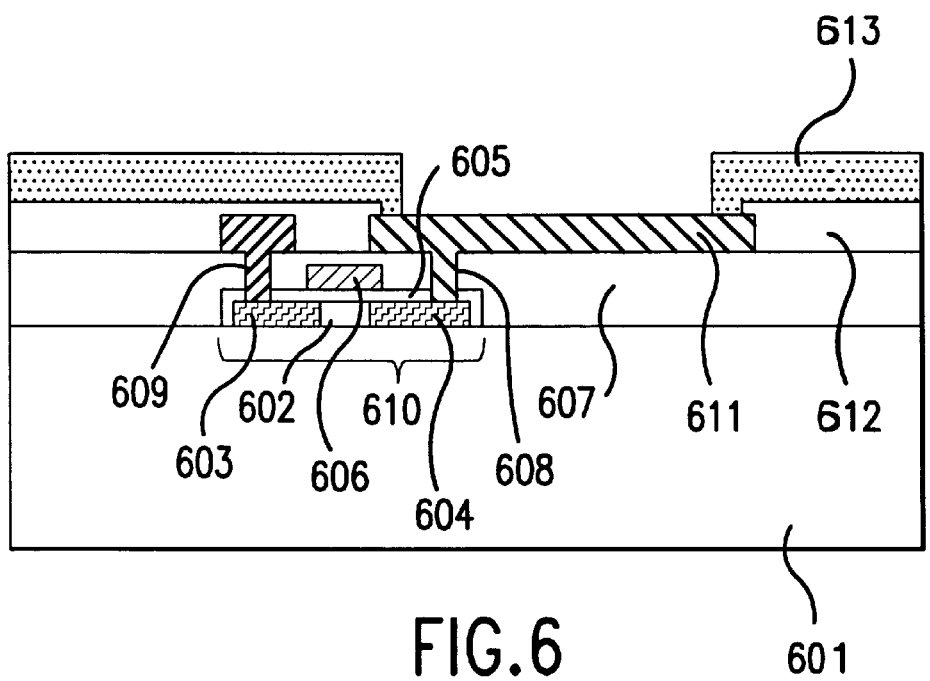
FIG. 6 is a cross-sectional view showing the structure of the second embodiment of the present invention.

The second embodiment of the present invention is explained in detail using FIG. 6 and shows an example of an active matrix liquid crystal display device having a protective film layer formed over the pixel electrodes of the thin film transistor substrate, with a black matrix provided over the protective film layer, in the same manner as the first embodiment. The difference with the first embodiment is in the point that a black resist, or the like, using at least carbon as the light-blocking material is used for the black matrix material.

In FIG. 6, a cross-sectional view only of the thin film transistor substrate is shown, and the drawing of the opposing substrate or liquid crystal element portion is omitted. Over the inner side of thin film transistor substrate 601 are provided a thin film transistor 610, having a channel region 602, source region 603, drain region 604, gate insulation film 605, gate line 606, interlevel insulator film 607, contact hole 608, and source line 609, and the like, and a pixel electrode 611 driven by the thin film transistor 610 and having a transparent conductive film arranged in a stripe, mosaic, triangle or like pattern. An insulation film 612 is formed as a protective film over source line 609. However, this insulation film is removed on the top of pixel electrode 611 and a window is opened. Thus, source line 609 can be protected, and reduction of voltage applied to the liquid crystal due to the existence of this insulation film can be prevented. Furthermore, a black matrix 613 is formed over protective film 612 in a shape that blocks the light in the gap between pixel electrodes 611.

As a black matrix material, for example, a dye distributed black resist, or the like, having a red, green, blue or like dye distributed in the resist, and further having carbon added, can be used. Because the dyes distributed in the resist are already explained in Embodiment 1 in regard to solvents, and the like, they are omitted here.

Because a black resist having carbon added is superior in light-blocking properties, the film thickness of the black matrix can be made thinner, for example, it can be made as a thin film as thin as 0.5 $\mu$m. Consequently, the alignment defects discussed above can be reduced to a great extent.

Up to the present, black resists having carbon added had a defect that the specific resistance was extremely low, as low as 106 $\Omega$cm. However, according to the present embodiment, this defect has been overcome by forming a protective film layer between the pixel electrodes and the black matrix. Also, Na contamination, and the like, from the dye, and the like, can be prevented by the protective film layer.

For the amount of carbon added in the black resist, the optimal value of protection differs for each panel without straying from the main principle of the present invention. However, generally an amount greater than or equal to 50% by weight, for example, in regard to the light-blocking elements within the black resist, is desirable. An amount greater than or equal to 80% by weight is more desirable, and 100% by weight is ideal.

Embodiment 3

Figure 7:
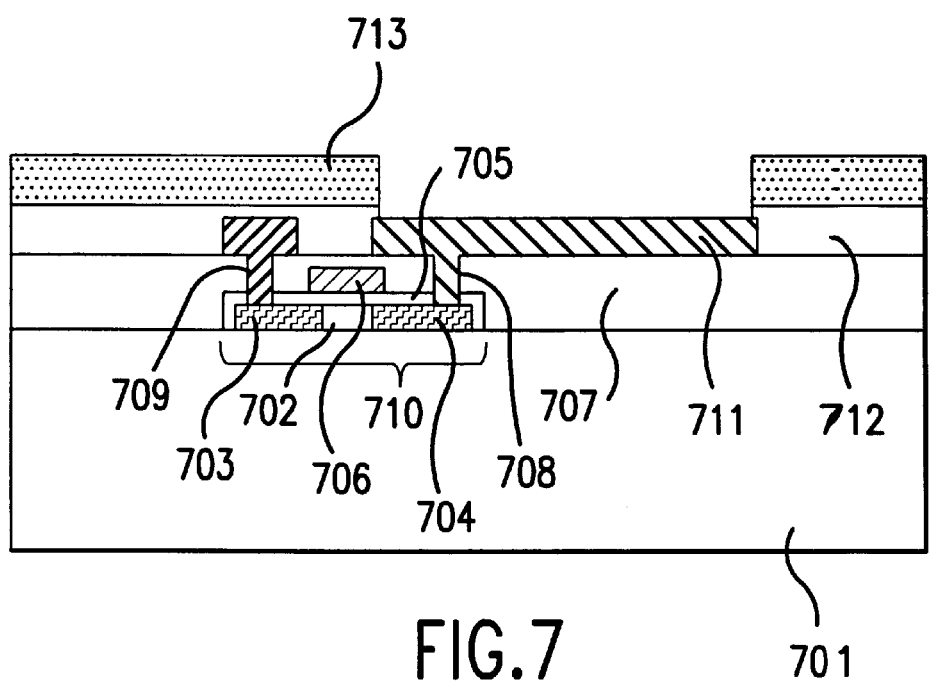
FIG. 7 is a cross-sectional view showing the structure of the third embodiment of the present invention.

The third embodiment of the present invention is explained in detail using FIG. 7 and shows an example of an active matrix liquid crystal display device having a protective film layer formed over the pixel electrodes of the thin film transistor substrate with a black matrix provided over the protective film layer, in the same manner as the first embodiment. The difference with the first embodiment is in the point that the protective film layer is etched so as to be self-aligning in relation to the pattern of the black matrix.

In FIG. 7, a cross-sectional view only of the thin film transistor substrate is shown, and the drawing of the opposing substrate or liquid crystal element portion is omitted. Over the inner side of thin film transistor substrate 701 are provided a thin film transistor 710, consisting of a channel region 702, source region 703, drain region 704, gate insulation film 705, gate line 706, interlevel insulator film 707, contact hole 708, and source line 709, and the like, and a pixel electrode 711 driven by the thin film transistor, and having a transparent conductive film arranged in a stripe, mosaic, triangle or like pattern. An insulation film 712 is formed over source line 709 as a protective film. However, this insulation film is removed on the top of pixel electrode 711 and a window is opened. Thus, source line 709 can be protected, and the reduction of voltage applied to the liquid crystal due to the existence of this insulation film can be prevented. Furthermore, a black matrix 713 is formed on protective film 712 in a shape that blocks the light in the gap between pixel electrodes 711.

The protective film 712 here is etched so as to be self-aligning in relation to the pattern of black matrix 713. Until the present, the patterns of protective film 712 and black matrix 713 were formed separately, causing an increase in the number of processes and an increase of costs. However, by the present embodiment, it has become possible to reduce the number of masks by one sheet.

As a black matrix material, for example, a dye distributed black resist, or the like, having a red, green, blue or like dye distributed in the resist, and one further having carbon added to these, can be used. Because the dyes distributed in the resist are already explained in Embodiment 1 and Embodiment 2 in regard to solvents, and the like, they are omitted here.

Embodiment 4

Figure 8:
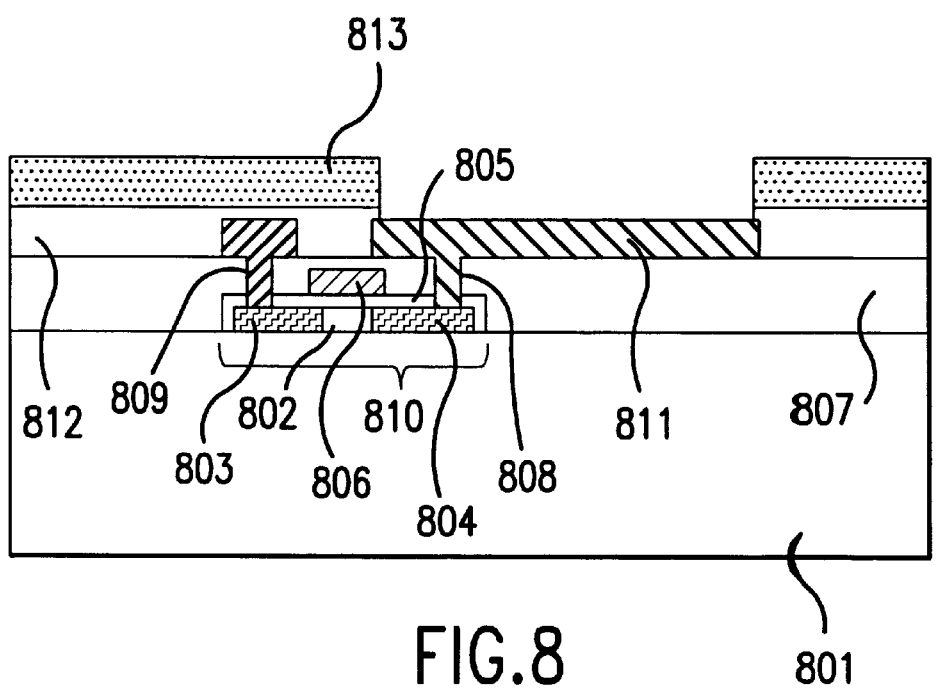
FIG. 8 is a cross-sectional view showing the structure of the fourth embodiment of the present invention.

The fourth embodiment of the present invention is explained in detail using FIG. 8 and shows an example of an active matrix liquid crystal display device having a protective film layer formed over the pixel electrodes of the thin film transistor substrate with a black matrix provided over the protective film layer. The protective film layer is etched to be self-aligning with the pattern of the black matrix, in the same manner as in the third embodiment. The difference between the third and fourth embodiments is in the point that the etching of the protective film layer is performed by an anisotropic etching method.

In FIG. 8, a cross-sectional view only of the thin film transistor substrate is shown, and the drawing of the opposing substrate or liquid crystal element portion is omitted. Over the inner side of thin film transistor substrate 801 are provided a thin film transistor 810, consisting of a channel region 802, source region 803, drain region 804, gate insulation film 805, gate line 806, interlevel insulator film 807, contact hole 808, and source line 809, and the like, and a pixel electrode 811 driven by the thin film transistor, and having a transparent conductive film arranged in a stripe, mosaic, triangle or like pattern. An insulation film 812 is formed as a protective film over source line 809. However, this insulation film is removed on the top of pixel electrode 811 and a window is opened. Thus, source line 809 can be protected, and any reduction in the voltage applied to the liquid crystal due to the existence of this insulation film can be prevented. Furthermore, a black matrix 813 is formed over protective film 812 in a shape that blocks the light in the gap between pixel electrodes 811.

The protective film 812 is etched, for example, by RIE using CHF3 gas, and the like, to be self-aligning with the pattern of black matrix 813. Until the present, the patterns of protective film 812 and black matrix 813 were formed separately, causing an increase in the number of processes and an increase of costs. However, by the present embodiment, it has become possible to reduce the number of masks by one sheet.

Figure 3:
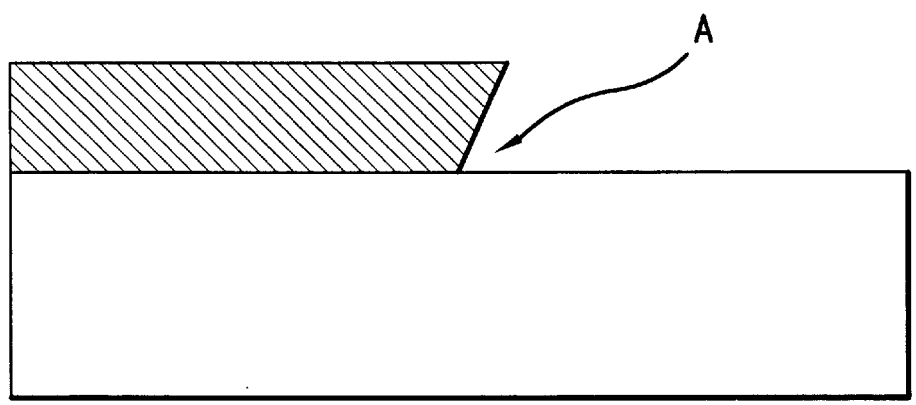
FIG. 3 is a drawing showing one example of the processed shape of a black resist.
Figure 4:
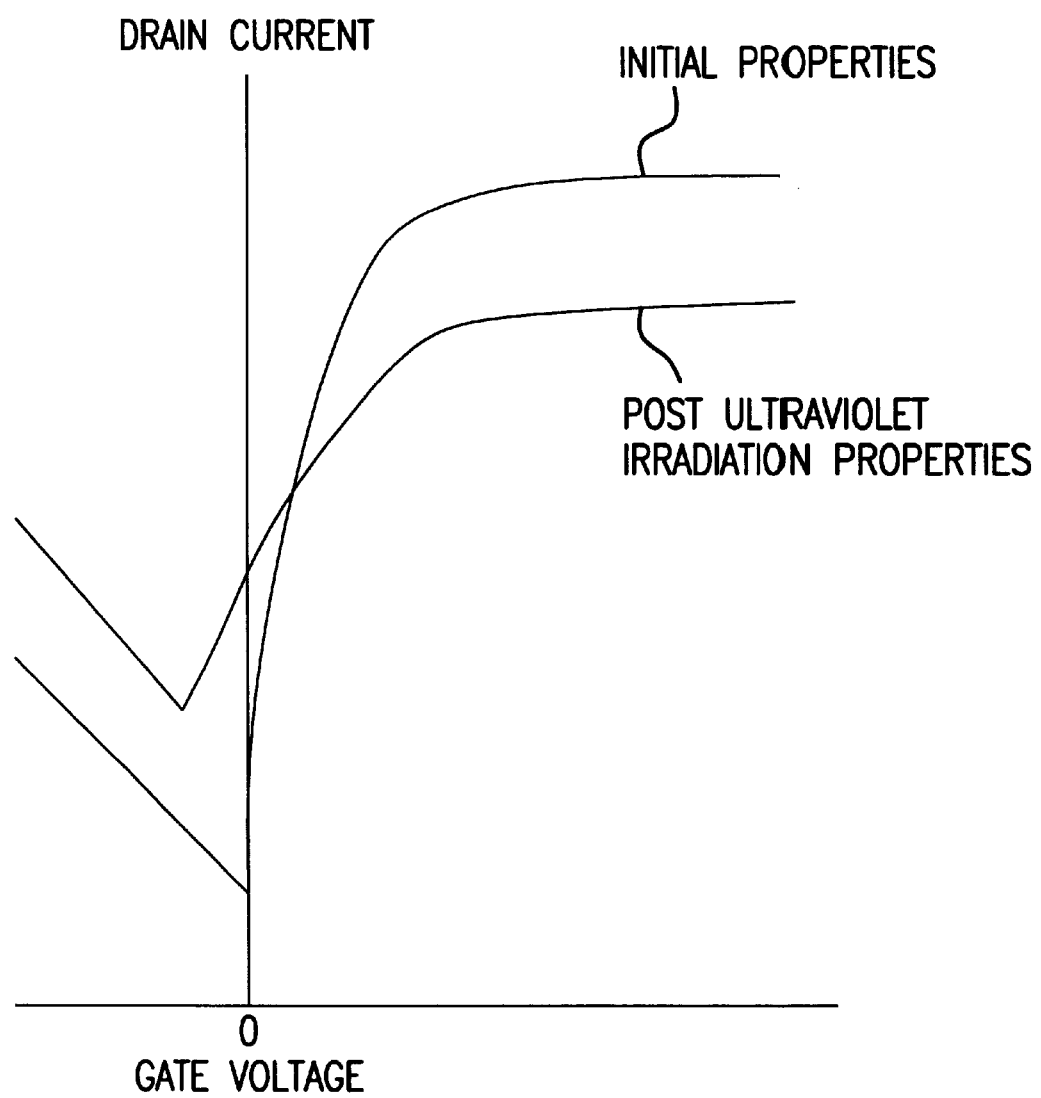
FIG. 4 is a drawing having compared the properties of a thin film transistor before and after ultraviolet irradiation.
Figure 9:
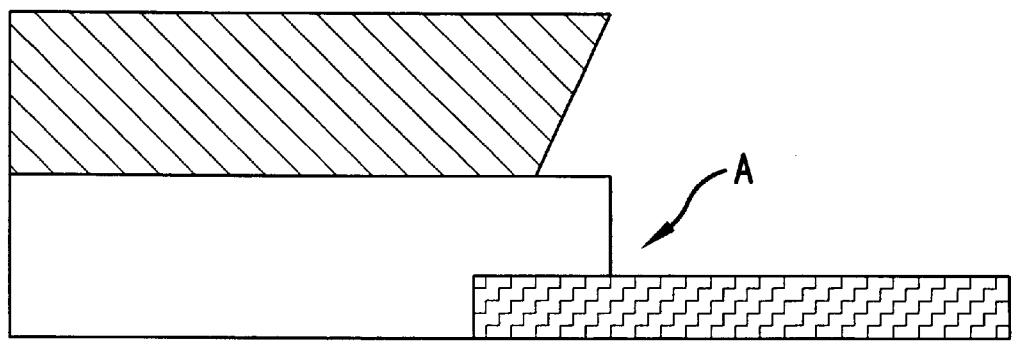
FIG. 9 is a drawing showing one example of the processed shape of a black resist in the fourth embodiment of the present invention.

Furthermore, the cross-sectional structure of the perimeter portion of the black resist when using the present invention is shown in FIG. 9. However, because the portion at point A of FIG. 9 is not in an overhang structure as shown in FIG. 3, rubbing defects tend not to be caused. Thus, alignment defects can be reduced, and yield can be greatly improved.

In the present embodiment, RIE using CHF3 was proposed as a method of anisotropic etching, but the main principle of the present invention is not compromised when using an etching gas other than CHF3. Also, even if an etching method other than RIE is used, for example, ion mixing method, or the like, the main principle of the present invention is not compromised.

Embodiment 5

Figure 10:
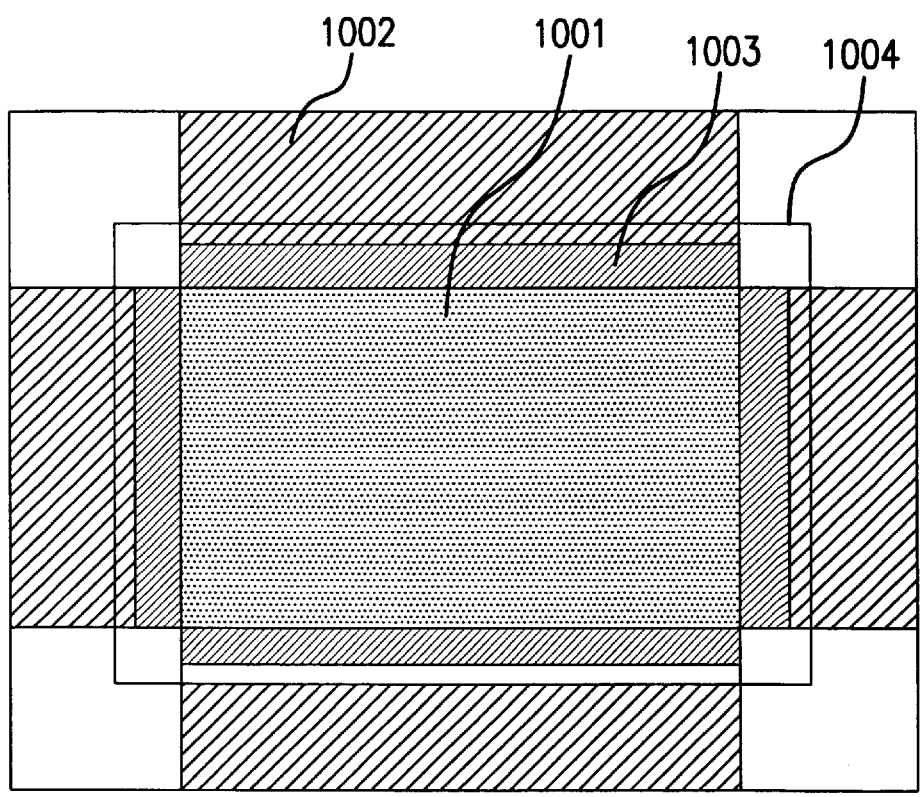
FIG. 10 is a plain view showing the structure of the fifth embodiment of the present invention.

The fifth embodiment of the present invention is explained in detail using FIG. 10 and shows an example of an active matrix liquid crystal display device having the pattern of a black matrix provided over the seal section.

FIG. 10 is a plain view of the thin film transistor substrate. Generally speaking, it can be divided into a display region 1001, a terminal section 1002, and a seal section 1003. In the past, a black matrix on the thin film transistor substrate was formed only in the display region. By making the black matrix cover at least the seal section as well, the pattern of the black matrix 1004 becomes a part of the protective film of the seal section, and it contributes to the improvement of reliability. Also, there is no exposing of the wiring across the seal section even when the protective film is etched as a mask on the lower layer with the pattern of the black matrix.

Embodiment 6

Figure 11:
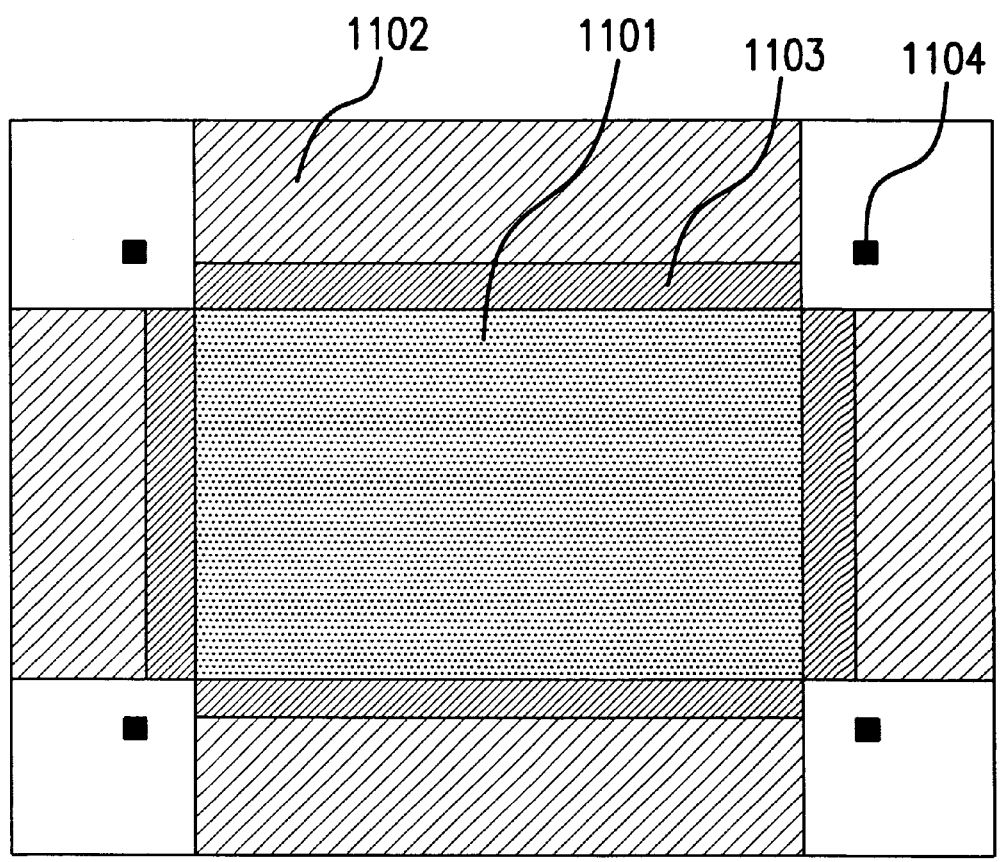
FIG. 11 is a plain view showing the structure of the sixth embodiment of the present invention.

The sixth embodiment of the present invention is explained in detail using FIG. 11 and shows an example of an active matrix liquid crystal display device wherein the pattern of the black matrix is a guide when matching the thin film transistor substrate and the opposing substrate.

FIG. 11 is a plain view of the thin film transistor substrate. It can be divided into a display region 1101, a terminal section 1102, and a seal section 1103. By forming a black matrix on the thin film transistor substrate, such that the pattern of the black matrix covers the entirety of the panel, the pattern of the black matrix 1104 becomes a part of the protective film, and reliability is improved. Also, there is no exposing of the wiring across the seal section when etching the protective film on the lower layer with the pattern of the black matrix.

However, aligning the thin film transistor substrate and the opposing substrate becomes difficult. This problem is solved by providing a pattern 1104 as a guide according to the pattern of the black matrix.

Embodiment 7

Figure 12:
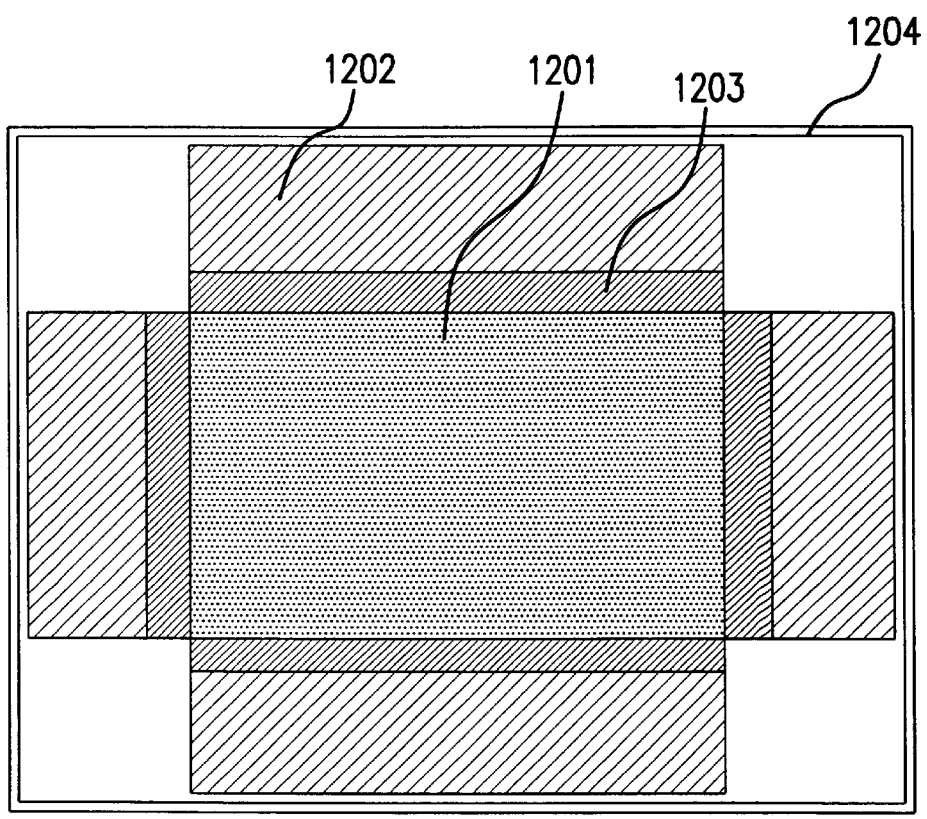
FIG. 12 is a plain view showing the structure of the seventh embodiment of the present invention.

The seventh embodiment of the present invention is explained in detail using FIG. 12 and shows an example of an active matrix liquid crystal display device having a driver installed inside. The pattern of the black matrix is also provided over the driver section.

FIG. 12 is a plain view of the thin film transistor substrate having a driver installed inside, but generally speaking, it can be divided into a display region 1201, a driver section 1202, and a seal section 1203. In the past, a black matrix on the thin film transistor substrate was formed only in the display region. By covering at least the driver section as well, the pattern of the black matrix 1204 becomes a part of the protective film of the driver section, and reliability is improved. Also, when the protective film is etched on the lower layer with the pattern of the black matrix as a mask, there is no exposing of the wiring across the seal section.

Embodiment 8

Figure 13:
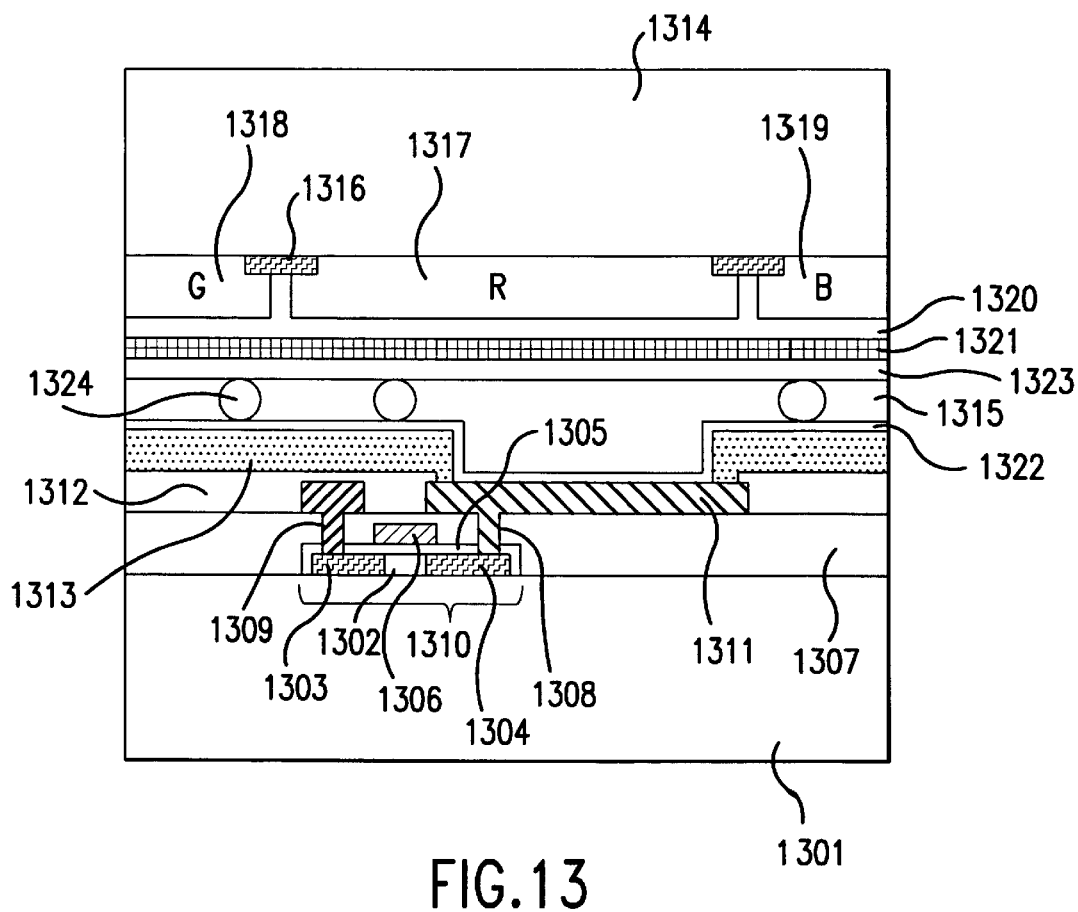
FIG. 13 is a cross-sectional view showing the structure of the eighth embodiment of the present invention.

The eighth embodiment is an active matrix liquid crystal display device having an ultraviolet light-blocking layer formed over the thin film transistors to prevent the degradation of properties. The eighth embodiment of the present invention is explained in detail using FIG. 13 and shows a structural cross-sectional view showing one such example.

Over the inner side of thin film transistor substrate 1301 are provided a thin film transistor 1310, consisting of a channel region 1302, source region 1303, drain region 1304, gate insulation film 1305, gate line 1306, interlevel insulator film 1307, contact hole 1308, and source line 1309, and the like, and a pixel electrode 1311 driven by the thin film transistor and having a transparent conductive film arranged in a stripe, mosaic, triangle or like pattern.

An insulation film 1312 is formed as a protective film over source line 1309. However, this insulation film is removed on the top of pixel electrode 1311 and a window is opened. Thus, source line 1309 can be protected, and the voltage applied to the liquid crystal is not reduced due to the existence of this insulation film.

Furthermore, an ultraviolet light-blocking layer 1313 is formed on protective film 1312 in a shape that covers thin film transistor 1310. According to the present embodiment, the strength of ultraviolet radiation to which the thin film transistor is exposed can be reduced by the ultraviolet light-blocking layer, and thus reliability can be improved.

Thin film transistor substrate 1301 is matched with opposing substrate 1314, and liquid crystal 1315 is enclosed between them. On opposing substrate 1314 are formed a black matrix 1316 composed of a light-blocking film such as chromium oxide, and red, green, and blue color filter sections 1317, 1318, 1319 formed by gelatin dyed with red, green, and blue color.

On the black matrix 1316 and color filter sections 1317, 1318 and 1319 are formed a protective insulation film 1320 and opposing electrodes 1321 composed of a transparent conductive film. Alignment films 1322 and 1323 are formed on pixel electrode 1311 and opposing electrodes 1321, and are applied with rubbing processing. The distance between the pixel electrode and the opposing electrode is generally called a cell gap, a parameter that greatly controls the optical properties. The cell gap deviates more easily as the liquid crystal panel becomes larger. Therefore, uniformity is maintained in a large liquid crystal panel by using a spacer 1324.

Embodiment 9

Figure 14:
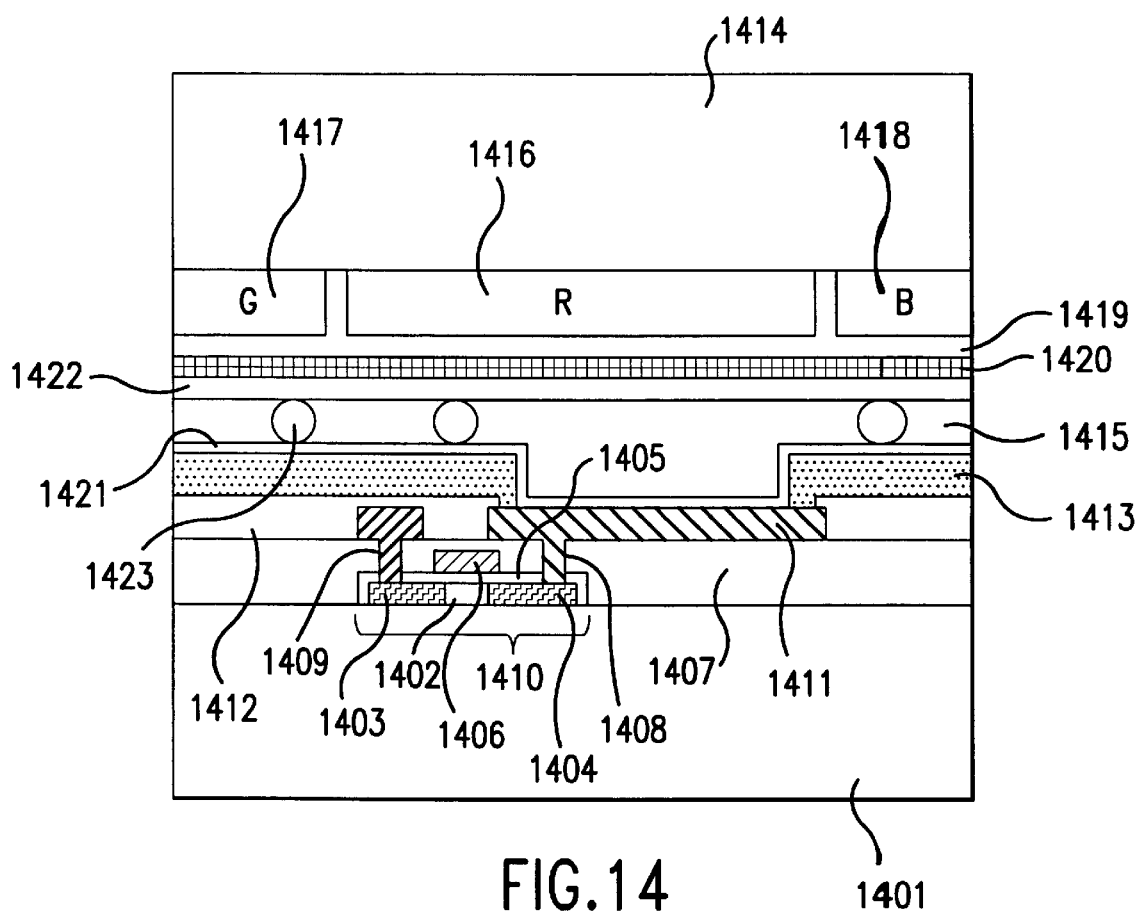
FIG. 14 is a cross-sectional view showing the structure of the ninth embodiment of the present invention.

The ninth embodiment of the present invention is explained in detail using FIG. 14 and is an active matrix liquid crystal display device having an ultraviolet light-blocking layer formed over the thin film transistors, thus intending to prevent the degradation of properties in the same manner as the eighth embodiment. The difference with the eighth embodiment is in the point that the black matrix serves as said ultraviolet light-blocking layer. FIG. 14 is a structural cross-sectional view showing one example of the ninth embodiment.

Over the inner side of thin film transistor substrate 1401 are provided a thin film transistor 1410, consisting of a channel region 1402, source region 1403, drain region 1404, gate insulation film 1405, gate line 1406, interlevel insulator film 1407, contact hole 1408, and source line 1409, and the like, and a pixel electrode 1411 driven by the thin film transistor, and having a transparent conductive film arranged in a stripe, mosaic, triangle or like pattern.

An insulation film 1412 is formed over source line 1409 as a protective film. However, the insulation film 1412 is removed on the top of pixel electrode 1411 and a window is opened. Thus, source line 1409 can be protected, and a reduction of voltage applied to the liquid crystal due to the existence of the insulation film 1412 can be prevented.

Furthermore, a black matrix 1413 is formed over protective film 1412 in a shape that blocks the light in the gap between pixel electrodes 1411. This pattern covers thin film transistor 1410, and blocks ultraviolet light. According to the present embodiment, the strength of ultraviolet radiation to which the thin film transistor is exposed can be greatly reduced by the ultraviolet light-blocking layer, thus improving reliability.

Thin film transistor substrate 1401 is matched with opposing substrate 1414, and liquid crystal 1415 is enclosed between them. Red, green, and blue color filter sections 1416, 1417, 1418 are formed on opposing substrate 1414 by color resists having distributed red, green, and blue color dye.

A protective insulation film 1419 and opposing electrodes 1420 composed of a transparent conductive film are formed over the color filter sections 1416–1418. Alignment films 1421 and 1422 are formed on pixel electrodes 1411 and opposing electrodes 1420, and they are applied with rubbing processing. The distance between pixel electrode 1411 and opposing electrode 1420 is generally called a cell gap, and it is a parameter that greatly controls the optical properties. This cell gap deviates more easily as the liquid crystal panel becomes larger. Therefore, uniformity is maintained in a large liquid crystal panel by using a gap member or spacer 1423.

Embodiment 10

Figure 15:
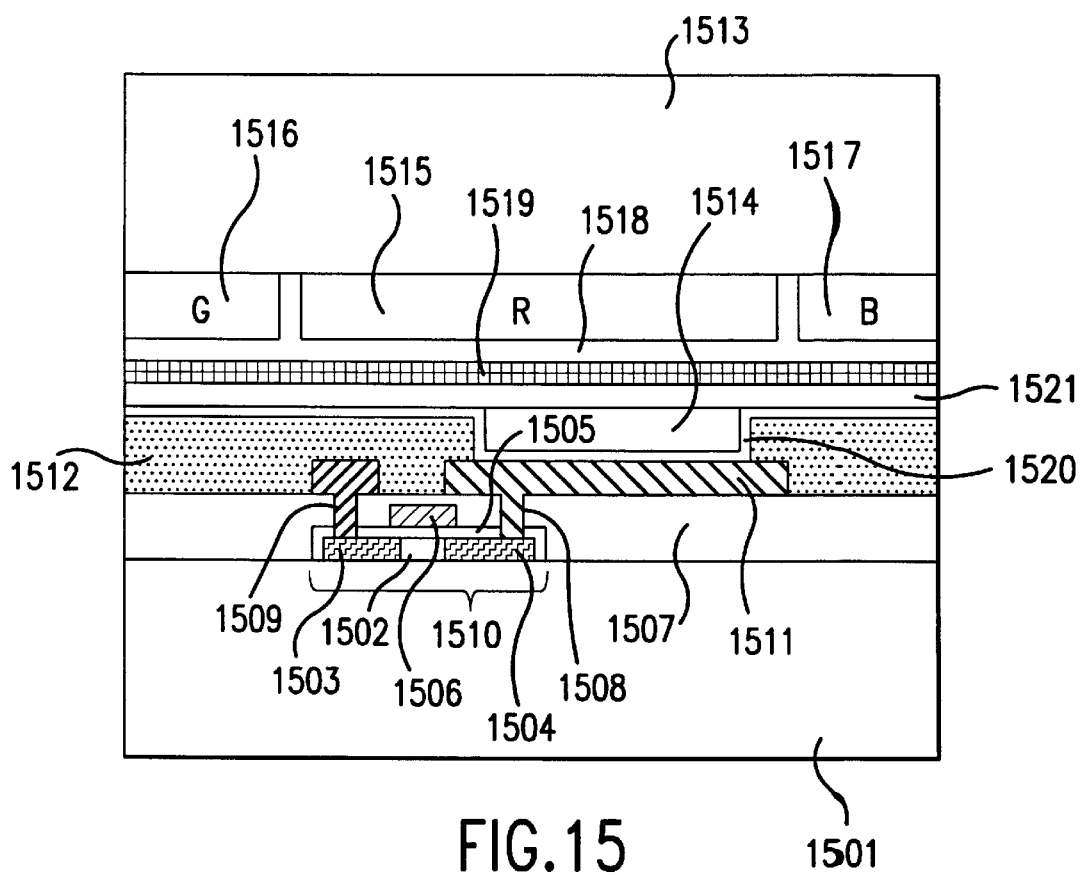
FIG. 15 is a cross-sectional view showing the structure of the tenth embodiment of the present invention.

The tenth embodiment of the present invention is explained in detail using FIG. 15 and is an active matrix liquid crystal display device having a black matrix formed over the thin film transistor substrate with the pattern of the black matrix serving as a spacer. FIG. 15 is a structural cross-sectional view showing one example of the tenth embodiment.

A thin film transistor 1510 is provided over the inner side of thin film transistor substrate 1501. The thin film transistor 1510, comprises of a channel region 1502, source region 1503, drain region 1504, gate insulation film 1505, gate line 1506, interlevel insulator film 1507, contact hole 1508, and source line 1509, and the like, and a pixel electrode 1511 driven by the thin film transistor, and having a transparent conductive film arranged in a stripe, mosaic, triangle or like pattern. Over pixel electrodes 1511 is formed a black matrix 1512 in a shape that blocks the light in the gap between the pixel electrodes 1511, and serves as a spacer.

According to the present embodiment, by the fact that the black matrix serves as a spacer, the process of scattering spacers can be omitted, and the improvements of throughput and the reduction of cost are realized.

Thin film transistor substrate 1501 is matched with opposing substrate 1513, and liquid crystal 1514 is interposed between them. On opposing substrate 1513 are formed red, green, and blue color filter sections 1515, 1516, 1517 formed by color resists having distributed red, green, and blue color dye. On these color filter sections 1515–1517 are formed a protective insulation film 1518 and opposing electrodes 1519 composed of a transparent conductive film. Alignment films 1520 and 1521 are layered on pixel electrodes 1511 and opposing electrodes 1519 by rubbing processing. The distance between pixel electrode 1511 and opposing electrode 1519 is generally called a cell gap, and it greatly controls the optical properties. This cell gap deviates more easily as the liquid crystal panel becomes larger, but because the pattern of the black matrix serves as a spacer, uniformity of the cell gap is maintained.

Embodiment 11

Figure 16:
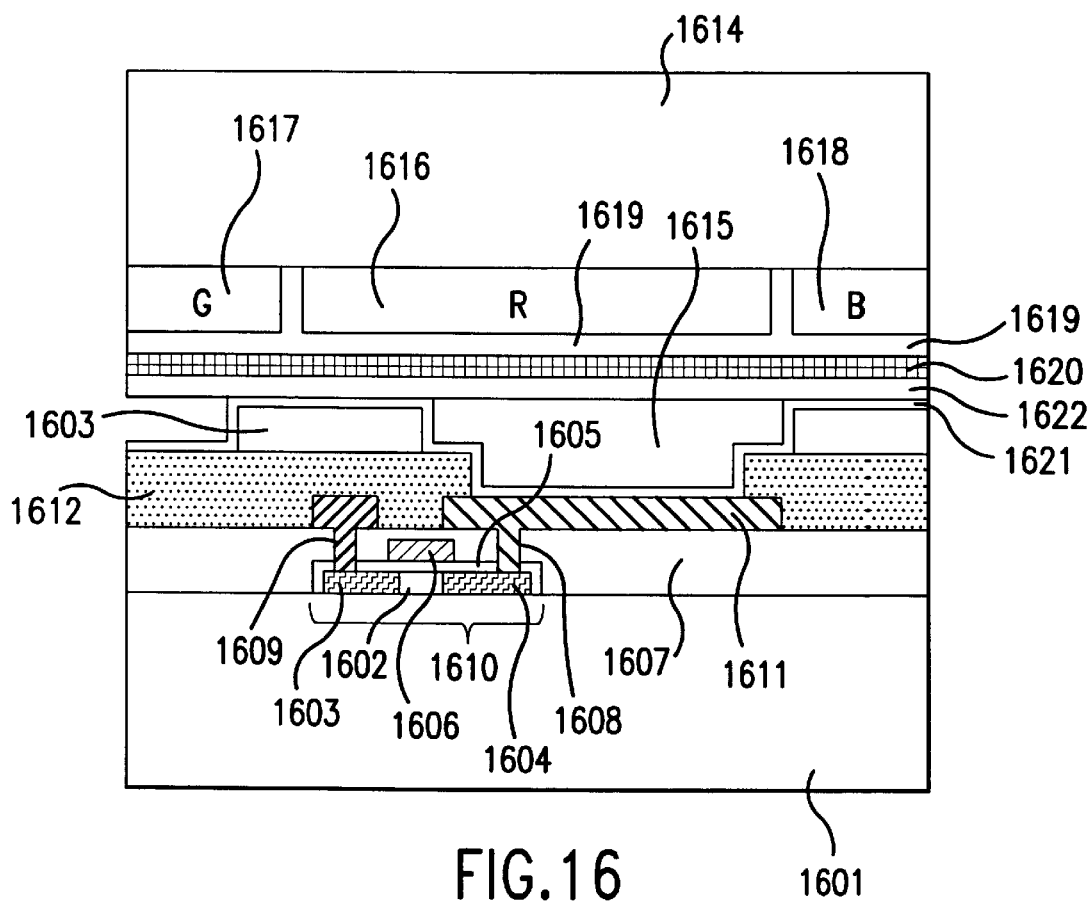
FIG. 16 is a cross-sectional view showing the structure of the eleventh embodiment of the present invention.

The eleventh embodiment of the present invention is explained in detail using FIG. 16 and is an active matrix liquid crystal display device characterized in that a black matrix is formed over the thin film transistor substrate as a spacer, in the same manner as the tenth embodiment. The difference with the tenth embodiment is that an insulation film is formed on the black matrix, and the insulation film with the black matrix serves as a spacer. FIG. 16 is a structural cross-sectional view showing one example of the eleventh embodiment.

A thin film transistor 1610 is provided over the inner side of thin film transistor substrate 1601. The thin film transistor 1610 comprises a channel region 1602, source region 1603, drain region 1604, gate insulation film 1605, gate line 1606, interlevel insulator film 1607, contact hole 1608, and source line 1609, and the like, and a pixel electrode 1611 driven by the thin film transistor, and having a transparent conductive film arranged in a stripe, mosaic, triangle or like pattern. A black matrix 1612 is formed over pixel electrodes 1611 in a pattern that blocks the light in the gap between the pixel electrodes 1611, and an insulation film 1613. This insulation film, with the black matrix, serves as a spacer.

According to the present embodiment, the process of scattering spacers can be omitted, and the improvement of throughput and the reduction of cost is realized. Also, by forming an insulation film over the black matrix, there is no image quality degradation even when the specific resistance of the black matrix material is low.

Thin film transistor substrate 1601 is matched with opposing substrate 1614, and liquid crystal 1615 is interposed between them. On opposing substrate 14 are formed red, green, and blue color filter sections 1616, 1617, 1618 formed by color resists having distributed red, green, and blue color dye. A protective insulation film 1619 and opposing electrodes 1620 composed of a transparent conductive film are formed on these color filter sections 1616–1618. Alignment films 1621 and 1622 are formed on pixel electrodes 1611 and opposing electrodes 1620 by rubbing processing. The distance between pixel electrode 1611 and opposing electrode 1620 is generally called a cell gap, and it greatly controls the optical properties of a liquid crystal display device. This cell gap deviates more easily as the liquid crystal panel becomes larger, but because the pattern from the insulation film and the black matrix serves as spacer, uniformity of the cell gap is maintained.

Embodiment 12

Figure 17:
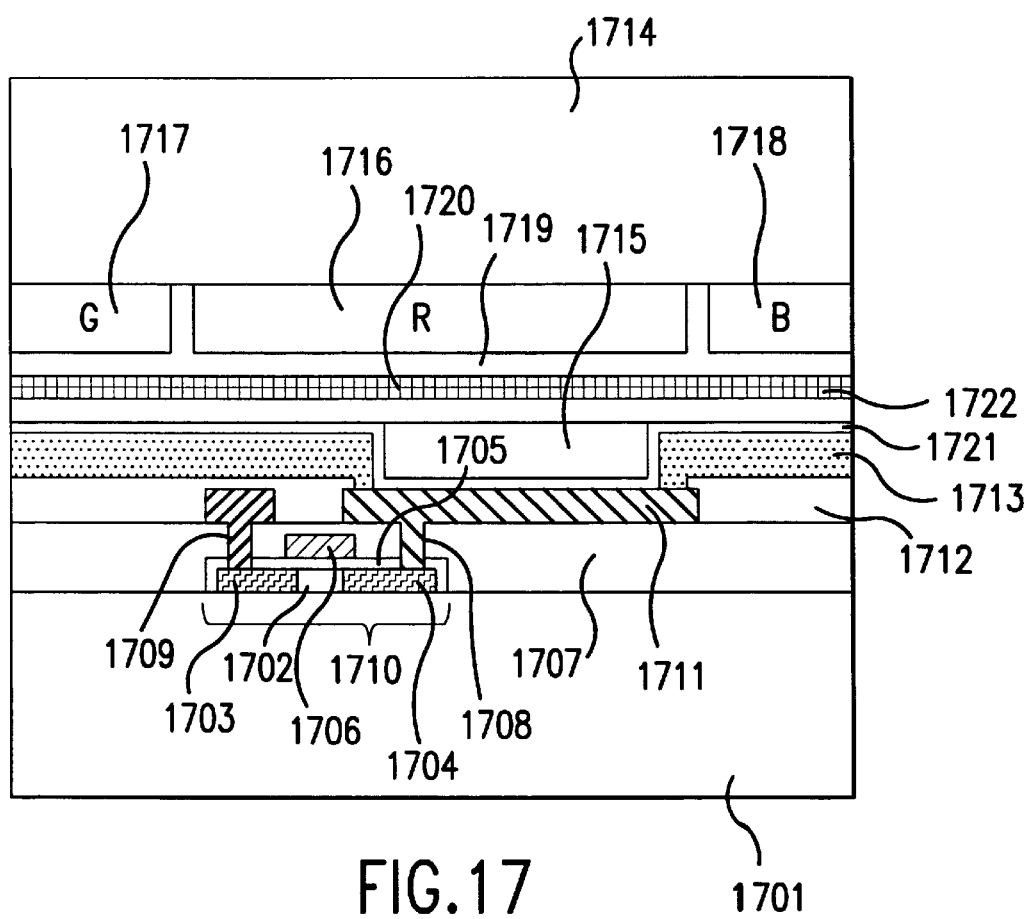
FIG. 17 is a cross-sectional view showing the structure of the twelfth embodiment of the present invention.

The twelfth embodiment of the present invention is explained in detail using FIG. 17 and is an active matrix liquid crystal display device including a black matrix formed over the thin film transistor substrate, with the pattern of the black matrix providing a spacer, in the same manner as the tenth embodiment. The difference with the tenth embodiment is that an insulation film is formed over the lower layer of the black matrix, and the insulation film, with the black matrix, serves as a spacer. FIG. 17 is a structural cross-sectional view showing one example of the twelfth embodiment.

A thin film transistor 1710 is provided over the inner side of thin film transistor substrate 1701, the thin film transistor includes a channel region 1702, source region 1703, drain region 1704, gate insulation film 1705, gate line 1706, interlevel insulator film 1707, contact hole 1708, and source line 1709, and the like, and a pixel electrode 1711 driven by the thin film transistor, and having transparent conductive film arranged in a stripe, mosaic, triangle or like pattern. An insulation film 1712 is formed on source line 1709 as a protective film. However, this insulation film is removed at the top of pixel electrode 1711 and a window is opened. Thus, source line 1709 can be protected, and a reduction in voltage applied to the liquid crystal due to the existence of the insulation film 1712 is prevented. Furthermore, a black matrix 1713 is formed over protective film 1712 in a shape that blocks the light in the gap between pixel electrodes 1711. Black matrix 1713, with protective film 1712 provides a spacer.

According to the present embodiment, the process of scattering spacers can be omitted, and the improvement of throughput and the reduction of cost is realized. Also, by forming an insulation film below the black matrix, there is no worsened image quality even when the specific resistance of the black matrix material is low.

Thin film transistor substrate 1701 is matched with opposing substrate 1714, and liquid crystal 1715 is interposed between them. Red, green, and blue color filter sections 1716, 1717, 1718 formed by color resists having distributed red, green, and blue color dye are formed on opposing substrate 1714. A protective insulation film 1719 and opposing electrodes 1720 composed of a transparent conductive film are formed on the color filter sections 1716–1718. Alignment films 1721 and 1722 are formed on pixel electrodes 1711 and opposing electrodes 1720 by rubbing processing. The distance between pixel electrode and opposing electrode is generally called a cell gap, and it is a parameter that greatly controls the optical properties. This cell gap deviates more easily as the liquid crystal panel becomes larger, but because the pattern from the insulation film and the black matrix also serves as spacer, uniformity of the cell gap is maintained.

Embodiment 13

Figure 18:
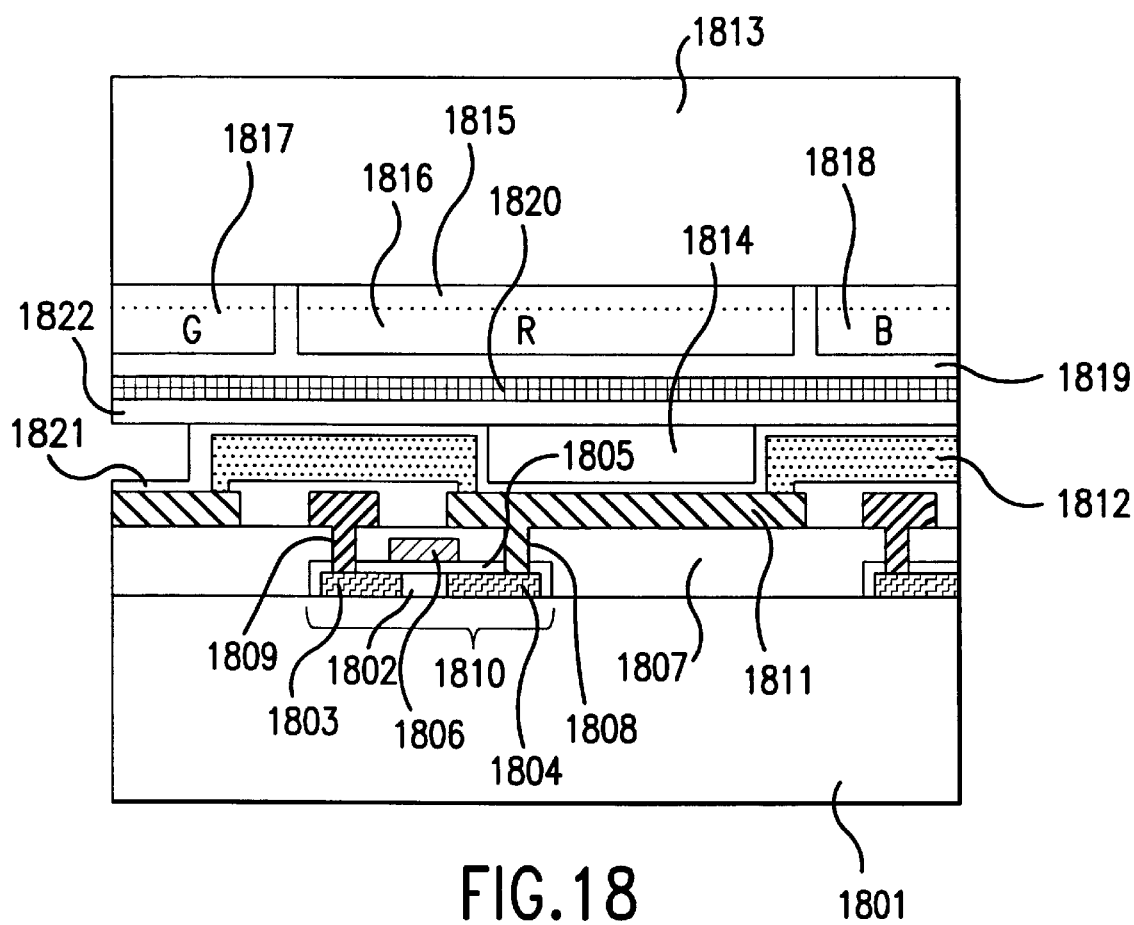
FIG. 18 is a cross-sectional view showing the structure of the thirteenth embodiment of the present invention.

The thirteenth embodiment of the present invention is explained in detail using FIG. 18 and is an active matrix liquid crystal display device including a black matrix formed over the thin film transistor substrate, with the pattern of this black matrix serving as a spacer, in the same manner as the tenth embodiment. The difference with the tenth embodiment is that the black matrix is formed only in the direction of the source line. FIG. 18 is a structural cross-sectional view showing one example of the thirteenth embodiment.

Over the inner side of thin film transistor substrate 1801 are provided thin film transistor 1810, having a channel region 1802, source region 1803, drain region 1804, gate insulation film 1805, gate line 1806, interlevel insulator film 1807, contact hole 1808, and source line 1809, and the like, and a pixel electrode 1811 driven by the thin film transistor, and having a transparent conductive film arranged in a stripe, mosaic, triangle or like pattern. A black matrix 1812 is formed over pixel electrodes 1811 in a shape that blocks the light in the gap between pixel electrodes 1811 following source lines 1809, and it also serves as a spacer.

According to the present embodiment, the process of scattering spacers can be omitted, and the improvement of throughput and the reduction of cost become possible. Also, because a high wall can be made on the four sides of a pixel electrode when the black matrix is formed in the direction following the gate lines, there was a previous problem that it was difficult to inject the liquid crystal. However, this problem was solved by forming the black matrix only in the direction of the source lines.

Thin film transistor substrate 1801 is matched with opposing substrate 1813, and liquid crystal 1814 is interposed between them. On opposing substrate 1813, a black matrix 1815 is formed of a light-blocking film such as chrome at least in the direction of the gate lines, and red, green, and blue color filter sections 1816, 1817, 1818 formed by color resists having distributed red, green, and blue color dye. A protective insulation film 1819 and opposing electrodes 1820 composed of a transparent conductive film are formed on the color filter sections 1816–1818. Alignment films 1821 and 1822 are formed on pixel electrodes 1811 and opposing electrodes 1820, and they are applied with rubbing processing. The distance between pixel electrode 1811 and opposing electrode 1822 is generally called a cell gap, and it is a parameter that greatly controls the optical properties. This cell gap deviates more easily as the liquid crystal panel becomes larger, but because the pattern from the black matrix serves the role of spacer, uniformity of the cell gap is maintained.

In the present embodiment, a case in which only the black matrix serves as a spacer has been explained. However, even when an insulation film is provided over the upper layer or lower layer of the black matrix, and spacers are formed with the insulation film and black matrix, in the same manner as explained in Embodiment 11 and Embodiment 12, the main principle of the present invention is maintained.

Embodiment 14

Figure 19:
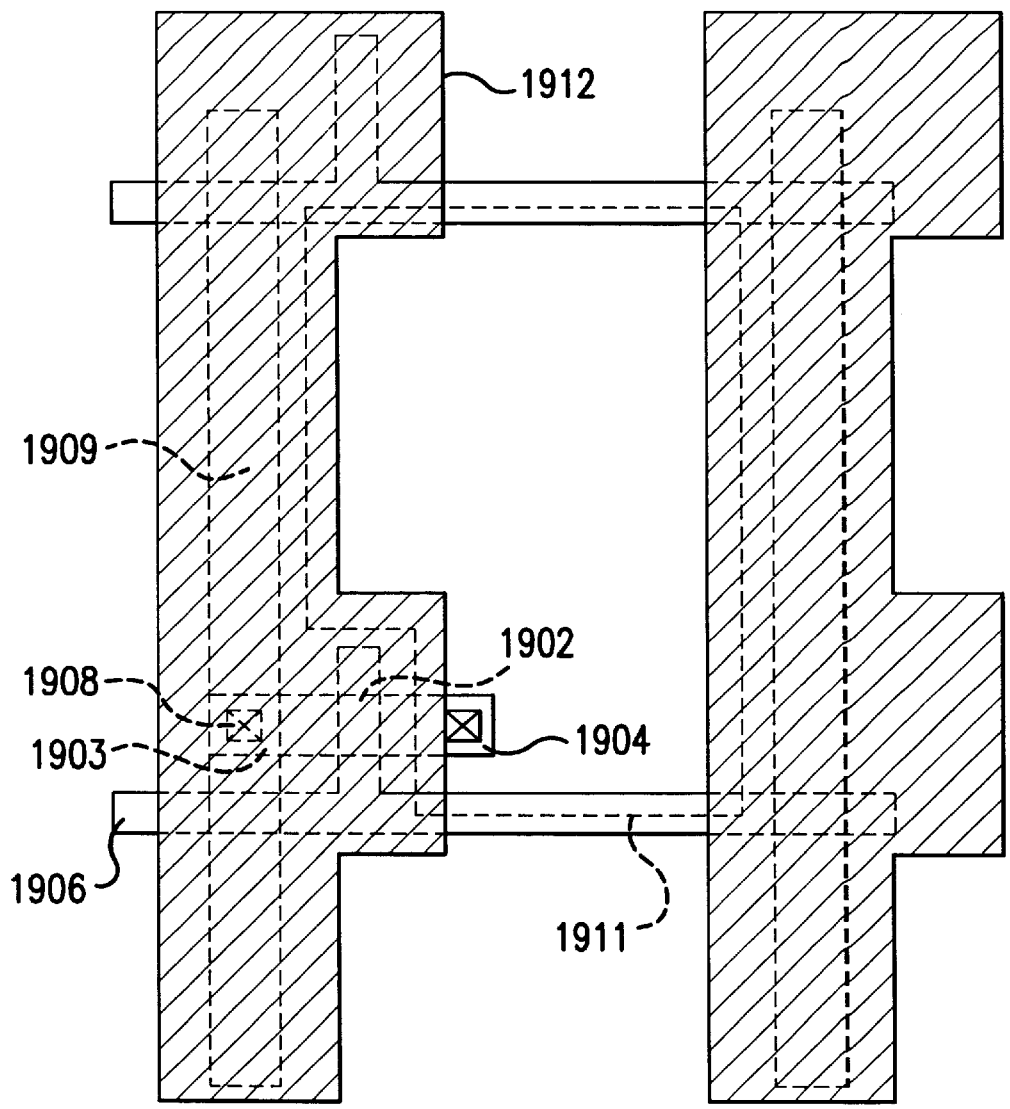
FIG. 19 is a plain view showing the structure of the fourteenth embodiment of the present invention.

The fourteenth embodiment of the present invention is explained in detail using FIG. 19 and is an active matrix liquid crystal display device including a black matrix formed over the thin film transistor substrate, the pattern of this black matrix providing a spacer. Moreover this black matrix is formed only in the direction of the source line, in the same manner as the thirteenth embodiment. The difference with the thirteenth embodiment is that the black matrix in the direction of the gate line is served by a gate line or capacitance line. FIG. 19 is a plain view showing one example of the fourteenth embodiment.

Thin film transistors are provided over the inner side of the thin film transistor substrate. The thin film transistors include a channel region 1902, source region 1903, drain region 1904, gate insulation film, gate line 1906, interlevel insulator film, contact hole 1908, and source line 1909, and the like, and pixel electrodes 1911 driven by the thin film transistors, and having a transparent conductive film arranged in a stripe, mosaic, triangle or like pattern. A black matrix 1912 is formed over pixel electrodes 1911 in a shape that blocks the light in the gap between pixel electrodes 1911 and source lines 1909, and it also serves as a spacer. Also, the top of pixel electrode 1911 overlaps with gate line 1906, and the gate line serves as a portion of the black matrix.

According to the present embodiment, the process of scattering spacers can be omitted, and the improvement of throughput and the reduction of cost are realized. Also, because a high wall can be made on the four sides of a pixel electrode when the black matrix is formed in the direction following the gate lines, there was a previous problem that it was difficult to inject the liquid crystal. However, this problem is solved in the present invention by forming it only in the direction of the source lines. Furthermore, at this time, since the gate line or capacitance line serves as the black matrix in the direction of the gate lines, it is no longer necessary to separately form the black matrix in the direction of the gate lines, and an increase of cost can be kept down.

In the present embodiment, a case in which only the black matrix serves as a spacer has been explained. However, even when an insulation film is provided on the upper layer or lower layer of the black matrix, and spacers are formed with the insulation film and black matrix in the same manner as explained in Embodiment 11 and Embodiment 12, the main principle of the present invention is maintained.

Also, in the present embodiment, a gate line serves as a portion of the black matrix. However, even when a capacitance line takes the task of a portion of the black matrix, the main principle of the present invention is still maintained.

Embodiment 15

Figure 20:
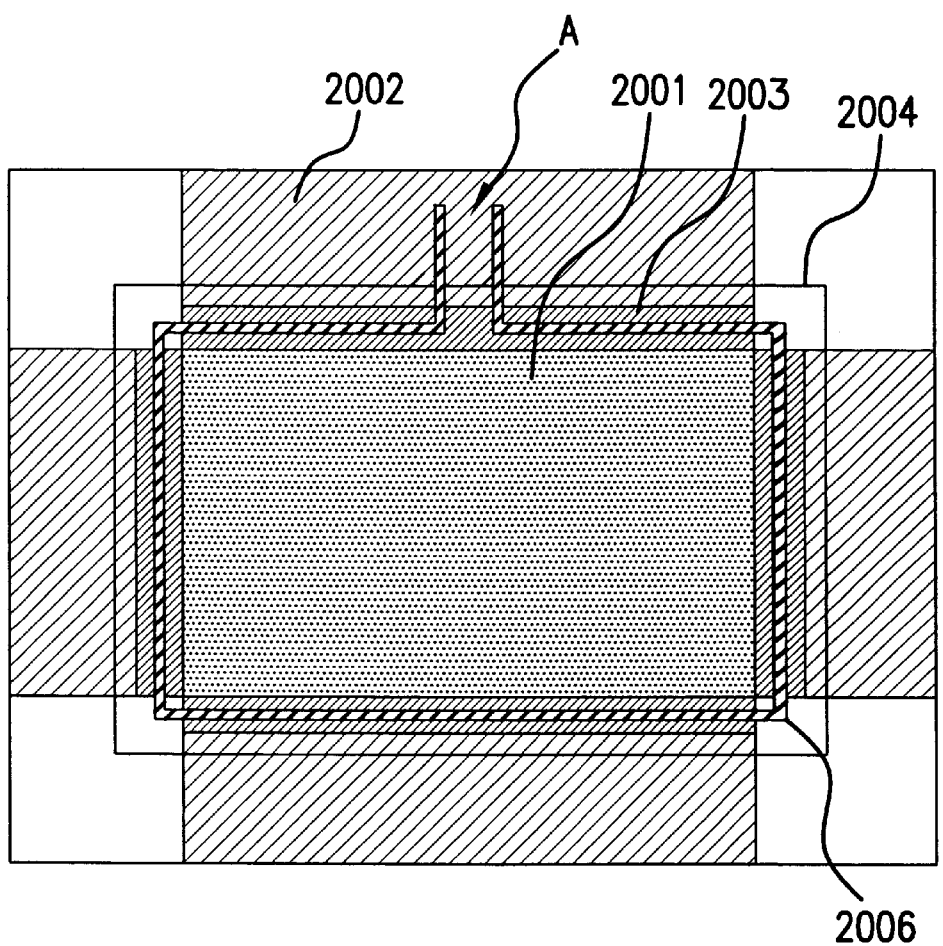
FIG. 20 is a plain view showing the structure of the fifteenth embodiment of the present invention.

The fifteenth embodiment of the present invention is explained in detail using FIG. 20 and is an active matrix liquid crystal display device including a black matrix formed over the thin film transistor substrate, the pattern of this black matrix providing a spacer. Moreover, this black matrix is formed only in the direction of the source line, in the same manner as the thirteenth and fourteenth embodiments. The difference with the thirteenth and fourteenth embodiments is that the liquid crystal injection port is formed in the direction of the source lines. FIG. 20 is a plain view of a thin film transistor substrate showing one example of the fifteenth embodiment, and shows a display region 2001, a terminal section 2002, and a seal section 2003. Also, black matrix 2004, doubling as a spacer, is formed in the direction of the source lines. A sealant 2006 is printed on the seal section, and although it is not illustrated here, it can be matched with the opposing substrate. Point A is the liquid crystal injection port.

According to the present embodiment, the process of scattering spacers can be omitted, and the improvement of throughput and the reduction of cost are realized. Also, because a high wall can be made on the four sides of a pixel electrode when the black matrix is formed in the direction following the gate lines, there was a previous problem that it was difficult to inject the liquid crystal. However, this problem is solved in the present invention by forming it only in the direction of the source lines. Furthermore, at this time, when the liquid crystal injection port is in the direction of the source lines, injection of the liquid crystal can be performed in a short time and with a good yield.

In the present embodiment, the black matrix serves as a spacer. However, even when the an insulation film is provided on the upper layer or lower layer of the black matrix, and spacers are formed with the insulation film and black matrix, in the same manner as explained in Embodiment 11 and Embodiment 12, the main principle of the present invention is maintained.

Embodiment 16

Figure 21:
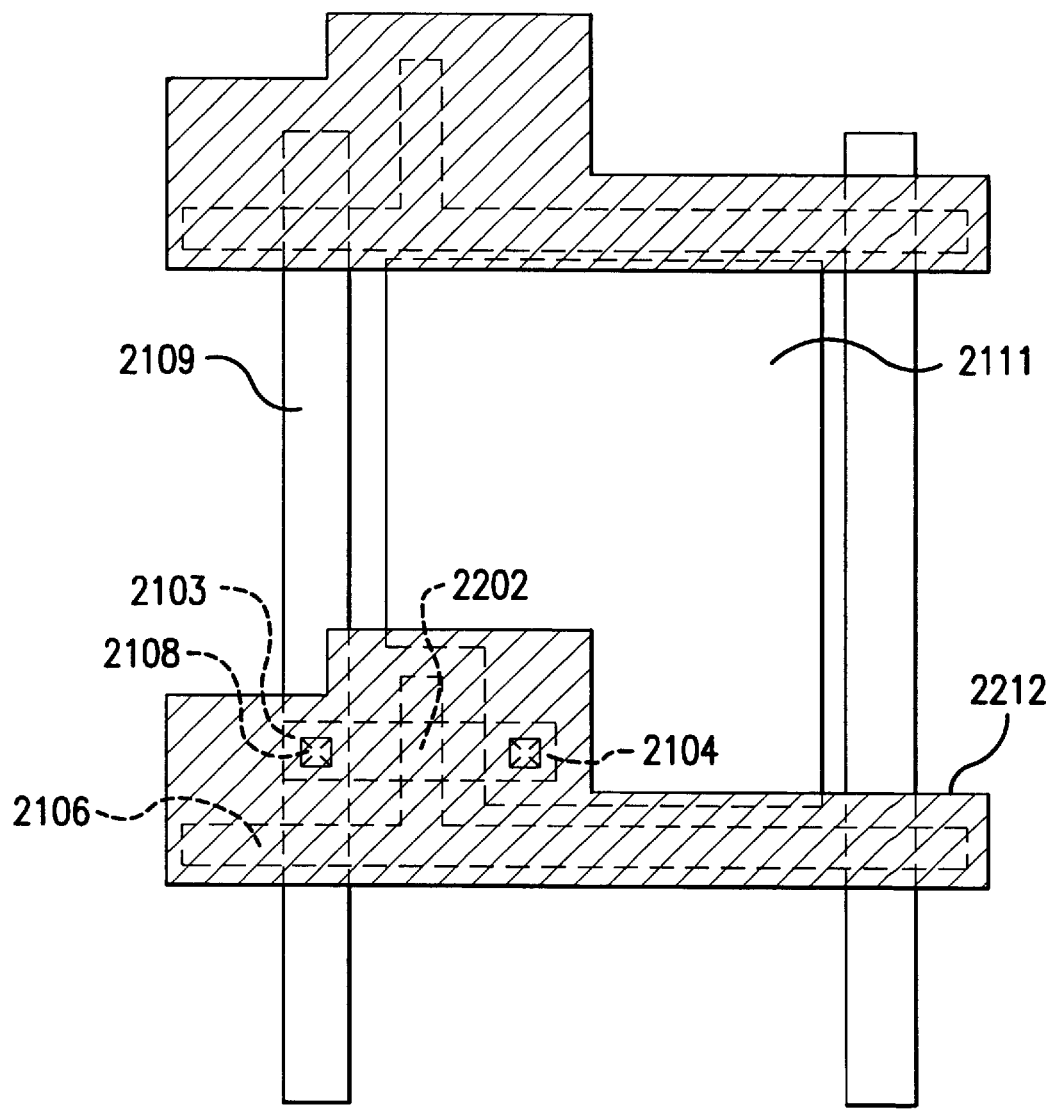
FIG. 21 is a plain view showing the structure of the sixteenth embodiment of the present invention.

The sixteenth embodiment of the present invention is explained in detail using FIG. 21 and is an active matrix liquid crystal display device including a black matrix formed over the thin film transistor substrate, that serves as a spacer in the same manner as the tenth embodiment. The difference with the tenth embodiment is that the black matrix is formed only in the direction of the gate lines. FIG. 21 is a plain view showing one example of the sixteenth embodiment.

Thin film transistors are provided over the inner side of the thin film transistor substrate. The thin film transistor includes a channel region 2102, source region 2103, drain region 2104, gate insulation film gate line 2106, interlevel insulator film, contact hole 2108, and source line 2109, and the like, and pixel electrodes 2111 driven by the thin film transistors, and having a transparent conductive film arranged in a stripe, mosaic, triangle or like pattern. A black matrix 2112 is formed over pixel electrodes 2111 in a shape that blocks the light in the gap between pixel electrodes 2111 and gate lines 2106, and it serves also the role of a spacer.

According to the present embodiment, the process of scattering spacers can be omitted, and the improvement of throughput and the reduction of cost are realized. Also, because a high wall can be made on the four sides of a pixel electrode when the black matrix is formed in the direction following the source lines, there was a previous problem that it was difficult to inject the liquid crystal. However, this problem is solved by the present invention by forming it only in the direction of the gate lines.

In the present embodiment, only the black matrix serves as a spacer. However, even when the an insulation film is provided on the upper layer or lower layer of the black matrix, and spacers are formed with the insulation film and black matrix, in the same manner as explained in Embodiment 11 and Embodiment 12, the main principle of the present invention is maintained.

Embodiment 17

Figure 22:
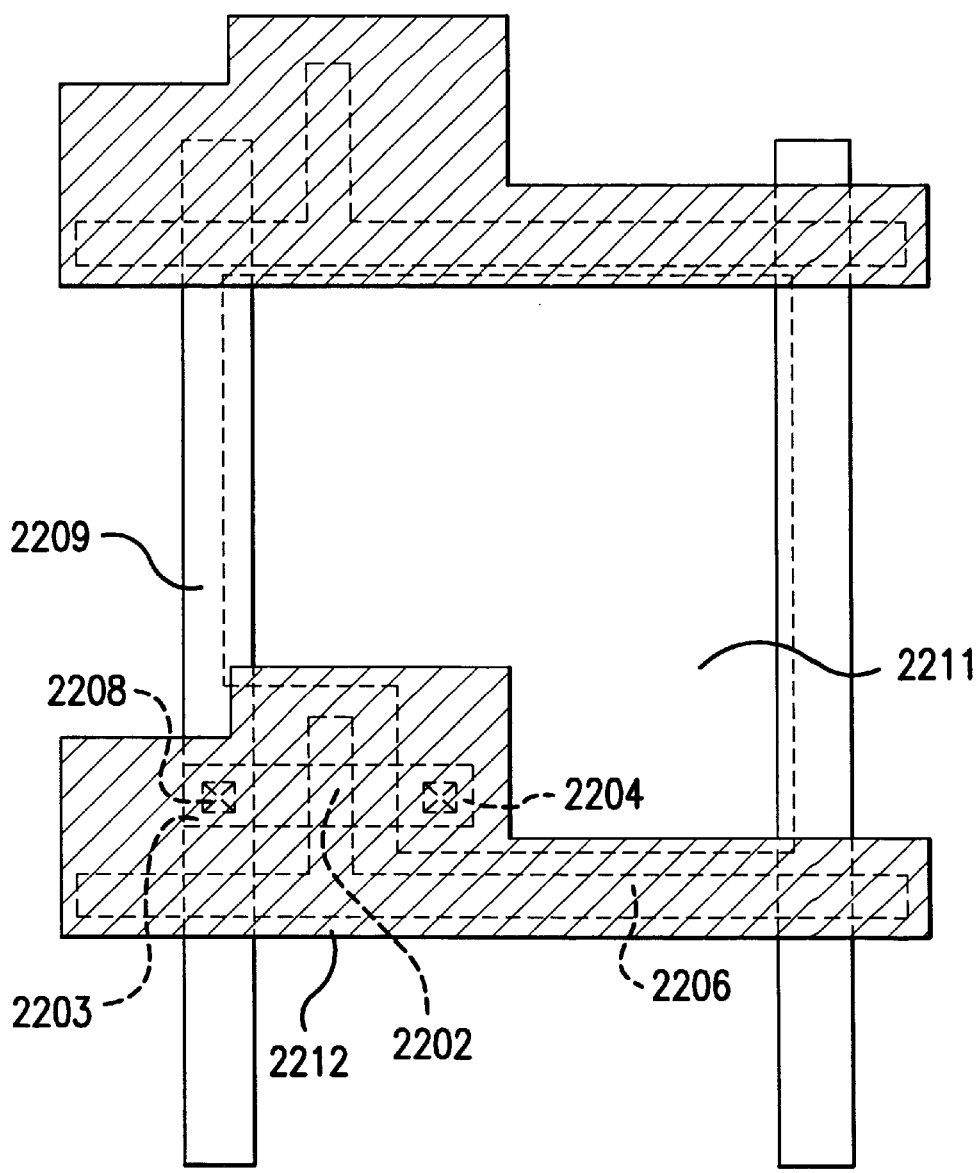
FIG. 22 is a plain view showing the structure of the seventeenth embodiment of the present invention.

The seventeenth embodiment of the present invention is explained in detail using FIG. 22 and is an active matrix liquid crystal display device including a black matrix formed over the thin film transistor substrate, the pattern of this black matrix serving as a spacer. The black matrix is formed only in the direction of the gate lines, in the same manner as the sixteenth embodiment. The difference with the sixteenth embodiment is that the black matrix in the direction of the source lines is served by a gate line or source line. FIG. 22 is a plain view showing one example of the seventeenth embodiment.

The thin film transistors are provided over the inner side of the thin film transistor substrate. The thin film transistors include channel region 2202, source region 2203, drain region 2204, gate insulation film, gate line 2206, interlevel insulator film, contact hole 2208, and source line 2209, and the like, and pixel electrodes 2211 having a transparent conductive film and arranged in a stripe, mosaic, triangle or like pattern. A black matrix 2212 is formed over pixel electrodes 2211 in a shape that blocks the light in the gap between pixel electrodes 2211 and gate lines 2206. The black matrix 2212 also functions as a spacer. Also, by making pixel electrode 2111 overlap with source line 2109, it also serves as the black matrix.

According to the present embodiment, the process of scattering spacers can be omitted, and the improvement of throughput and the reduction of cost is realized. Also, because a high wall can be made on the four sides of a pixel electrode when the black matrix is formed in the direction following the source lines, there was a previous problem that it was difficult to inject the liquid crystal. However, this problem is solved in the present invention by forming it only in the direction of the gate lines. Furthermore, since the gate line or source line serves as the black matrix in the direction of the source lines, it is no longer necessary to separately form the black matrix in the direction of the source lines, and the increase of cost can be kept down.

The present embodiment illustrates the black matrix as a spacer. However, even when the an insulation film is provided on the upper layer or lower layer of the black matrix, and spacers are formed with the insulation film and black matrix, in the same manner as explained in Embodiment 11 and Embodiment 12, the main principle of the present invention is maintained.

Also, in the present embodiment, a source line serves as a portion of the black matrix. However, even when a gate line takes the task of a portion of the black matrix, the main principle of the present invention is still maintained.

Embodiment 18

Figure 23:
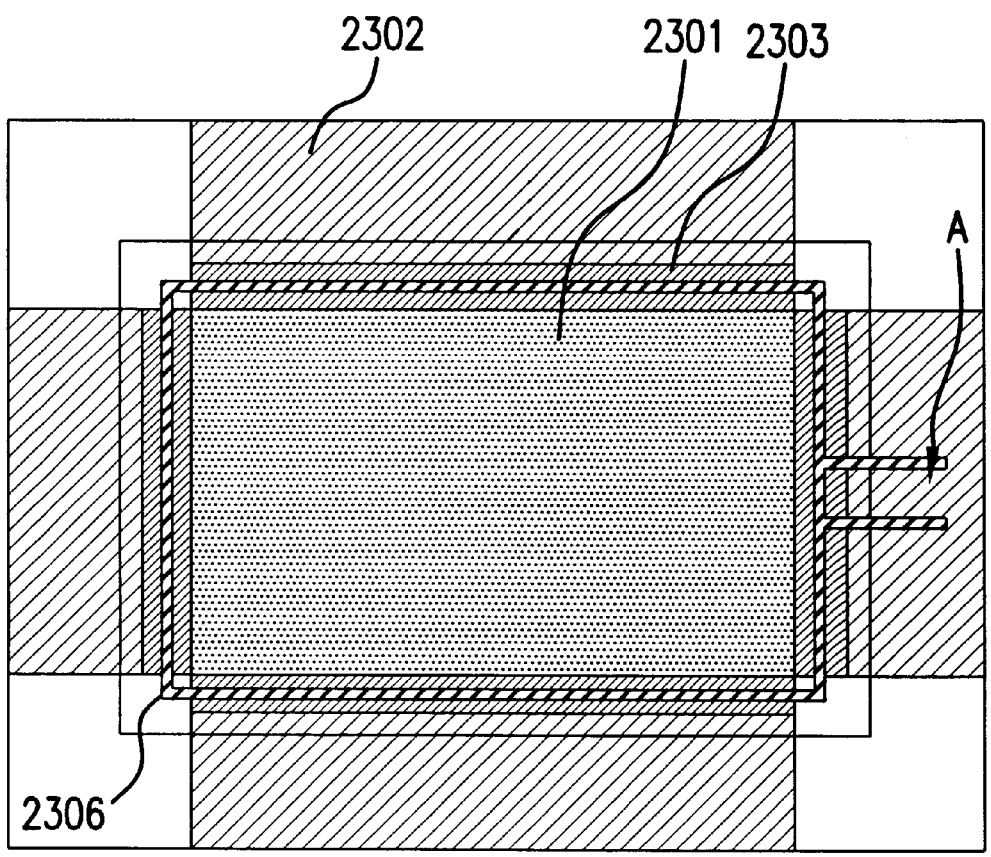
FIG. 23 is a plain view showing the structure of the eighteenth embodiment of the present invention.

The eighteenth embodiment of the present invention is explained in detail using FIG. 23 and is an active matrix liquid crystal display device including a black matrix formed over the thin film transistor substrate, the pattern of this black matrix serving as a spacer, and is formed only in the direction of the gate lines, in the same manner as the sixteenth and seventeenth embodiments. The difference with the sixteenth and seventeenth embodiments is that the liquid crystal injection port is formed in the direction of the gate lines. FIG. 23 is a plain view of a thin film transistor substrate showing one example of the eighteenth embodiment. It is divided into a display region 2301, a terminal section 2302, and a seal section 2303. Also, the black matrix, doubling as a spacer, is formed in the direction of the gate lines. A sealant 2306 is printed on the seal section, and although it is not illustrated here, it can be matched with the opposing substrate. Point A is the liquid crystal injection port.

According to the present embodiment, the process of scattering spacers can be omitted, and the improvement of throughput and the reduction of cost is realized. Also, because a high wall can be made on the four sides of a pixel electrode when the black matrix is formed in the direction following the source lines, there was a previous problem that it was difficult to inject the liquid crystal. However, this problem is solved in the present invention by forming it only in the direction of the gate lines. Furthermore, when the liquid crystal injection port is in the direction of the gate lines, injection of the liquid crystal can be performed in a short time and with a good yield.

In the present embodiment, only the black matrix serves the role of a spacer. However, even when the an insulation film is provided on the upper layer or lower layer of the black matrix, and spacers are formed with the insulation film and black matrix, in the same manner as explained in Embodiment 11 and Embodiment 12, the main principle of the present invention is maintained.

Embodiment 19

Figure 24A:
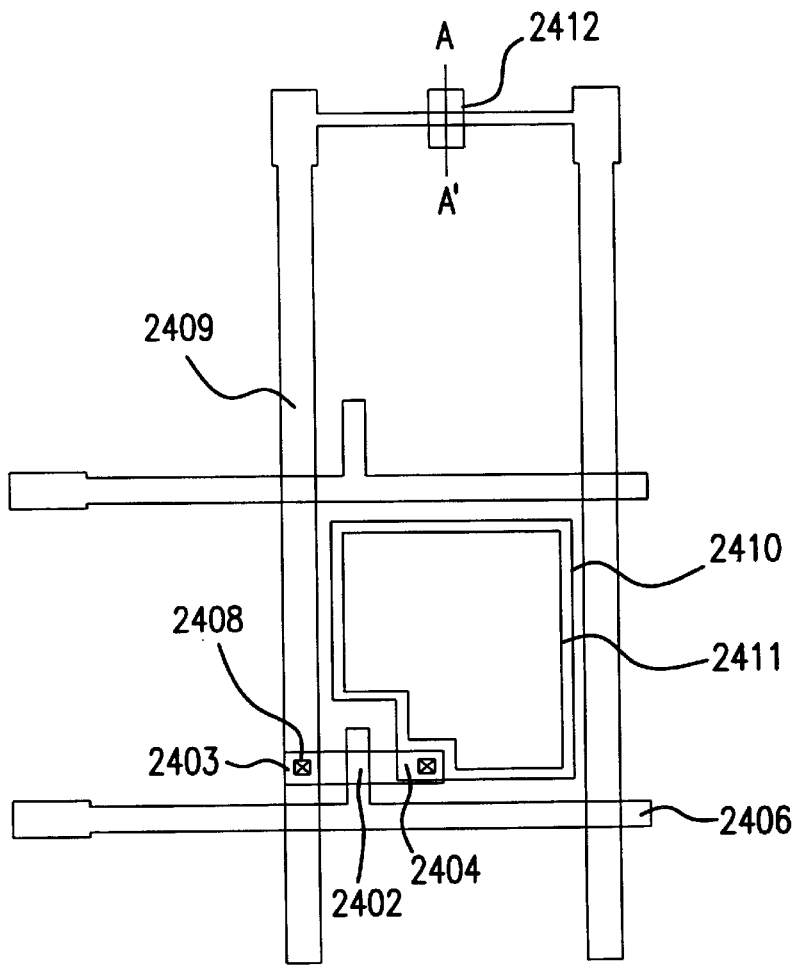
FIGS. 24a and 24b are a plain view and a structural cross-sectional view showing the structure of the nineteenth embodiment of the present invention.
Figure 24B:
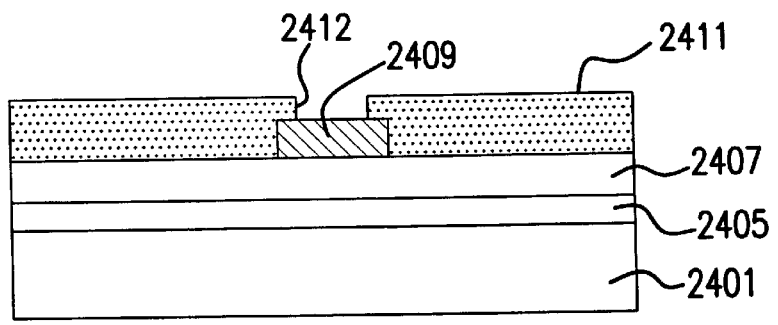

The nineteenth embodiment of the present invention is explained in detail using FIGS. 24a and 24b as an active matrix liquid crystal display device including a black matrix provided over the pixel electrodes, and anti-static wiring formed on the lower part separated using this pattern as a mask. FIG. 24 is a plain view and a structural cross-sectional view in the A–A' section of the plain view showing one example of that.

Thin film transistor are provided over the inner side of substrate 2401. The thin film transistors comprises a channel region 2402, source region 2403, drain region 2404, gate insulation film 2405, gate line 2406, interlevel insulator film 2407, contact hole 2408, and source line 2409, and the like, and pixel electrodes 2410 driven by the thin film transistor, and having a transparent conductive film arranged in a stripe, mosaic, triangle or like pattern. A black matrix 2411 is formed over pixel electrodes 2410 in a shape that blocks the light in the gap between pixel electrodes 2410, and also functions as a spacer. Here, source lines 2409 are mutually shorted at the initial stage in order to prevent damage due to static electricity.

In the present invention, a window 2412 is opened in this shorted section when forming black matrix 2411, and it is separated using the pattern of the black matrix as a mask. Anti-static wiring is generally provided outside the display area. Meanwhile, a black matrix is for blocking light in the perimeter of the pixel electrodes. Consequently, the pattern of a black matrix is formed for the purpose of separating the anti-static wiring without causing a bad influence in the display properties. Thus, it has become possible to reduce the number of processes and the cost.

Embodiment 20

Figure 25A:
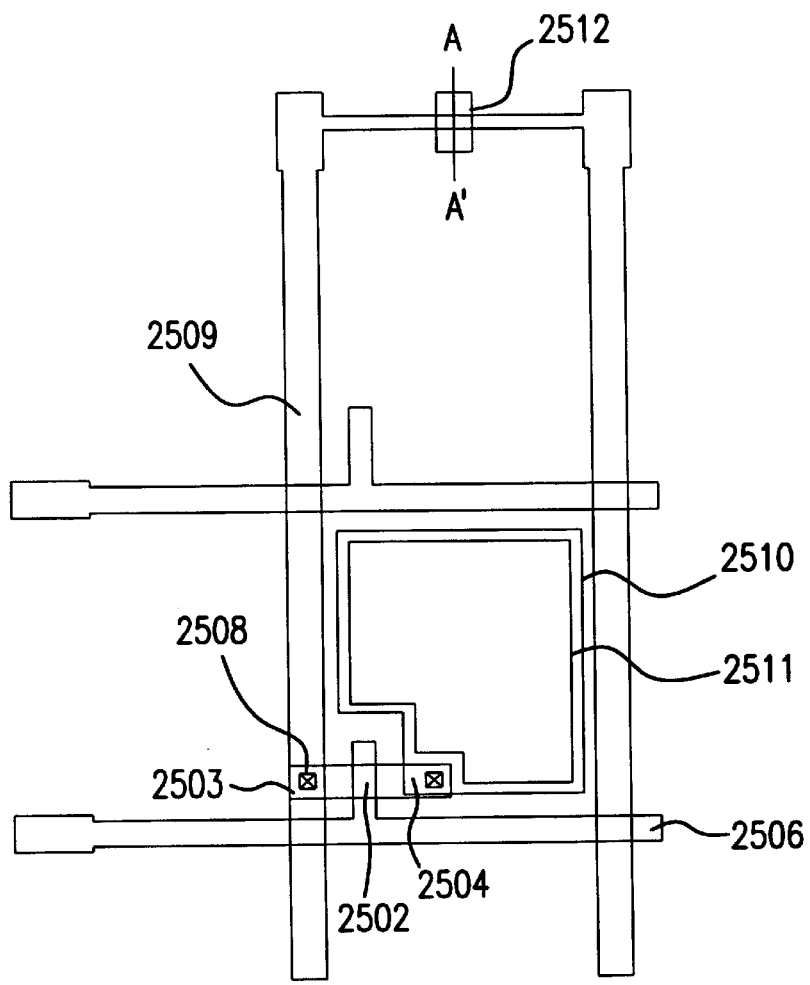
FIGS. 25a and 25b are a plain view and a structural cross-sectional view showing the structure of the twentieth embodiment of the present invention.
Figure 25B:
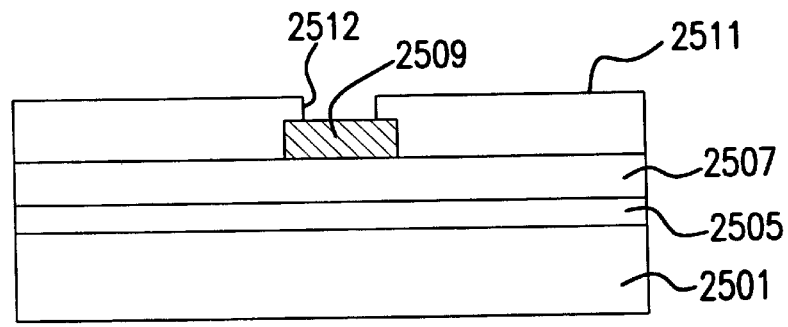

The twentieth embodiment of the present invention is explained in detail using FIG. 25 and is an active matrix liquid crystal display device including a pattern of a protective film provided over the pixel electrodes, and anti-static wiring formed on the lower part separated using this pattern as a mask. FIG. 25 is a plain view and a structural cross-sectional view in the A–A' section of the plain view showing one example of the twentieth embodiment.

Thin film transistors are provided over the inner side of thin film transistor substrate 2501. The thin film transistor comprises a channel region 2502, source region 2503, drain region 2504, gate insulation film 2505, gate line 2506, interlevel insulator film 2507, contact hole 2508, and source line 2509, and the like, and pixel electrodes 2510 driven by the thin film transistor, and having a transparent conductive film arranged in a stripe, mosaic, triangle or like pattern. An insulation film 2511 is formed on source lines 2509 as a protective film. However, this insulation film is removed from the top of pixel electrode 2510 and a window is opened. Thus, source lines 2509 can be protected, and in addition, the reduction of voltage applied to the liquid crystal is due to the existence of this insulation film is prevented. Here, source lines 2509 are mutually shorted at the initial stage in order to prevent damage due to static electricity.

In the present invention, a window 2512 is opened in this shorted section when forming the pattern of protective film 2511, and it is separated using the pattern of this protective film as a mask. Anti-static wiring is generally provided outside the display area. Meanwhile, the pattern of the protective film is for opening a window on the pixel electrodes. Consequently, even when the pattern of a protective film is formed for separating the anti-static wiring, it does not cause a negative effect in the display properties. By the present invention, it has become possible to reduce the number of processes and the cost.

Embodiment 21

Figure 26A:
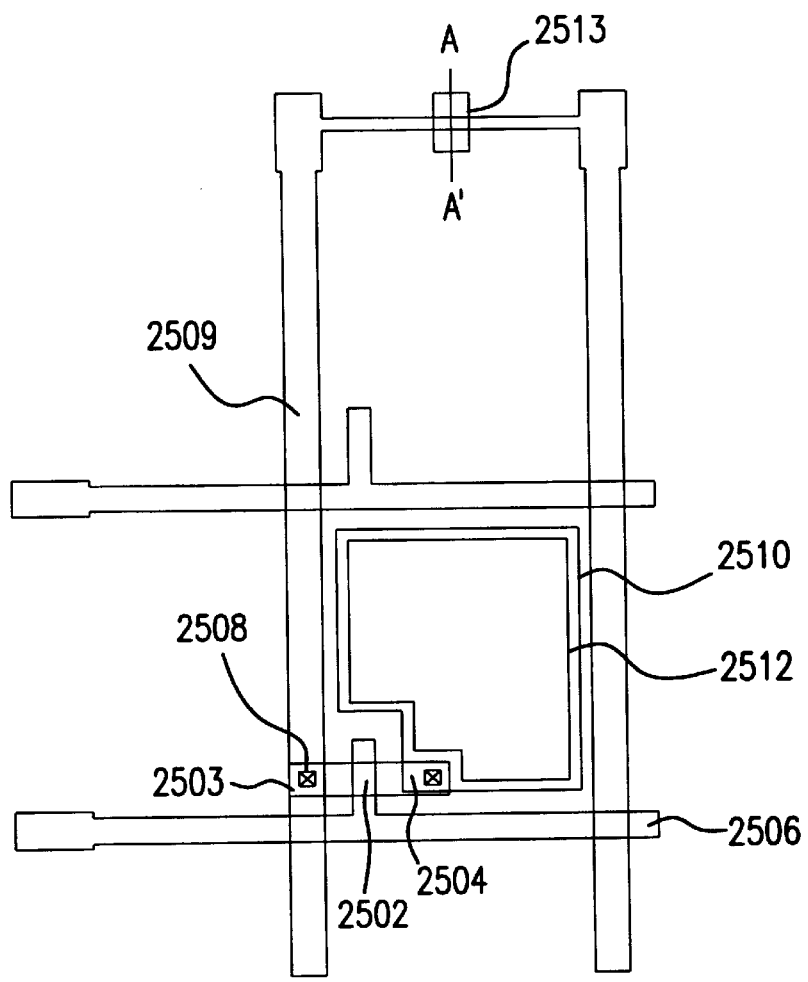
FIGS. 26a and 26b are a plain view and a structural cross-sectional view showing the structure of the twenty-first embodiment of the present invention.
Figure 26B:
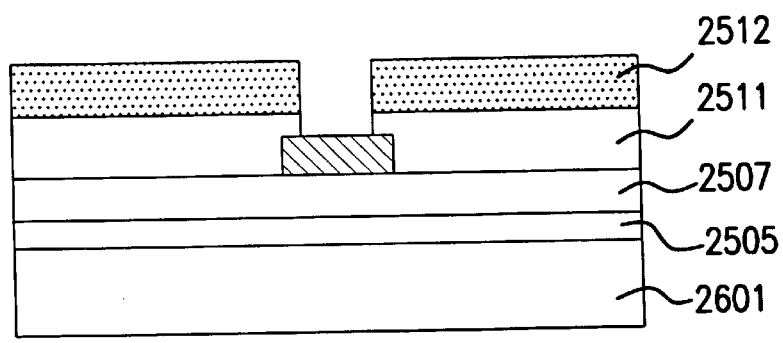

The twenty-first embodiment of the present invention is explained in detail using FIG. 26 and includes an active matrix liquid crystal display device having a protective film layer provided over pixel electrodes. A black matrix is provided on the upper layer, and etched to be self-aligning in relation to the pattern of the black matrix. Furthermore anti-static wiring formed over the lower part of the protective film is separated using the pattern as a mask. FIG. 26 is a plain view and structural cross-sectional view in the A–A' section of the plain view showing one example of the twenty-first embodiment.

Thin film transistors are provided over the inner side of thin film transistor substrate 2601. The thin film transistors comprise a channel region 2602, source region 2603, drain region 2604, gate insulation film 2605, gate line 2606, interlevel insulator film 2607, contact hole 2608, and source line 2609, and the like, and pixel electrodes 2610 driven by the thin film transistor, and having a transparent conductive film arranged in a stripe, mosaic, triangle or like pattern. An insulation film 2611 is formed over source lines 2609 as a protective film. However, this insulation film is removed on the top of pixel electrode 2610, and a window is opened. Thus, source lines 2609 can be protected, and a reduction of voltage applied to the liquid crystal due to the existence of this insulation film is prevented.

Furthermore, black matrix 2612 is formed over protective film 2611 in a pattern that blocks the light in the gap between pixel electrodes 2610. Here, protective film 2611 is etched to be self-aligning in relation to the pattern of black matrix 2612. Until the present, the patterns of protective film 2611 and black matrix 2612 were formed separately, and an increase in the number of processes and an increase of costs resulted. However, by the present invention, it is possible to reduce the number of masks, for example, by one sheet. Source lines 2609 are mutually shorted at the initial stage to prevent damage due to static electricity.

In the present invention, a window 2613 is opened in this shorted section when forming the pattern of black matrix 2612, protective film 2611 is etched using the pattern of this black matrix as a mask, and then the shorted section is separated. Anti-static wiring is generally provided outside the display area. Meanwhile, the pattern of a black matrix blocks light in the perimeter of the pixel electrodes. Consequently, even when the pattern of a black matrix is formed for the purpose of separating the anti-static wiring, it does not cause a negative influence in the display properties. Thus, it is possible to reduce the number of processes and the related cost.

Embodiment 22

Figure 27A:
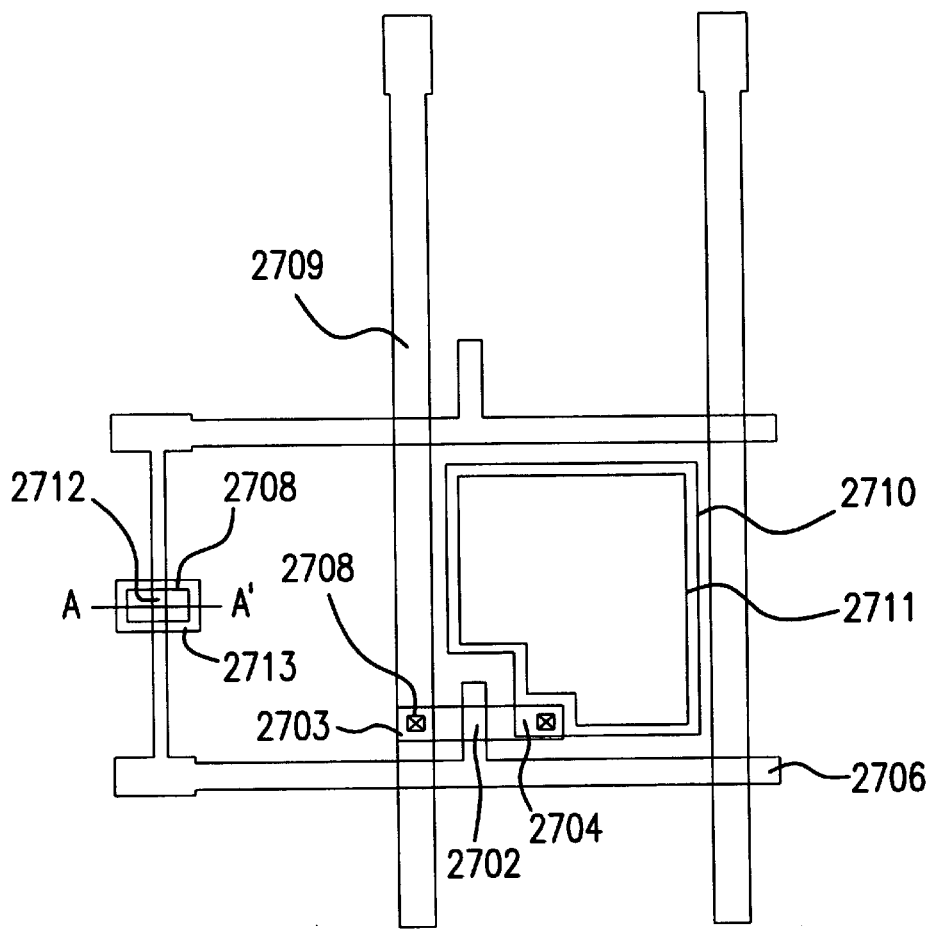
FIGS. 27a and 27b are is a plain view and a structural cross-sectional view showing the structure of the twenty-second embodiment of the present invention.
Figure 27B:
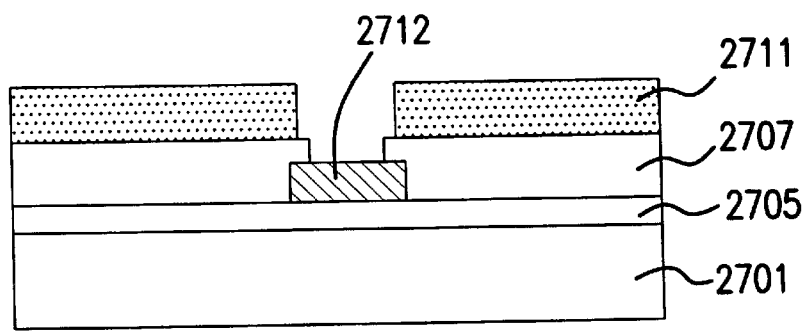

The twenty-second embodiment of the present invention is explained in detail using FIG. 27 and is an active matrix liquid crystal display device including anti-static wiring partially exposed in advance when opening a contact hole for connecting a source line or pixel electrode. The anti-static wiring is then separated using the pattern of a black matrix provided as a mask over the pixel electrode. FIG. 27 is a plain view and structural cross-sectional view in the A–A' section of the plain view showing one example of the twenty-second embodiment.

Thin film transistors are provided over the inner side of thin film transistor substrate 2701. The thin film transistors comprise a channel region 2702, source region 2703, drain region 2704, gate insulation film 2705, gate line 2706, interlevel insulator film 2707, contact hole 2708, and source line 2709, and the like, and pixel electrodes 2710 driven by the thin film transistor, and having a transparent conductive film arranged in a stripe, mosaic, triangle or like pattern. A black matrix 2711 is formed over pixel electrodes 2710 in a shape that blocks the light in the gap between the pixel electrodes 2710. Gate lines 2706 are mutually shorted at the initial stage in order to prevent damage due to static electricity.

In the present invention, a portion 2712 of the anti-static wiring formed with gate lines 2706, and the like, is exposed in advance when opening a contact hole, and a window 2713 is further opened when forming the pattern of black matrix 2711, and it is separated using the black matrix 2711 as a mask. An interlevel insulator film is generally formed over anti-static wiring formed with the gate lines 2706, and the like. Consequently, a part of the anti-static wiring should first be partially exposed when opening contact holes so that it can be easily separated. Also, anti-static wiring is generally provided outside the display area. Meanwhile, a black matrix blocks light in the perimeter of the pixel electrodes. Consequently, even when the pattern of a black matrix is formed for separating the anti-static wiring, it does not cause a negative influence in the display properties. Thus, it has become possible to reduce the number of processes and the related cost.

Embodiment 23

Figure 28A:
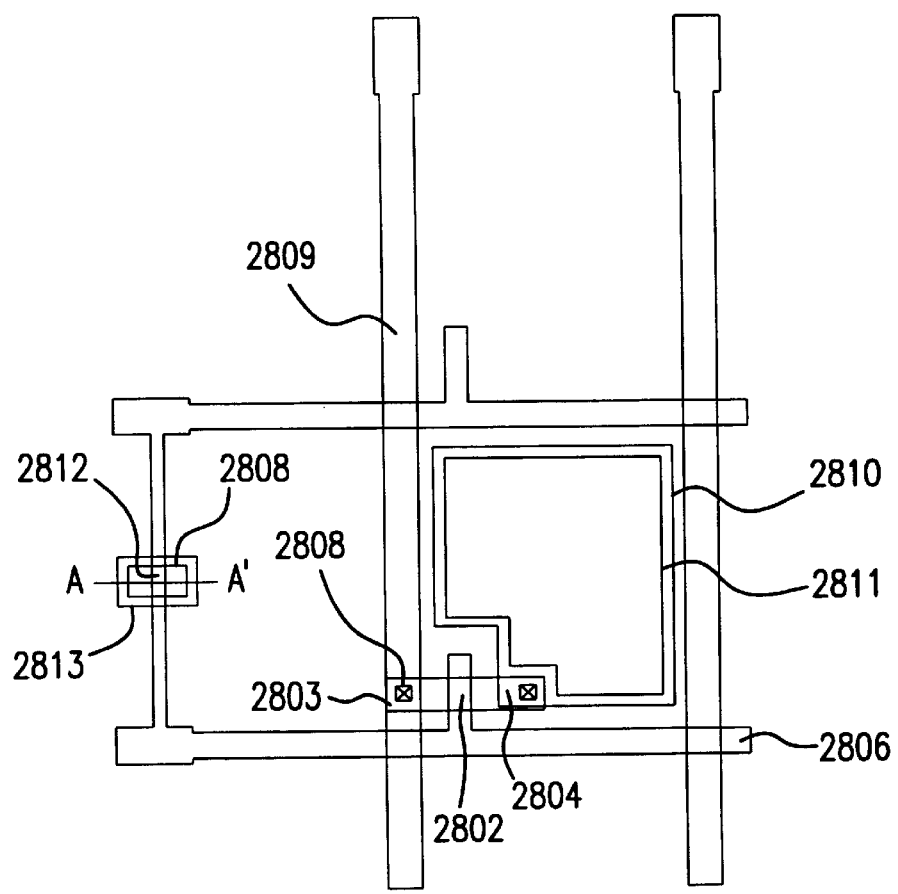
FIGS. 28a and 28b are a plain view and a structural cross-sectional view showing the structure of the twenty-third embodiment of the present invention.
Figure 28B:
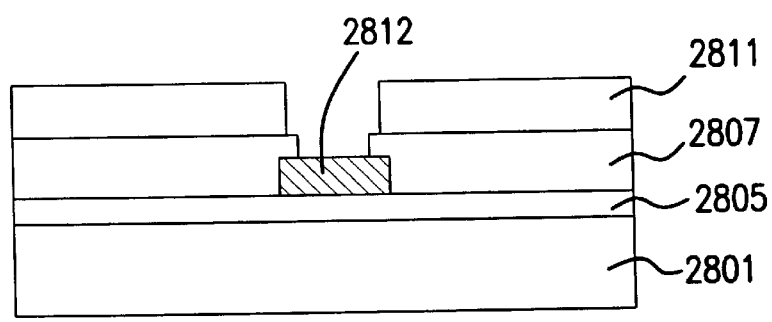

The twenty-third embodiment of the present invention is explained in detail using FIG. 28 and is an active matrix liquid crystal display device including anti-static wiring partially exposed in advance when opening a contact hole for connecting a source line or pixel electrode, then the anti-static wiring is separated using the pattern of a protective film provided over the pixel electrode as a mask. FIG. 28 is a plain view and structural cross-sectional view in the A–A' section of the plain view showing one example of the twenty-third embodiment.

Thin film transistors are provided over the inner side of thin film transistor substrate 2801. The thin film transistor comprises a channel region 2802, source region 2803, drain region 2804, gate insulation film 2805, gate line 2806, interlevel insulator film 2807, contact hole 2808, and source line 2809, and the like, and pixel electrodes 2810 driven by the thin film transistor, and having a transparent conductive film arranged in a stripe, mosaic, triangle or like pattern.

An insulation film 2811 is formed over source lines 2809 as a protective film. However, this insulation film is removed on the top of pixel electrodes 2811 and a window is opened. Thus, source lines 2809 can be protected, and reductions to the voltage applied to the liquid crystal due to the existence of this insulation film is prevented. Here, gate lines 2806 are mutually shorted at the initial stage to prevent damage due to static electricity.

In the present invention, a portion 2812 of the anti-static wiring formed with gate lines, and the like, is also exposed in advance when a contact hole is opened. A window 2813 is also opened in this portion when forming the pattern of protective film 2811, and is separated using the protective film 2811 as a mask. An interlevel insulator film is generally formed on anti-static wiring formed with the gate lines, and the like. Consequently, a part of the anti-static wiring should first be partially exposed when opening contact holes so that it can be separated without undue trouble. Also, anti-static wiring is generally provided outside the display area. Meanwhile, the pattern of protective film 2811 provides for opening a window on the pixel electrodes. Consequently, even when the pattern of protective film 2811 is formed for the purpose of separating the anti-static wiring, it does not cause a negative influence in the display properties. Thus, it is possible to reduce the number of processes and the related cost.

Embodiment 24

Figure 29A:
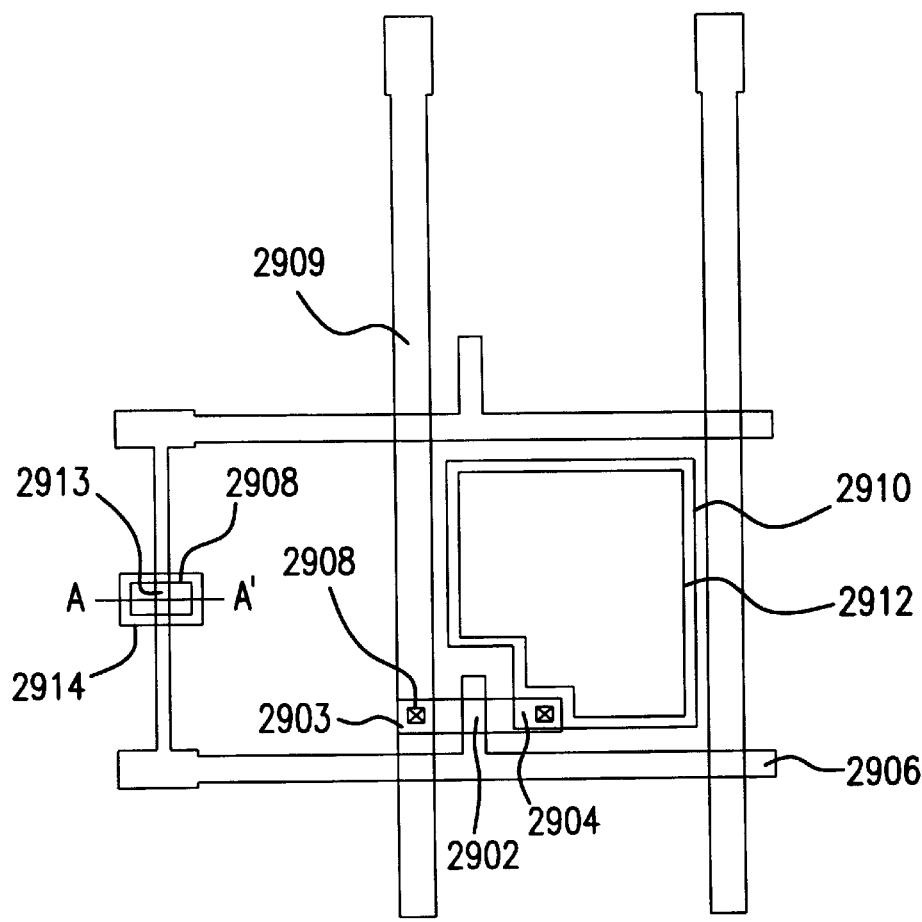
FIGS. 29a and 29b are a plain view and a structural cross-sectional view showing the structure of the twenty-fourth embodiment of the present invention.
Figure 29B:
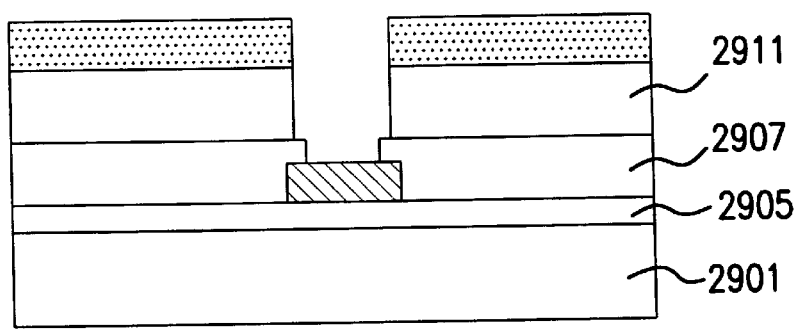
Figure 30A:
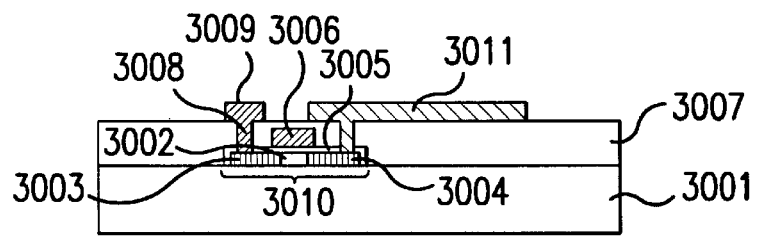
FIGS. 30a–30d are a process cross-sectional view showing the manufacturing method of the twenty-fifth embodiment of the present invention.
Figure 30B:
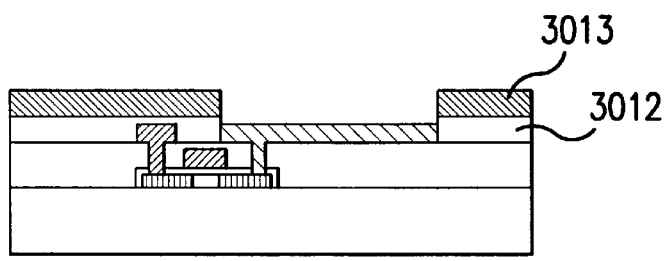
Figure 30C:
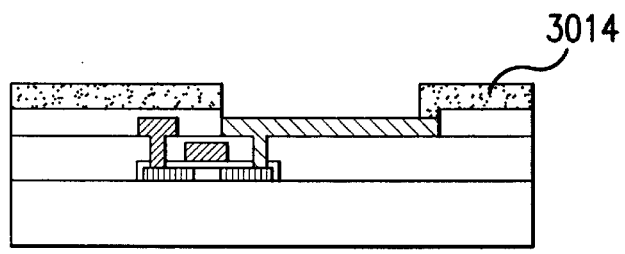
Figure 30D:
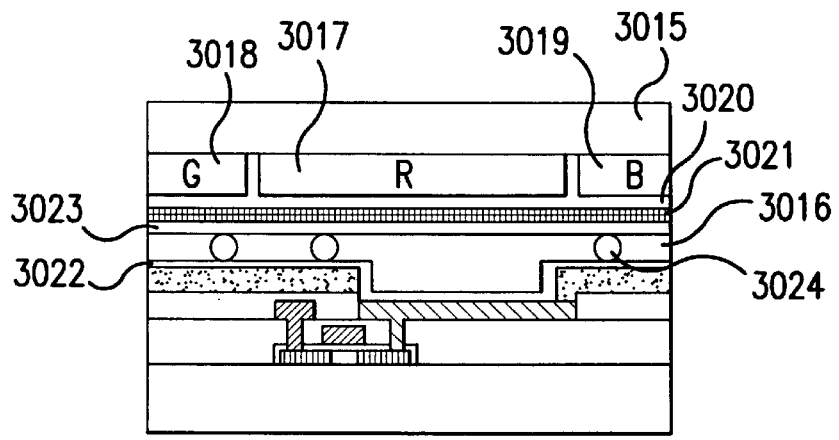

The twenty-fourth embodiment of the present invention is explained in detail using FIG. 29 as an active matrix liquid crystal display device including anti-static wiring partially exposed in advance when opening a contact hole for connecting a source line or pixel electrode, a protective film layer provided over the pixel electrodes, and a black matrix provided over the protective film layer. The protective film layer is etched so as to be self-aligning in relation to the pattern of the black matrix. Further, anti-static wiring formed over the lower part of the protection film layer is separated using that pattern as a mask. FIG. 29 is a plain view and structural cross-sectional view in the A–A' section of the plain view showing one example of the twenty-fourth embodiment.

Thin film transistors are provided over the inner side of thin film transistor substrate 2901. The thin film transistor comprises a channel region 2902, source region 2903, drain region 2904, gate insulation film 2905, gate line 2906, interlevel insulator film 2907, contact hole 2908, and source line 2909, and the like, and pixel electrodes 2910 driven by the thin film transistor, and having a transparent conductive film arranged in a stripe, mosaic, triangle or like pattern. An insulation film 2911 is formed over source lines 2909 as a protective film. However, this insulation film is removed on the top of pixel electrodes 2911 and a window is opened. Thus, source lines 2909 can be protected, and reductions in the voltage applied to the liquid crystal due to the existence of this insulation film is prevented. Furthermore, a black matrix 2912 is formed on protective film 2911 in a pattern that blocks the light in the gap between pixel electrodes 2910. Here, protective film 2911 is etched so as to be self-aligning in relation to the pattern of black matrix 2912.

The patterns of protective film 2911 and black matrix 2912 were previously formed separately, and an increase in the number of processes and an increase of costs resulted. However, by the present invention, it is possible to reduce the number of masks, for example, by one sheet. Gate lines 2906 are mutually shorted at the initial stage in order to prevent damage due to static electricity.

In the present invention, a portion 2913 of the anti-static wiring formed with gate lines, and the like, is exposed in advance when opening a contact hole, a window 2914 is further opened in this portion when forming the pattern of black matrix 2912, protective film 2911 is etched using this black matrix as a mask, and then the shorted portion is separated.

An interlevel insulator film is generally formed over anti-static wiring formed by the gate lines, and the like. Consequently, a part of the anti-static wiring should first be partially exposed when opening contact holes so that the wiring can be separated without undue trouble. Anti-static wiring is generally provided outside the display area.

The patterns of a black matrix and a protective film are formed for blocking the light in the perimeter of the pixel electrodes and for opening a window on the pixel electrodes. Consequently, even when the pattern of a black matrix is formed outside the display for the purpose of separating the anti-static wiring, it does not cause a negative influence in the display properties. Thus, it has become possible to reduce the number of processes and the cost.

Embodiment 25

The twenty-fifth embodiment of the present invention is explained in detail using FIG. 30 which is a process cross-sectional view showing one example of a manufacturing method of an active matrix liquid crystal display device having a protective film formed over the pixel electrodes of the thin film transistor substrate, and a black matrix further provided over the protective film.

Thin film transistors are provided over the inner side of thin film transistor substrate 3001. The thin film transistors 3010 comprise a channel region 3002, source region 3003, drain region 3004, gate insulation film 3005, gate line 3006, interlevel insulator film 3007, contact hole 3008, and source line 3009, and the like, and pixel electrodes 3011 driven by the thing film transistor, and formed by a transparent conductive film arranged in a stripe, mosaic, triangle or like pattern. (Refer to FIG. 30(a))

Next, an insulation film 3012 is formed over source lines 3009 as a protective film. A resist pattern 3013 is further formed over the insulation film 3012 using photolithography technology, and the like, and the insulation film 3012 on pixel electrodes 3011 is removed. By this, source lines 3009 can be protected, and the reduction of voltage applied to the liquid crystal due to the existence of this insulation film is prevented. (Refer to FIG. 30(b))

After this, resist pattern 3013 is eliminated, and black matrix 3014 is formed in a shape that blocks the light in the gap between pixel electrodes 3011. (Refer to FIG. 30(c))

As a black matrix material, a dye distributed black resist, or the like, for example, having a red, green, blue or like dye distributed in the resist, can be used. As the dye that is distributed in the resist, there is no particular limitation. However, as a red dye, for example, dyes of perylene, anthraquinone, dianthraquinone, azo, diazo, quinacridone, anthracene, and like dyes can be used. Also, as a green dye, halogenated phthalocyanine and like dyes can be used. Also, as a blue dye, metallic phthalocyanine, indanthrone, indophenol, and like dyes can be used. In addition to these, purple, yellow, cyanine, and magenta dyes, and the like, can be used in combination.

The black resist of the present embodiment may be positive or negative. As a negative resist, for example, those composed of solvents (ethyl-3-ethoxypropionate, methoxypropyl acetate, cyclohexane, 3-methoxybutyl acetate, and the like), resins (methacrylic resin, and the like), and monomers (polyfunctional acrylic monomers, and the like) can be considered.

The black matrix having the thickness, for example, of about 1.3 $\mu$m–2.0 $\mu$m can be considered. In the past, this black matrix was formed by a light-blocking film made of chrome, or the like. Therefore, there were such problems as cracks being caused by stress, and glare being caused by reflection of the chrome, and the like. However, in the present embodiment, because the black matrix is formed by an insulation film having a dye added, there is no occurrence of such cracking and glare.

Also, according to the present embodiment, because there is no problem of the occurrence of a parasitic capacitance between the pixel electrode and the gate line, degradation of image quality, and the like, can be prevented.

Thin film transistor substrate 3001 is matched with opposing substrate 3015, and liquid crystal 3016 is interposed between them. (Refer to FIG. 30(d))

On opposing substrate 3015 are formed red, green, and blue color filter sections 3017, 3018, and 3019, formed by gelatin dyed with red, green, and blue color. As a dyeing medium, casein, fish glue, polyvinyl alcohol, polyvinyl providone, polyvinyl alcohol, polyimide, polyamide, polyurea, polyurethane, polycinnamic acid, acrylic resin, and their derivatives, and the like, can be used in addition to gelatin. Also, as a dye solution, acidic dyes and reactive dyes, and the like, can be used. As a red dye solution, for example, a combination of mealing red RS (manufactured by Nippon Kayaku), acetic acid and water can be used. As a green dye solution, for example, a combination of blue (manufactured by Hoechst), yellow MR (manufactured by Sumitomo Chemical), acetic acid and water can be used. As a blue dye solution, for example, a combination of cyanine 6B (manufactured by Nippon Kayaku), acetic acid and water can be used. However, dye solutions Are not limited to these combinations. There are various methods of forming a color filter by a dyeing method. Generally, a red colored layer is formed, for example, by patterning a dyeing medium of light exposure and developing, and then soaking in a red dye solution. Blue and green colored layers are similarly formed.

Over the color filter sections 3017–3019 are formed a protective insulation film 3020 and opposing electrodes 3021 composed of a transparent conductive film. Alignment films 3022 and 3023 are formed over pixel electrodes 3011 and over opposing electrodes 3021, and they are applied with rubbing processing. The distance between pixel electrode and opposing electrode is generally called a cell gap, and it is a parameter that greatly controls the optical properties. This cell gap deviates more easily as the liquid crystal panel becomes larger. Therefore, uniformity is maintained in a large liquid crystal panel by using a gap member (spacer) 3024.

According to the present invention, by forming a protective film layer between the pixel electrodes and the black matrix, the image quality is no longer influenced even when the specific resistance of the black matrix is low. Also, when using a dye distribution black resist as the black matrix material, as in the present embodiment, Na contamination, and the like, from the dye, and the like, can be prevented by the protective film layer.

The thin film transistors in the present embodiment have a coplanar structure. However, even when this is, for example, a staggered structure or a reverse-staggered structure, the main principle of the present invention is maintained.

In the present invention, whether the thin film transistors are polycrystalline silicon thin film transistors, or whether they are amorphous silicon thin film transistors, the main principle of the present invention is still maintained.

Further, even when the thin film transistors are polycrystalline silicon thin film transistors formed by a process at or below 600° C., the main principle of the present invention is maintained.

In addition, even when the thin film transistors are polycrystalline silicon thin film transistors formed by a process at or below 450° C., the main principle of the present invention is maintained.

Embodiment 26

Figure 31A:
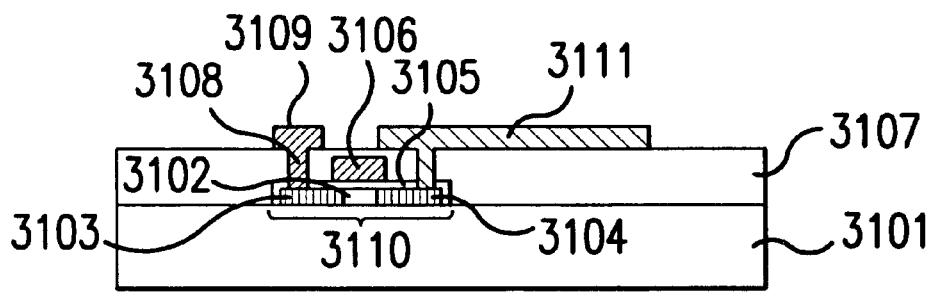
FIGS. 31a–31c are a process cross-sectional view showing the manufacturing method of the twenty-sixth embodiment of the present invention.
Figure 31B:
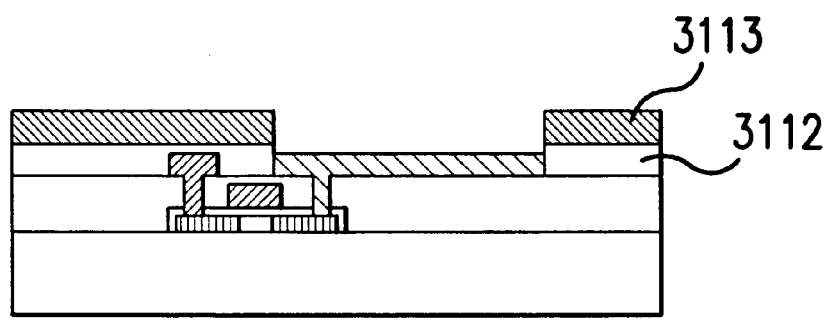
Figure 31C:
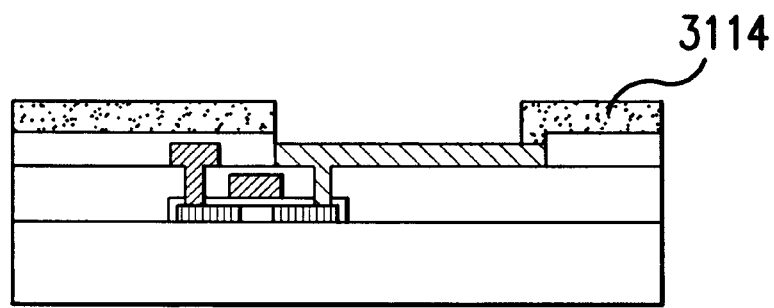

The twenty-sixth embodiment of the present invention is explained in detail using FIG. 31 and shows one example of a manufacturing method of an active matrix liquid crystal display device including a protective film formed over the pixel electrodes of the thin film transistor substrate, and a black matrix provided over the protective film layer, in the same manner as the twenty-fifth embodiment. The difference with the twenty-fifth embodiment is in the point that a black resist, or the like, using at least carbon as the light-blocking material is used for the black matrix material.

Accordingly, in FIG. 31, a process cross-sectional view of only the thin film transistor substrate is shown, and the drawing of the opposing substrate or liquid crystal element portion is omitted.

Thin film transistors 3101 are provided over the inner side of thin film transistor substrate 3101. The thin film transistors 3110, comprise a channel region 3102, source region 3103, drain region 3104, gate insulation film 3105, gate line 3106, interlevel insulator film 3107, contact hole 3108, and source line 3109, and the like, and pixel electrodes 3111 driven by the thin film transistor, and having a transparent conductive film arranged in a stripe, mosaic, triangle or like pattern. (Refer to FIG. 31(a))

Next, an insulation film 3112 is formed over source lines 3109 as a protective film. A resist pattern 3113 is further formed over the insulation film 3112 using photolithography technology, and the like, and the insulation film 3112 over pixel electrodes 3111 is removed. By this, source lines 3109 can be protected, and in addition, the situation in which the voltage applied to the liquid crystal is reduced due to the existence of this insulation film can be prevented. (Refer to FIG. 31(b))

After this, resist pattern 3113 is eliminated, and black matrix 3114 is formed in a shape that blocks the light in the gap between pixel electrodes 3111. (Refer to FIG. 31(c))

As a black matrix material, for example, a dye distributed black resist, or the like, having a red, green, blue or like dye and carbon distributed in the resist can be used. Because the dyes distributed in the resist are already explained in Embodiment 25 in regard to solvents, and the like, they are omitted here.

Because a black resist having carbon added is superior in light-blocking properties, the film thickness of the black matrix can be made thinner, for example, it can be a thin film as thin as 0.5 µm. Consequently, the alignment defects described above can be reduced.

Up to the present, black resists having added carbon had the problem of an extremely low specific resistance, as low as $10^6$ Ωcm. However, according to the present invention, this defect has been overcome by forming a protective film layer between the pixel electrodes and the black matrix. Also, Na contamination, and the like, from the dye, and the like, can be prevented by the protective film layer.

The optimal amount of carbon added in the black resist differs for each panel. However, regardless of the value, the main principle of the present invention is maintained. Generally an amount greater than or equal to 50% by weight, for example, in regard to the light-blocking elements within the black resist, is desirable. An amount greater than or equal to 80% by weight is more desirable, and 100% by weight is ideal.

Embodiment 27

Figure 32A:
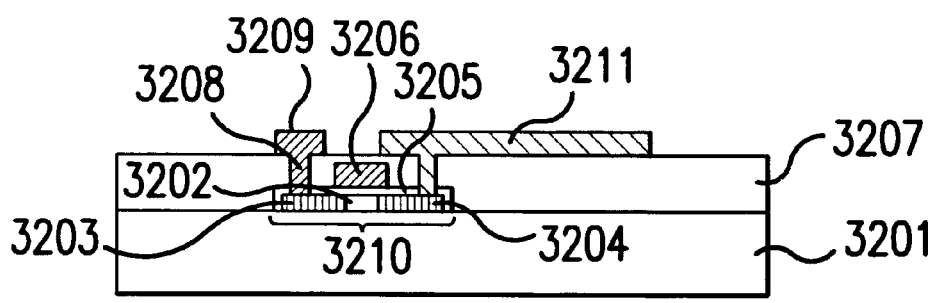
FIGS. 32a–32c are a process cross-sectional view showing the manufacturing method of the twenty-seventh embodiment of the present invention.
Figure 32B:
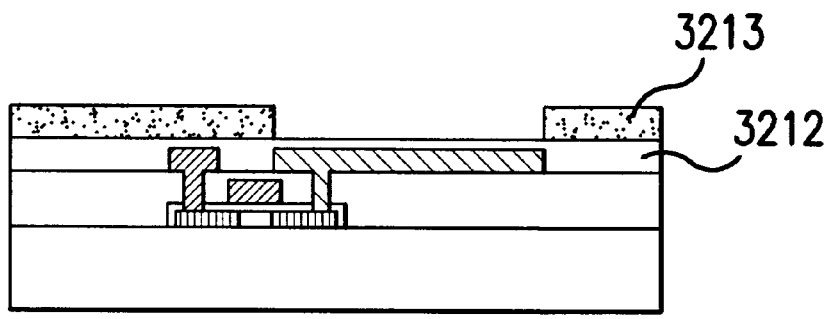
Figure 32C:
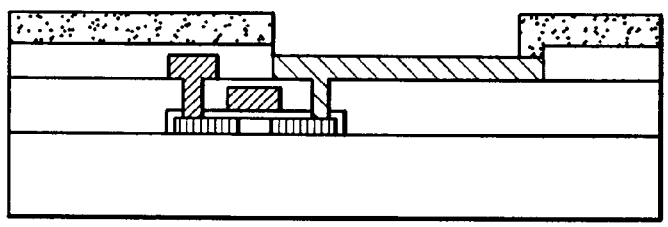

The twenty-seventh embodiment of the present invention is explained in detail using FIG. 32 and shows one example of a manufacturing method of an active matrix liquid crystal display device including a protective film formed over the pixel electrodes of the thin film transistor substrate, and a black matrix provided over the protection film, in the same manner as the twenty-fifth embodiment. The difference with the twenty-fifth embodiment is in the point that the protective film layer is etched so as to be self-aligning in relation to the pattern of the black matrix. Accordingly, in FIG. 32, a process cross-sectional view only of the thin film transistor substrate is shown, and the drawing of the opposing substrate or liquid crystal element portion is omitted.

Thin film transistors are provided are over the inner side of thin film transistor substrate 3201. The thin film transistors 3210 comprise a channel region 3202, source region 3203, drain region 3204, gate insulation film 3205, gate line 3206, interlevel insulator film 3207, contact hole 3208, and source line 3209, and the like, and pixel electrodes 3211 driven by the thin film transistor, and formed by a transparent conductive film arranged in a stripe, mosaic, triangle or like pattern. (Refer to FIG. 32(a))

Next, an insulation film 3212 is formed over source lines 3209 as a protective film. A black matrix 3213 is further formed over the insulation film 3212 in a shape that blocks the light in the gap between pixel electrodes 3211. (Refer to FIG. 32(b))

After this, the protective film 3212 is etched to be self-aligning in relation to the pattern of black matrix 3213. Thus, source line 3209 can be protected, and deterioration of the voltage applied to the liquid crystal due to the existence of this insulation film can be prevented. (Refer to FIG. 32(c))

Until the present, the patterns of protective film 3212 and black matrix 3213 were formed separately, and an increase in the number of processes and an increase of costs were caused by this. However, by the present invention, it has become possible to reduce the number of masks, for example, by one sheet.

As a black matrix material, for example, a dye distributed black resist, or the like, having a red, green, blue or like dye distributed in the resist, and one further having carbon added to these, can be used. Because the dyes distributed in the resist are already explained in Embodiment 25 and Embodiment 26 in regard to solvents, and the like, they are omitted here.

Embodiment 28

Figure 33A:
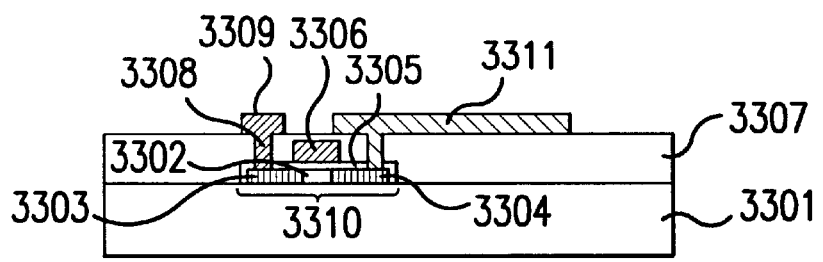
FIGS. 33a–33c are a process cross-sectional view showing the manufacturing method of the twenty-eighth embodiment of the present invention.
Figure 33B:
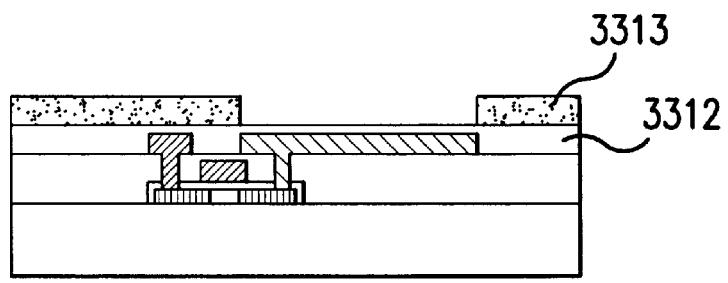
Figure 33C:
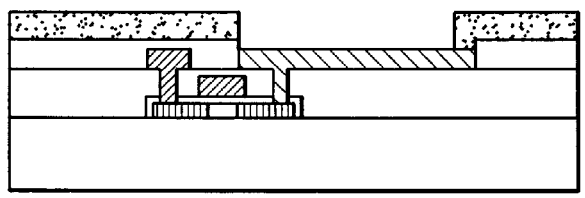

The twenty-eighth embodiment of the present invention is explained in detail using FIGS. 33a–33c and show one example of a manufacturing method of an active matrix liquid crystal display device having a protective film layer formed over the pixel electrodes of the thin film transistor substrate, and further having a black matrix provided over the protection film layer. The protective film layer is etched to be self-aligning in relation to the pattern of the black matrix, in the same manner as the twenty-seventh embodiment. The difference with the twenty-seventh embodiment is that the etching of the protective film layer is performed by an anisotropic etching method. Accordingly, in FIGS. 33a–33c, a process cross-sectional view only of the thin film transistor substrate is shown, and the drawing of the opposing substrate or liquid crystal element portion is omitted.

A thin film transistor is provided over the inner side of thin film transistor substrate 3301. The thin film transistor 3310 comprises a channel region 3302, source region 3303, drain region 3304, gate insulation film 3305, gate line 3306, interlevel insulator film 3307, contact hole 3308, and source line 3309, and the like, and a pixel electrode 3311 driven by the thin film transistor, and having a transparent conductive film arranged in a stripe, mosaic, triangle or like pattern. (Refer to FIG. 33(a))

Next, an insulation film 3312 is formed over source lines 3309 as a protective film. A black matrix 3313 is further formed over protective film 3312 in a shape that blocks the light in the gap between pixel electrodes 3311. (Refer to FIG. 33(b))

Next, the protective film 3312 is etched, for example, by RIE using CHF3 gas, and the like, so as to be self-aligning in relation to the pattern of black matrix 3313. Thus, source line 3309 is protected, and a reduction of the voltage applied to the liquid crystal due to the existence of this insulation film is prevented. (Refer to FIG. 33(c))

Until the present, the patterns of protective film 3312 and black matrix 3313 were formed separately causing an increase in the number of processes and a subsequent increase of costs. However, by the present invention, it has become possible to reduce the number of masks, for example, by one sheet.

Figure 34:
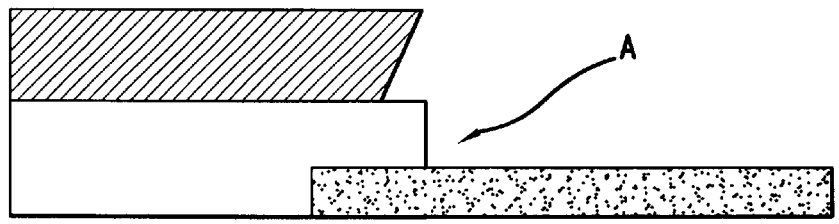
FIG. 34 is a drawing showing one example of the processed shape of a black resist in the twenty-eighth embodiment of the present invention.
Figure 35A:
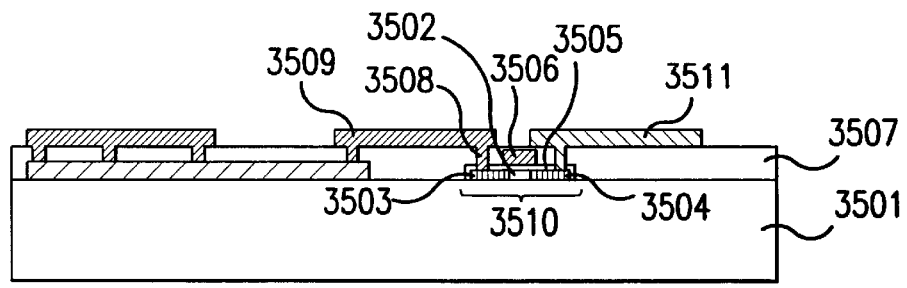
FIGS. 35a–35d are a process cross-sectional view showing the manufacturing method of the twenty-ninth embodiment of the present invention.
Figure 35B:
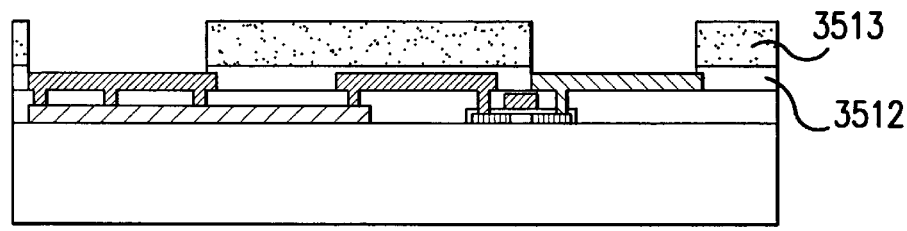
Figure 35C:
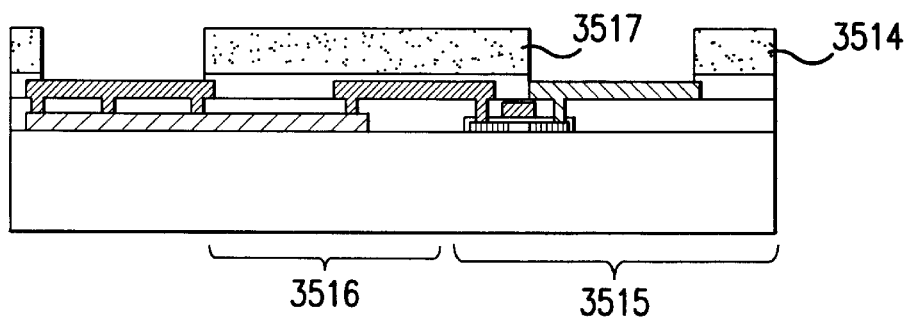
Figure 35D:
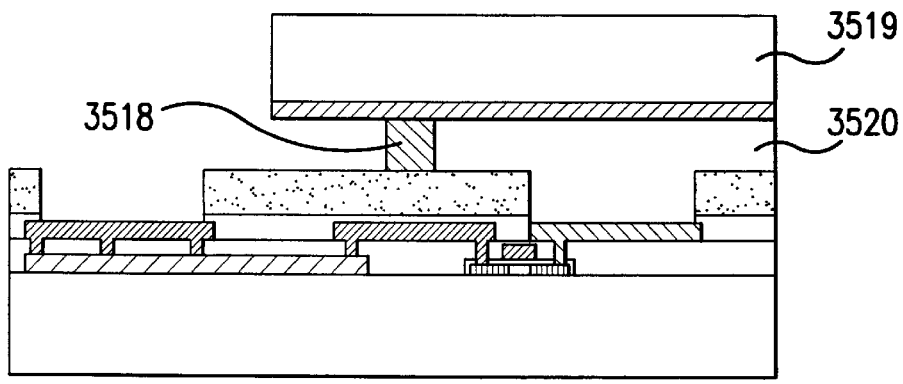
Figure 36A:
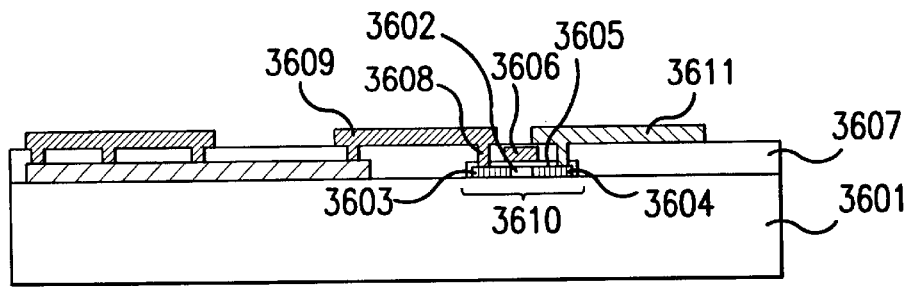
FIGS. 36a–36d are a process cross-sectional view showing the manufacturing method of the thirtieth embodiment of the present invention.
Figure 36B:
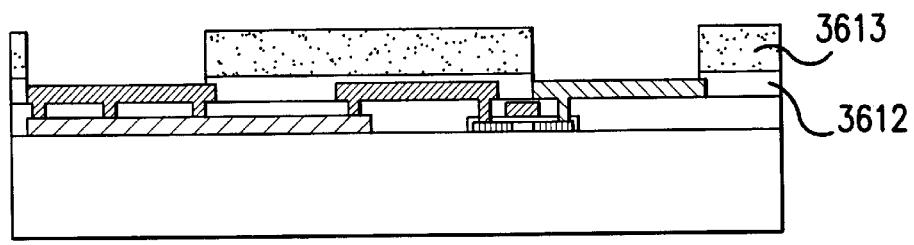
Figure 36C:
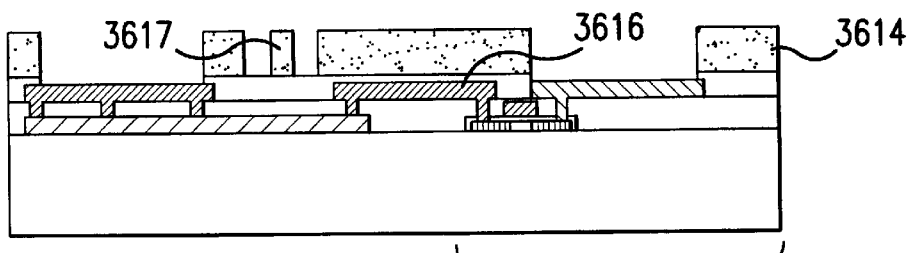
Figure 36D:
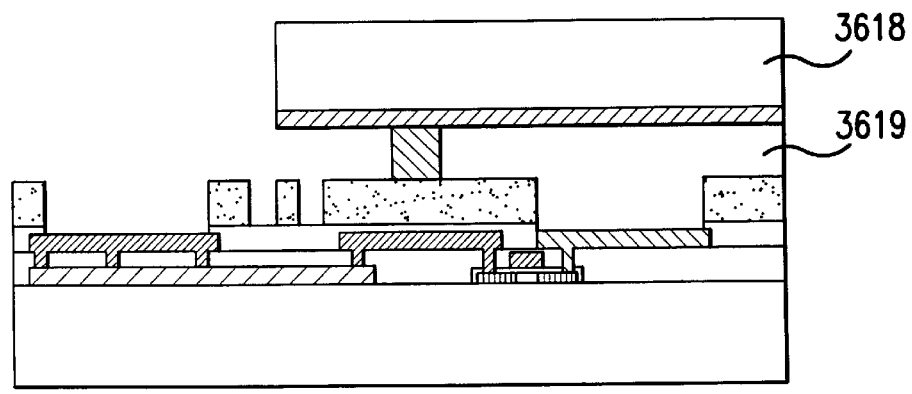
Figure 37A:
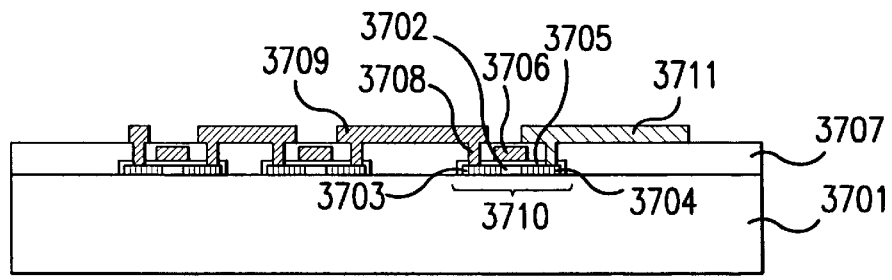
FIGS. 37a–37d are a process cross-sectional view showing the manufacturing method of the thirty-first embodiment of the present invention.
Figure 37B:
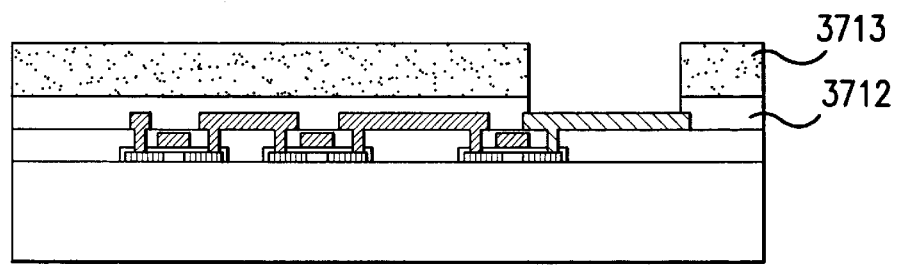
Figure 37C:
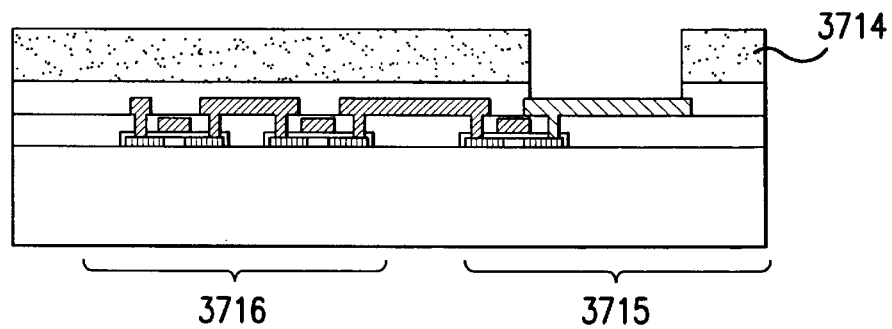
Figure 37D:
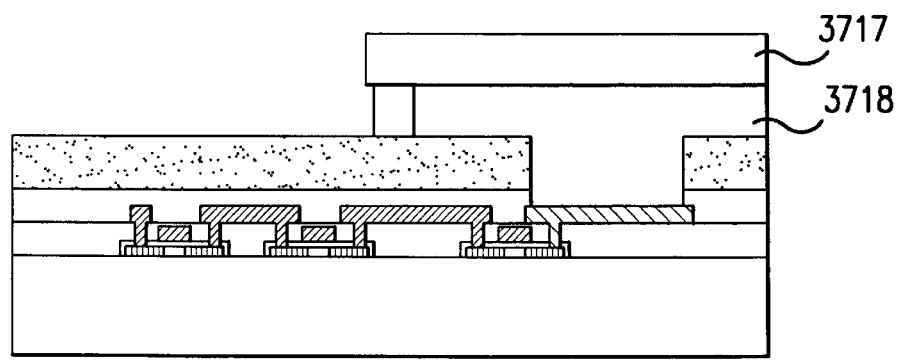
Figure 38A:
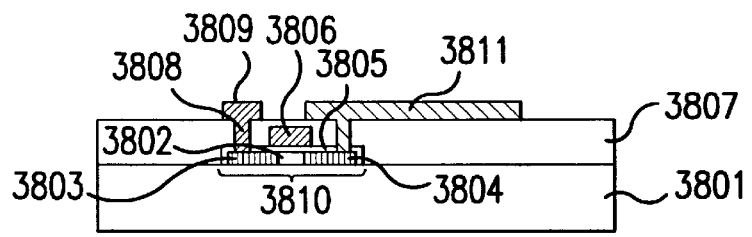
FIGS. 38a–38d are a process cross-sectional view showing the manufacturing method of the thirty-second embodiment of the present invention.
Figure 38B:
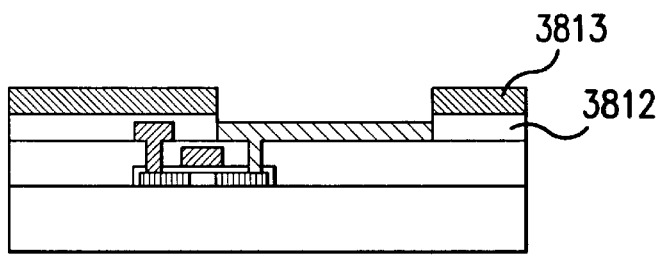
Figure 38C:
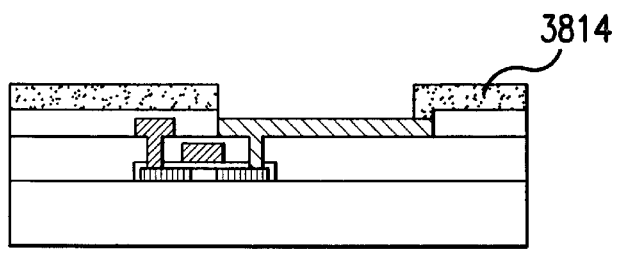
Figure 38D:
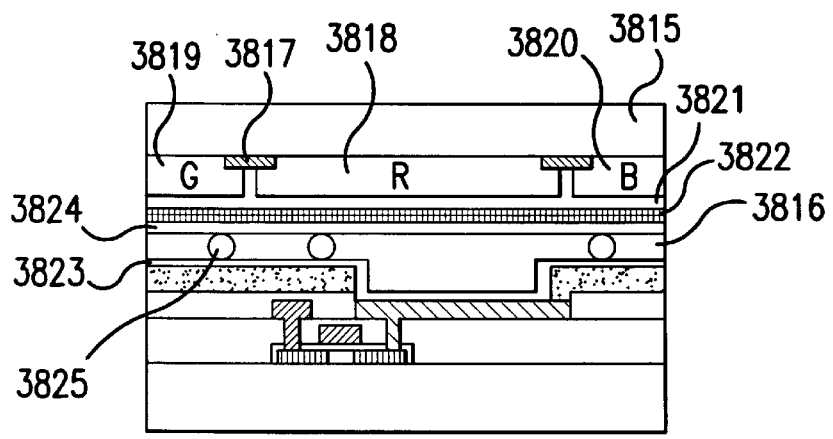
Figure 39A:
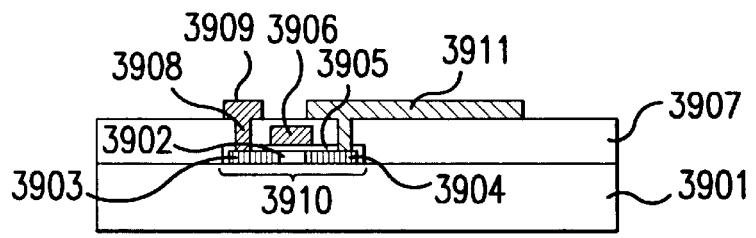
FIGS. 39a–39d are a process cross-sectional view showing the manufacturing method of the thirty-third embodiment of the present invention.
Figure 39B:
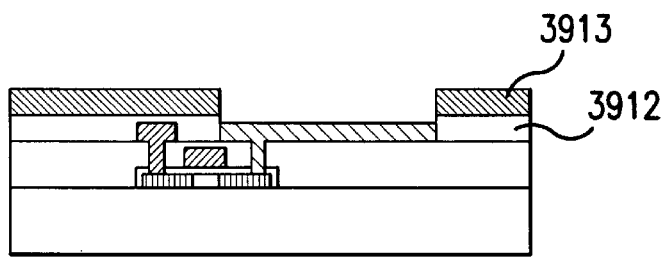
Figure 39C:
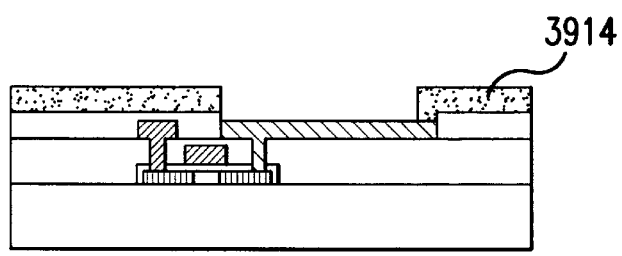
Figure 39D:
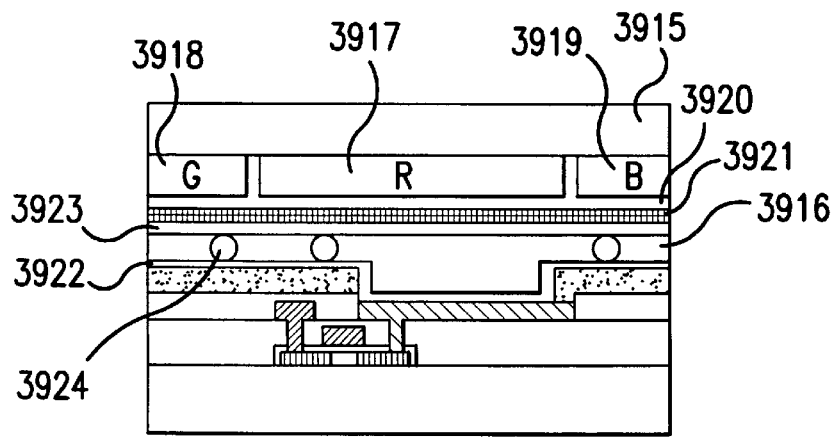

Furthermore, the cross-sectional configuration of the perimeter portion of the black resist when using the present invention is shown in FIG. 34. However, because the portion at point A of FIG. 34 is not in an overhang structure as it is in the past, rubbing defects tend not to occur. Thus, alignment defects can be reduced, and yield can be improved.

In the present embodiment, RIE using CHF3 was proposed as a method of anisotropic etching, but even when using an etching gas other than CHF3 gas, the main principle of the present invention is maintained. Also, even if an etching method other than RIE is used, for example, an ion mixing method, or the like, the main principle of the present invention is still maintained.

Embodiment 29

The twenty-ninth embodiment of the present invention is explained in detail using FIG. 35 and shows an example of a manufacturing method of an active matrix liquid crystal display device having the pattern of a black matrix provided over a seal section.

A thin film transistor 3510 is provided over the inner side of thin film transistor substrate 3501. The thin film transistor 3510 comprises a channel region 3502, source region 3503, drain region 3504, gate insulation film 3505, gate line 3506, interlevel insulator film 3507, contact hole 3508, and source line 3509, and the like, and a pixel electrode 3511 driven by the thin film transistor, having a transparent conductive film arranged in a stripe, mosaic, triangle or like pattern. (Refer to FIG. 35(a))

Next, an insulation film 3512 is formed over source lines 3509 as a protective film. A resist pattern 3513 is further formed over the insulation film 3512 using photolithography technology, and the like, and the insulation film 3512 on pixel electrodes 3511 is removed. By this, source lines 3509 can be protected, and a reduction in the voltage applied to the liquid crystal due to the existence of this insulation film can be prevented. (Refer to FIG. 35(b))

Resist pattern 3513 is then removed, and a black matrix 3514 is formed in a shape that blocks the light in the gap between pixel electrodes 3511. In the past a black matrix was formed over the side of the thin film transistor substrate only in the display region 3515. By making the black matrix 3514 cover at least the seal section 3516 as well, the pattern of the black matrix 3514 becomes a part of the protective film of the seal section, thus it contributes to the improvement in reliability. Also, even when the protective film is etched using the pattern of the black matrix as a mask, as explained in Embodiment 27, there is no exposing of the wiring 3517 across the seal section. (Refer to FIG. 35(c))

Next, a sealant 3518 is formed over the seal section, and thin film transistor substrate 3501 is matched with opposing substrate 3519. Then, liquid crystal 3520 is interposed between thin film transistor substrate 3501 and opposing substrate 3519, and the active matrix liquid crystal display device is completed. (Refer to FIG. 35(d))

Embodiment 30

The thirtieth embodiment of the present invention is explained in detail using FIG. 36, and shows an example of a manufacturing method of an active matrix liquid crystal display device wherein the pattern to be a guide is formed by the black matrix when matching the thin film transistor substrate and the opposing substrate.

A thin film transistor 3610 is provided over the inner side of thin film transistor substrate 3601. The thin film transistor 3610 comprises a channel region 3602, source region 3603, drain region 3604, gate insulation film 3605, gate line 3606, interlevel insulator film 3607, contact hole 3608, and source line 3609, and the like, and a pixel electrode 3611 driven by the above and having a transparent conductive film arranged in a stripe, mosaic, triangle or like pattern. (Refer to FIG. 36(a))

Next, an insulation film 3612 is formed over source lines 3609 as a protective film. A resist pattern 3613 is further formed over the insulation film 3612 using photolithography technology, and the like, and the insulation film 3612 over pixel electrodes 3611 is removed. By this, source lines 3609 can be protected, and a reduction in the voltage applied to the liquid crystal due to the existence of this insulation film can be prevented. (Refer to FIG. 36(b))

After this, resist pattern 3613 is removed, and a black matrix 3614 is formed in a shape that blocks the light in the gap between pixel electrodes 3611. In the past, a black matrix was formed over the side of the thin film transistor substrate only in the display region 3515. By making the pattern of the black matrix cover the entire panel, the pattern of the black matrix 3614 becomes a part of the protective film, and it contributes to the improvement in reliability.

When etching the protective film using the pattern of the black matrix as a mask, as explained in Embodiment 27, there is no exposing of the wiring 3616 across the seal section. However, aligning the thin film transistor substrate and the opposing substrate becomes difficult. This problem is solved by providing a pattern 3617 as a guide according to the pattern of the black matrix. (Refer to FIG. 36(c))

Next, thin film transistor substrate 3601 is matched with opposing substrate 3618 based on the guide 3617 formed by the pattern of the black matrix. Following that, liquid crystal 3619 is interposed between thin film transistor substrate 3601 and opposing substrate 3618, and the active matrix liquid crystal display device is completed. (Refer to FIG. 36(d))

Embodiment 31

The thirty-first embodiment of the present invention is explained in detail using FIG. 37 and shows an example of a manufacturing method of an active matrix liquid crystal display device having a driver installed inside, with the pattern of the black matrix provided on the driver section.

Thin film transistors are provided over the inner side of thin film transistor substrate 3701. The thin film transistors 3710 comprise a channel region 3702, source region 3703, drain region 3704, gate insulation film 3705, gate line 3706, interlevel insulator film 3707, contact hole 3708, and source line 3709, and the like, and pixel electrodes 3711 driven by the thin film transistor, and having a transparent conductive film arranged in a stripe, mosaic, triangle or like pattern. (Refer to FIG. 37(a))

Next, an insulation film 3712 is formed over source lines 3709 as a protective film. A resist pattern 3713 is further formed over the insulation film 3712 using photolithography technology, and the like, and the insulation film 3712 on pixel electrodes 3711 is removed. Thus, source lines 3709 can be protected, and a reduction in the voltage applied to the liquid crystal due to the existence of this insulation film can be prevented. (Refer to FIG. 37(b))

After this, resist pattern 3713 is removed, and a black matrix 3714 is formed in a shape that blocks the light in the gap between pixel electrodes 3711. In the past, a black matrix was formed over the side of the thin film transistor substrate, only in the display region 3715. By making the black matrix 3714 cover at least the built-in driver section 3716 as well, the pattern of the black matrix 3714 becomes a part of the protective film of the built-in driver section, and improves reliability. Also, even when the protective film is etched over the lower layer with the pattern of the black matrix as a mask, as explained in Embodiment 27, there is no exposing of the wiring 3716 across the built-in driver section. (Refer to FIG. 37(c))

Next, thin film transistor substrate 3701 is matched with opposing substrate 3717. Then, liquid crystal 3718 is interposed between thin film transistor substrate 3701 and opposing substrate 3717, and the active matrix liquid crystal display device is completed. (Refer to FIG. 37(d))

Embodiment 32

The thirty-second embodiment of the present invention is explained in detail using FIG. 38 and is a manufacturing method of an active matrix liquid crystal display device having an ultraviolet light-blocking layer formed over the thin film transistors, thus intending to prevent the degradation of properties. FIG. 38 is a process cross-sectional view showing one example of the thirty-second embodiment.

A thin film transistor 3810 is provided over the inner side of thin film transistor substrate 3801. The thin film transistor 3810 comprises a channel region 3802, source region 3803, drain region 3804, gate insulation film 3805, gate line 3806, interlevel insulator film 3807, contact hole 3808, and source line 3809, and the like, and pixel electrodes 3811 driven by the thin film transistor 3810, and having a transparent conductive film arranged in a stripe, mosaic, triangle or like pattern. (Refer to FIG. 38(a))

Next, an insulation film 3812 is formed over source lines 3809 as a protective film. A resist pattern 3813 is further formed on this using photolithography technology, and the like, and the insulation film 3812 on pixel electrodes 3811 is removed. Thus, source lines 3809 can be protected, and a reduction in the voltage applied to the liquid crystal due to the existence of this insulation film can be prevented. (Refer to FIG. 38(b))

Resist pattern 3813 is then removed and an ultraviolet light-blocking layer 3814 is formed in a shape that covers thin film transistor 3810. According to the present embodiment, the strength of ultraviolet radiation to which the thin film transistor is exposed can be reduced to a great extent by the ultraviolet light-blocking layer, and thus reliability can be improved. (Refer to FIG. 38(c))

Next, thin film transistor substrate 3801 is matched with opposing substrate 3815, and liquid crystal 3816 is interposed between them. On opposing substrate 3815 are formed a black matrix 3817 having a light-blocking film such as chromium oxide, and red, green, and blue color filter sections 3818, 3819, 3820 formed by gelatin dyed with red, green, and blue color.

A protective insulation film 3821 and opposing electrodes 3822 having a transparent conductive film are formed over the color filter sections 3818–3820. Alignment film 3823 and 3824 are formed over pixel electrode 3811 and opposing electrodes 3822, and applied with rubbing processing.

The distance between pixel electrode and opposing electrode is generally called a cell gap, and it is a parameter that greatly controls optical properties. This cell gap deviates more easily as the liquid crystal panel becomes larger. Therefore, uniformity is maintained in a large liquid crystal panel by using a gap member or spacer 3825. (Refer to FIG. 38(d))

Embodiment 33

The thirty-third embodiment of the present invention is explained in detail using FIG. 39 and is a manufacturing method of an active matrix liquid crystal display device having an ultraviolet light-blocking layer formed over thin film transistors intending to prevent the degradation of properties in the same manner as the thirty-second embodiment. The difference with the thirty-second embodiment is that the black matrix serves as the ultraviolet light-blocking layer. FIG. 39 is a process cross-sectional view showing one example of the thirty-third embodiment.

A thin film transistor is provided over the inner side of thin film transistor substrate 3901. The thin film transistor 3910 comprises a channel region 3902, source region 3903, drain region 3904, gate insulation film 3905, gate line 3906, interlevel insulator film 3907, contact hole 3908, and source line 3909, and the like, and a pixel electrode 3911 driven by the thin film transistor 3900 and having a transparent conductive film arranged in a stripe, mosaic, triangle or like pattern. (Refer to FIG. 39(a))

Next, an insulation film 3912 is formed over source line 3909 as a protective film. A resist pattern 3913 is further formed over this using photolithography technology, and the like, and the insulation film 3912 on pixel electrodes 3911 is removed. Thus, source lines 3909 can be protected, and a reduction in the voltage applied to the liquid crystal due to the existence of this insulation film can be prevented. (Refer to FIG. 39(b))

Resist pattern 3913 then is removed, and a black matrix 3914 is formed in a shape that blocks the light in the gap between pixel electrodes 3911. The pattern of the black matrix covers thin film transistor 3910, and blocks ultraviolet light. According to the present embodiment, the strength of ultraviolet radiation to which the thin film transistor is exposed can be reduced to a great extent by the pattern of the black matrix, and thus reliability can be improved. (Refer to FIG. 39(c))

Thin film transistor substrate 3901 is matched with opposing substrate 3915, and liquid crystal 3916 is interposed between them. On opposing substrate 3915 are formed red, green, and blue color filter sections 3917, 3918, 3919 formed by color resists having distributed red, green, and blue color dye.

A protective insulation film 3920 and opposing electrodes 3921 having a transparent conductive film are formed over the color filter sections 3917–3919. Alignment films 3922 and 3923 are formed over pixel electrodes 3911 and opposing electrodes 3921 with rubbing processing. The distance between pixel electrode and opposing electrode is generally called a cell gap, and it is a parameter that greatly controls optical properties. This cell gap deviates more easily as the liquid crystal panel becomes larger. Therefore, uniformity of the cell gap is maintained in a large liquid crystal panel by using a gap member or spacer 3924. (Refer to FIG. 39(d))

Embodiment 34

Figure 40A:
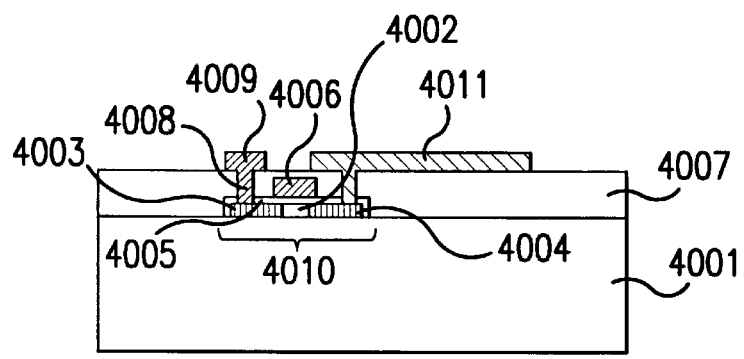
FIGS. 40a–40c are a process cross-sectional view showing the manufacturing method of the thirty-fourth embodiment of the present invention.
Figure 40B:
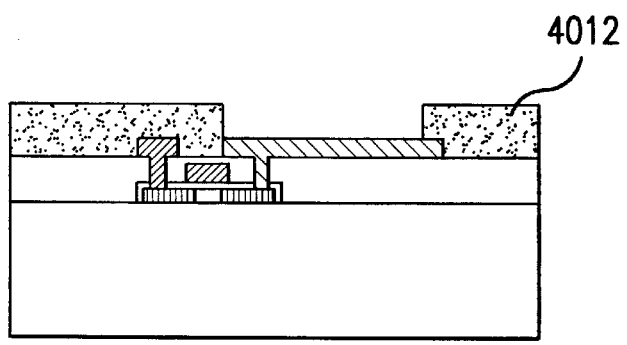
Figure 40C:
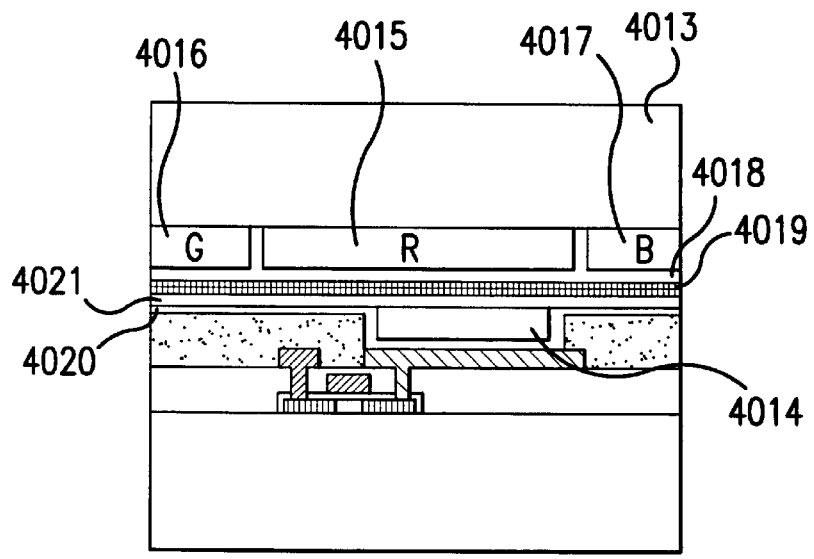

The thirty-fourth embodiment of the present invention is explained in detail using FIG. 40 and is a manufacturing method of an active matrix liquid crystal display device including a black matrix formed over the thin film transistor substrate. The pattern of this black matrix serves as a spacer. FIG. 40 is a process cross-sectional view showing one example of the thirty-fourth embodiment.

A thin film transistor is provided over the inner side of thin film transistor substrate 4001. The thin film transistor 4010 comprises a channel region 4002, source region 4003, drain region 4004, gate insulation film 4005, gate line 4006, interlevel insulator film 4007, contact hole 4008, and source line 4009, and the like, and a pixel electrode 4011 driven by the thin film transistor 4010, having a transparent conductive film arranged in a stripe, mosaic, triangle or like pattern. (Refer to FIG. 40(a))

Next, a black matrix 4012 is formed in a pattern that blocks the light in the gap between pixel electrodes 4011. This pattern of the black matrix also functions for blocking ultraviolet light. According to the present embodiment, since the black matrix serves as a spacer, the process of scattering spacers can be omitted, and the improvement of throughput and resulting reduction of cost are realized. (Refer to FIG. 40(b))

Thin film transistor substrate 4001 is matched with opposing substrate 4013, and liquid crystal 4014 is interposed between them. On opposing substrate 4013 are red, green, and blue color filter sections 4015, 4016, 4017 formed by color resists having distributed red, green, and blue color dye. A protective insulation film 4018 and opposing electrodes 4019 having a transparent conductive film are formed over the color filter sections 4015–4017. Alignment film 4020 and 4021 are formed over pixel electrodes 4011 and opposing electrodes 4019 with rubbing processing. The distance between pixel electrode and opposing electrode is generally called a cell gap, and it is a parameter that greatly controls optical properties. This cell gap deviates more easily as the liquid crystal panel becomes larger, but because the pattern of the black matrix serves as a spacer, uniformity of the cell gap is maintained. (Refer to FIG. 40(c))

Embodiment 35

Figure 41A:
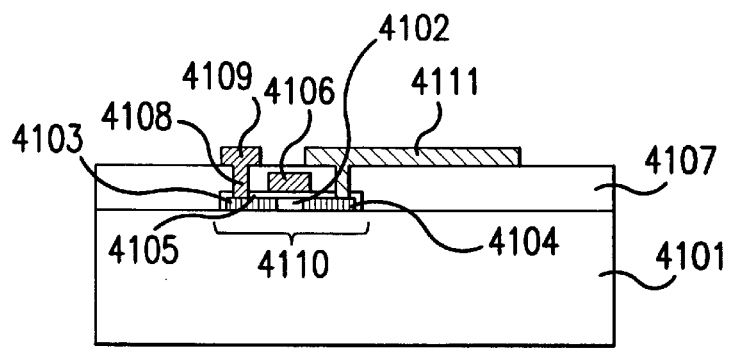
FIGS. 41a–41c are a process cross-sectional view showing the manufacturing method of the thirty-fifth embodiment of the present invention.
Figure 41B:
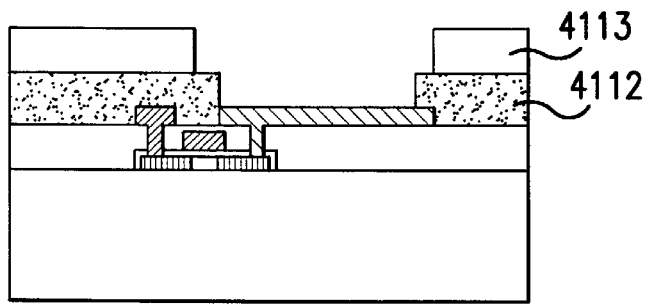
Figure 41C:
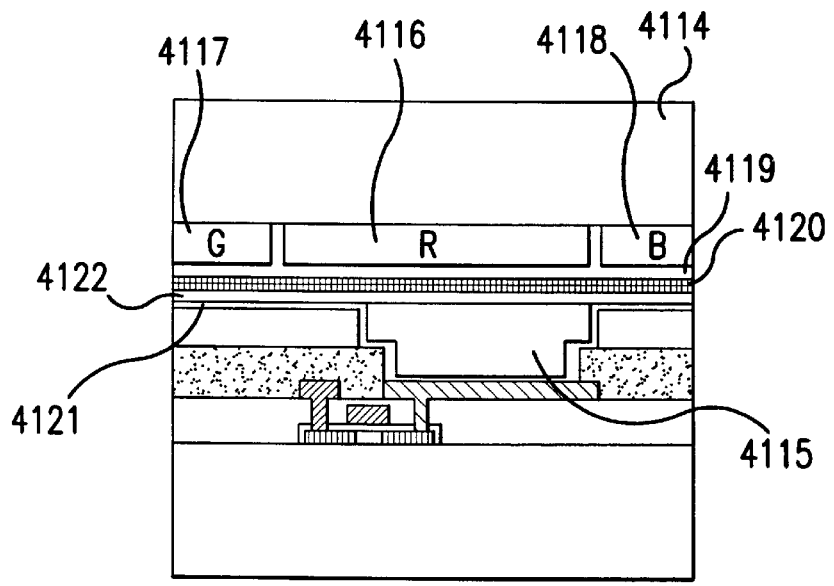
Figure 42A:
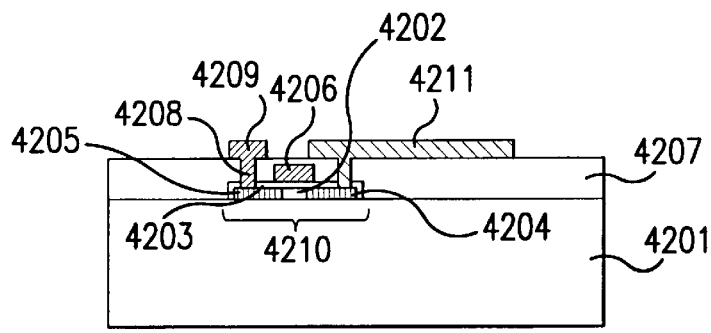
FIGS. 42a–42d are a process cross-sectional view showing the manufacturing method of the thirty-sixth embodiment of the present invention.
Figure 42B:
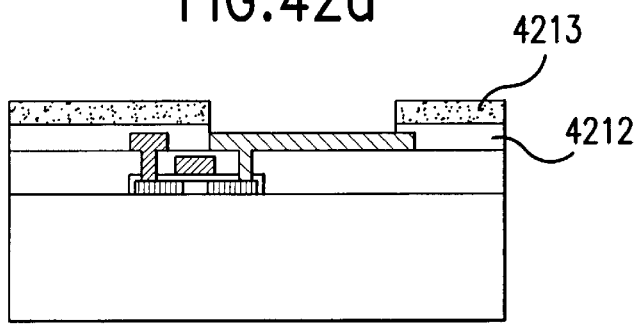
Figure 42C:
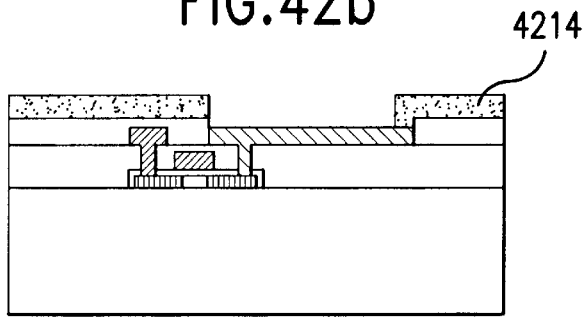
Figure 42D:
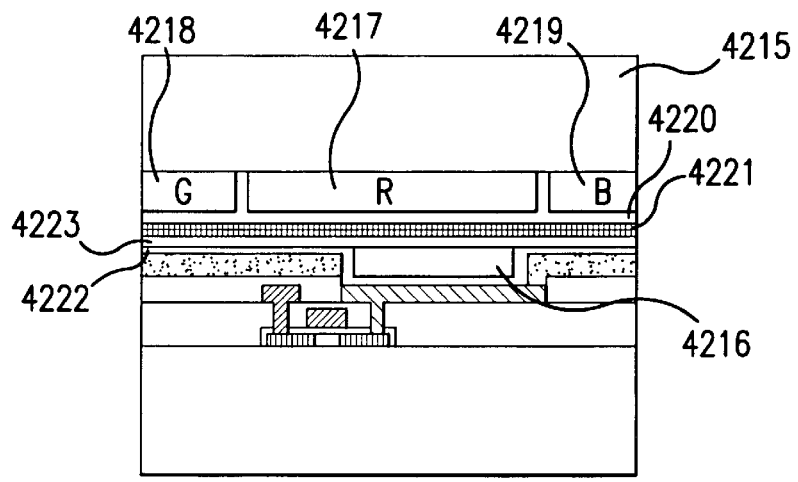
Figure 43A:
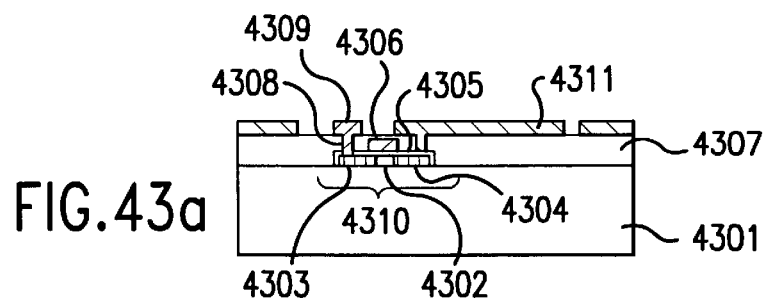
FIGS. 43a–43d are a process cross-sectional view and a plain view showing the manufacturing method of the thirty-seventh embodiment of the present invention.
Figure 43B:
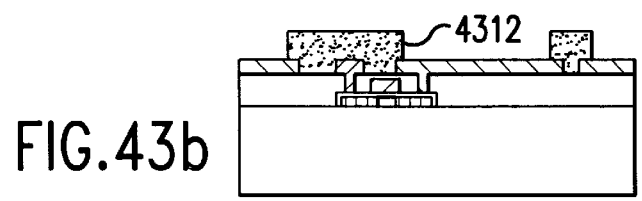
Figure 43C:
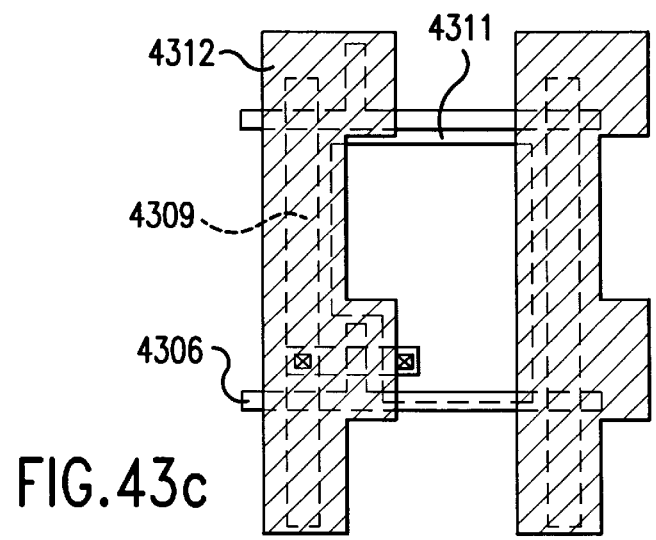
Figure 43D:
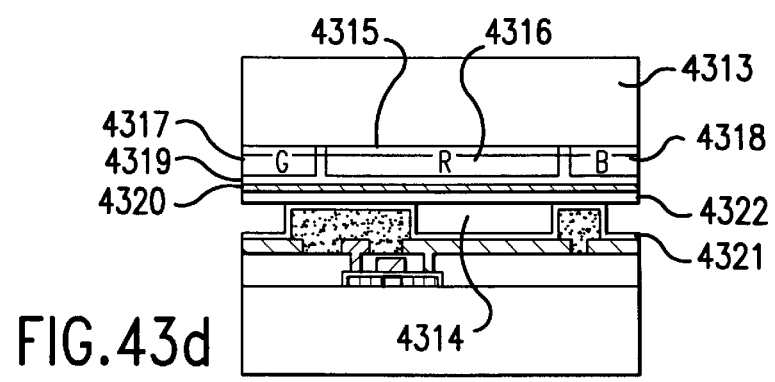
Figure 44A:
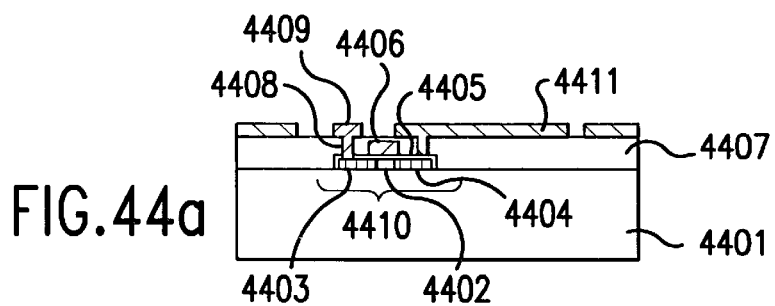
FIGS. 44a–44d are a process cross-sectional view and plain view showing the manufacturing method of the thirty-eighth embodiment of the present invention.
Figure 44B:
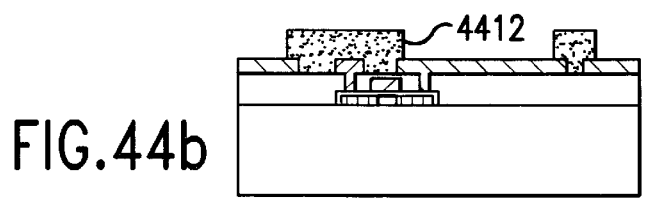
Figure 44C:
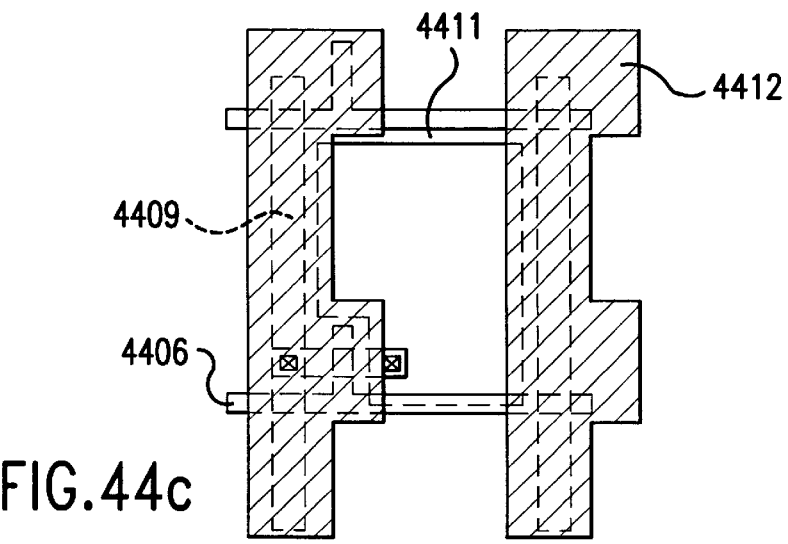
Figure 44D:
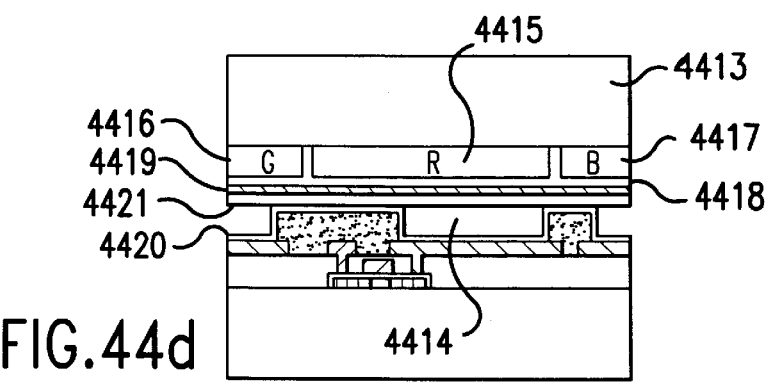
Figure 45A:
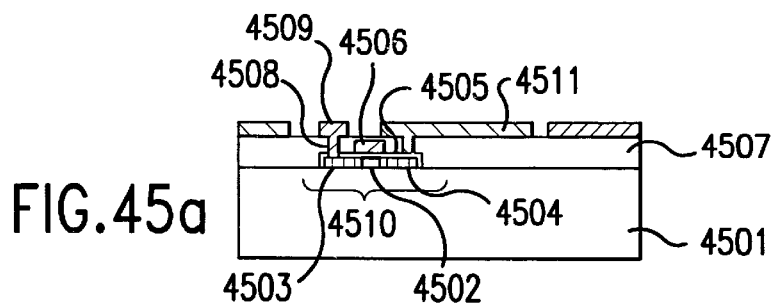
FIGS. 45a–45d are a process cross-sectional view and plain view showing the manufacturing method of the thirty-ninth embodiment of the present invention.
Figure 45B:
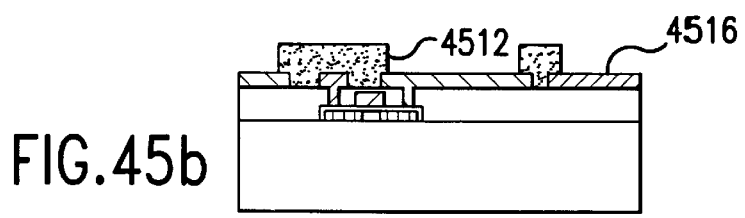
Figure 45C:
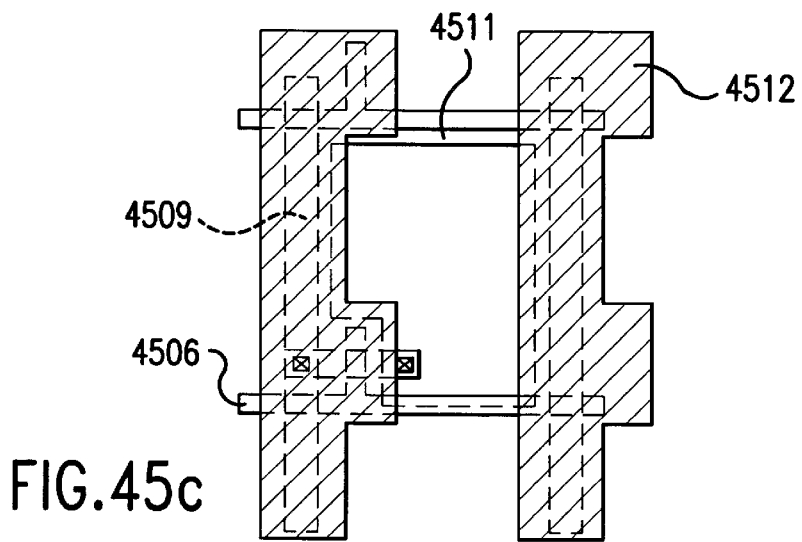
Figure 45D:
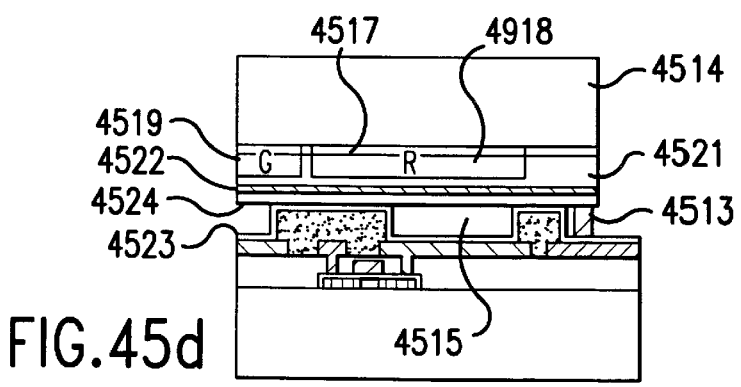

The thirty-fifth embodiment of the present invention is explained in detail using FIG. 41 and is a manufacturing method of an active matrix liquid crystal display device including a black matrix formed on the thin film transistor substrate. The pattern of this black matrix serves as a spacer in the same manner as the thirty-fourth embodiment. The difference with the thirty-fourth embodiment is that an insulation film is formed on the black matrix. This insulation film, with the black matrix, serves as a spacer. FIG. 41 is a process cross-sectional view showing one example of the thirty-fifth embodiment.

A thin film transistor is provided over the inner side of thin film transistor substrate 4101. The thin film transistor 4110 comprises a channel region 4102, source region 4103, drain region 4104, gate insulation film 4105, gate line 4106, interlevel insulator film 4107, contact hole 4108, and source line 4109, and the like, and a pixel electrode 4111 driven by the thin film transistor, having a transparent conductive film arranged in a stripe, mosaic, triangle or like pattern. (Refer to FIG. 41(a))

Next, a black matrix 4112 is formed in a pattern that blocks the light in the gap between the pixel electrodes 4111, and an insulation film 4113 is formed on the black matrix 4112. This insulation film, with the black matrix, serves as a spacer.

According to the present embodiment, the process of scattering spacers can be omitted, and an improvement of throughput and reduction of cost can be realized. Also, forming an insulation film on the black matrix eliminates negative influences in image quality, even when the specific resistance of the black matrix material is low. (Refer to FIG. 41(b))

Thin film transistor substrate 4101 is matched with opposing substrate 4114, and liquid crystal 4115 is interposed between them. On opposing substrate 4114 are red, green, and blue color filter sections 4116, 4117, 4118 formed by color resists having distributed red, green, and blue color dye. Over the color filter sections 4116–4118 are formed a protective insulation film 4119 and opposing electrodes 4120 composed of a transparent conductive film. Alignment films 4121 and 4122 are formed over pixel electrodes 4111 and opposing electrodes 4120 by rubbing processing. The distance between pixel electrode and opposing electrode is generally called a cell gap. It is a parameter that greatly controls optical properties. This cell gap deviates more easily as the liquid crystal panel becomes larger, but because the pattern, the black matrix and the insulation film serve as a spacer, uniformity of the cell gap is maintained. (Refer to FIG. 41(c))

Embodiment 36

The thirty-sixth embodiment of the present invention is explained in detail using FIG. 42 and is a manufacturing method of active matrix liquid crystal display device characterized in that a black matrix is formed over the thin film transistor substrate. The pattern of this black matrix serves as a spacer, in the same manner as the thirty-fourth embodiment. The difference with the thirty-fourth embodiment is that an insulation film is formed below the black matrix, and both the insulation film and the black matrix, serve as a spacer. FIG. 42 is a process cross-sectional view showing one example of the thirty-fourth embodiment.

A thin film transistor 4210 is provided over the inner side of thin film transistor substrate 4201. The thin film transistor comprises a channel region 4202, source region 4203, drain region 4204, gate insulation film 4205, gate line 4206, interlevel insulator film 4207, contact hole 4208, and source line 4209, and the like, and a pixel electrode 4211 driven by the thin film transistor, and having a transparent conductive film arranged in a stripe, mosaic, triangle or like pattern. (Refer to FIG. 42(a))

Next, over source line 4209 is formed an insulation film 4212 as a protective film. A resist pattern 4213 is formed over the insulation film 4212 using photolithography technology, and the like, and the insulation film 4212 over pixel electrodes 4211 is-removed. By this, source lines 4209 can be protected, and reductions in the voltage applied to the liquid crystal due to the existence of this insulation film can be prevented. (Refer to FIG. 42(b))

After this, resist pattern 4213 is removed, and a black matrix 4214 is formed in a pattern that blocks the light in the gap between pixel electrodes 4211. This black matrix 4214 and protective film 4212, serve the role of a spacer. Therefore, the process of scattering spacers can be omitted, and the improvement of throughput and associated reduction of cost become possible. Also, by forming an insulation film over the black matrix, there is no bad influence in image quality even when the specific resistance of the black matrix material is low. (Refer to FIG. 42(c))

Thin film transistor substrate 4201 is matched with opposing substrate 4215, and liquid crystal 4216 is interposed between them. On opposing substrate 4215 are red, green, and blue color filter sections 4217, 4218, 4219 formed by color resists having distributed red, green, and blue color dye. Over the color filter sections 4217 are formed a protective insulation film 4220 and opposing electrodes 4221 composed of a transparent conductive film. Alignment film 4222 and 4223 are formed over pixel electrodes 4211 and opposing electrodes 4221, and they are applied with rubbing processing.

The distance between pixel electrode and opposing electrode is generally called a cell gap. It is a parameter that greatly controls optical properties. This cell gap deviates more easily as the liquid crystal panel becomes larger, but because the pattern from the insulation film and the black matrix serves as a spacer, uniformity of the cell gap is maintained. (Refer to FIG. 42(d))

Embodiment 37

The thirty-seventh embodiment of the present invention is explained in detail using FIG. 43 and is a manufacturing method of an active matrix liquid crystal display device including a black matrix formed over the thin film transistor substrate. The pattern of this black matrix serves as a spacer, in the same manner as the thirty-fourth embodiment. The difference with the thirty-fourth embodiment is that the black matrix is formed only in the direction of the source line. FIG. 43 is a process cross-sectional view and plain view showing one example of the thirty-seventh embodiment.

A thin film transistor 4310 is provided over the inner side of thin film transistor substrate 4301. The thin film transistor comprises a channel region 4302, source region 4303, drain region 4304, gate insulation film 4305, gate line 4306, interlevel insulator film 4307, contact hole 4308, and source line 4309, and the like, and a pixel electrode 4311 driven by the thin film transistor, and having a transparent conductive film arranged in a stripe, mosaic, triangle or like pattern. (Refer to FIG. 43(a))

Next, a black matrix 4312 is formed in a pattern that blocks the light in the gap between pixel electrodes 4311 following source lines 4309, and it also serves the role of a spacer.

According to the present embodiment, the process of scattering spacers can be omitted, and the improvement of throughput and the reduction of cost become possible. Also, because a high wall can be made on the four sides of pixel electrode 4311 when the black matrix is formed in the direction following the gate lines, there was a previous problem that it was difficult to inject the liquid crystal. However, this problem is solved by the present invention by forming it only in the direction of the source lines. (Refer to FIG. 43(b) and (c))

Next, thin film transistor substrate 4301 is matched with opposing substrate 4313, and liquid crystal 4314 is interposed between them. On opposing substrate 4313 are a black matrix 4315 formed of a light-blocking film such as chrome at least in the direction of the gate lines, and red, green, and blue color filter sections 4316, 4317, 4318 formed by color resists having distributed red, green, and blue color dye. A protective insulation film 4319 and opposing electrodes 4320 composed of a transparent conductive film are formed over the color filter sections 4316–4318. Alignment films 4321 and 4322 are formed over pixel electrodes 4311 and opposing electrodes 4320, and they are applied with rubbing processing. The distance between pixel electrode 4311 and opposing electrode 4320 is generally called a cell gap, and it is a parameter that greatly controls optical properties. This cell gap deviates more easily as the liquid crystal panel becomes larger, but because the pattern of the black matrix serves as a spacer, uniformity of the cell gap is maintained. (Refer to FIG. 43(d)).

In the present embodiment, a case in which only the black matrix serves as a spacer has been explained. However, even when the an insulation film is provided on the upper layer or lower layer of the black matrix, and spacers are formed with the insulation film and black matrix, in the same manner as explained in Embodiment 35 and Embodiment 36, the main principle of the present invention is maintained.

Embodiment 38

The thirty-eighth embodiment of the present invention is explained in detail using FIG. 44 and is a manufacturing method of an active matrix liquid crystal display device including a black matrix formed over the thin film transistor substrate. The pattern of this black matrix serves as a spacer and the black matrix is formed only in the direction of the source line, in the same manner as the thirty-seventh embodiment. The difference with the thirty-seventh embodiment is that the black matrix in the direction of the gate line is served by a gate line or capacitance line. FIG. 44 is a process cross-sectional view and plain view showing one example of the thirty-eighth embodiment.

A thin film transistor is provided over the inner side of the thin film transistor substrate. The thin film transistor comprises a channel region 4402, source region 4403, drain region 4404, gate insulation film 4405, gate line 4406, interlevel insulator film 4407, contact hole 4408, and source line 4409, and the like, and a pixel electrode 4411 driven by the thin film transistor, and having a transparent conductive film arranged in a stripe, mosaic, triangle or like pattern. (Refer to FIG. 44(a))

Next, a black matrix 4412 is formed in a pattern that blocks the light in the gap between pixel electrodes 4411 following source lines 4409. Black matrix 4412 also serves as a spacer. Also, the top of pixel electrode 4411 overlaps with gate line 4406, and the gate line serves as a portion of the black matrix.

According to the present embodiment, the process of scattering spacers can be omitted, and the improvement of throughput and associated reductions in cost become possible. Also, because a high wall can be made on the four sides of pixel electrode 4411 when the black matrix is formed in the direction following the gate lines, there was a problem that it was difficult to inject the liquid crystal. However, this problem is solved in the present invention by forming it only in the direction of the source lines. Furthermore, at this time, since the gate line or capacitance line serves as the black matrix in the direction of the gate lines, it is no longer necessary to separately form the black matrix in the direction of the gate lines, thus reducing any increase of cost. (Refer to FIG. 44(b) and (c))

Next, thin film transistor substrate 4401 is matched with opposing substrate 4413, and liquid crystal 4414 is interposed between them. On opposing substrate 4413 are red, green, and blue color filter sections 4415, 4416, 4417 formed by color resists having distributed red, green, and blue color dye. Over the color filter sections. 4415–4417 are formed a protective insulation film 4418 and opposing electrodes 4419 having a transparent conductive film. Alignment films 4420 and 4421 are formed over pixel electrodes 4411 and opposing electrodes 4419, and are applied with rubbing processing. The distance between pixel electrode and opposing electrode is generally called a cell gap, and it is a parameter that greatly controls optical properties. This cell gap deviates more easily as the liquid crystal panel becomes larger, but because the pattern of the black matrix serves as a spacer, uniformity of the cell gap is maintained. (Refer to FIG. 44(d))

In the present embodiment, a case in which only the black matrix serves the role of a spacer has been explained. However, even when the an insulation film is provided on the upper layer or lower layer of the black matrix, and spacers are formed with the insulation film and black matrix, in the same manner as explained in Embodiment 35 and Embodiment 36, the main principle of the present invention is maintained.

Also, in the present embodiment, a case in which a gate line serves as a portion of the black matrix was explained. However, even when a capacitance line takes the task of a portion of the black matrix, the main principle of the present invention is maintained.

Embodiment 39

Figure 46:
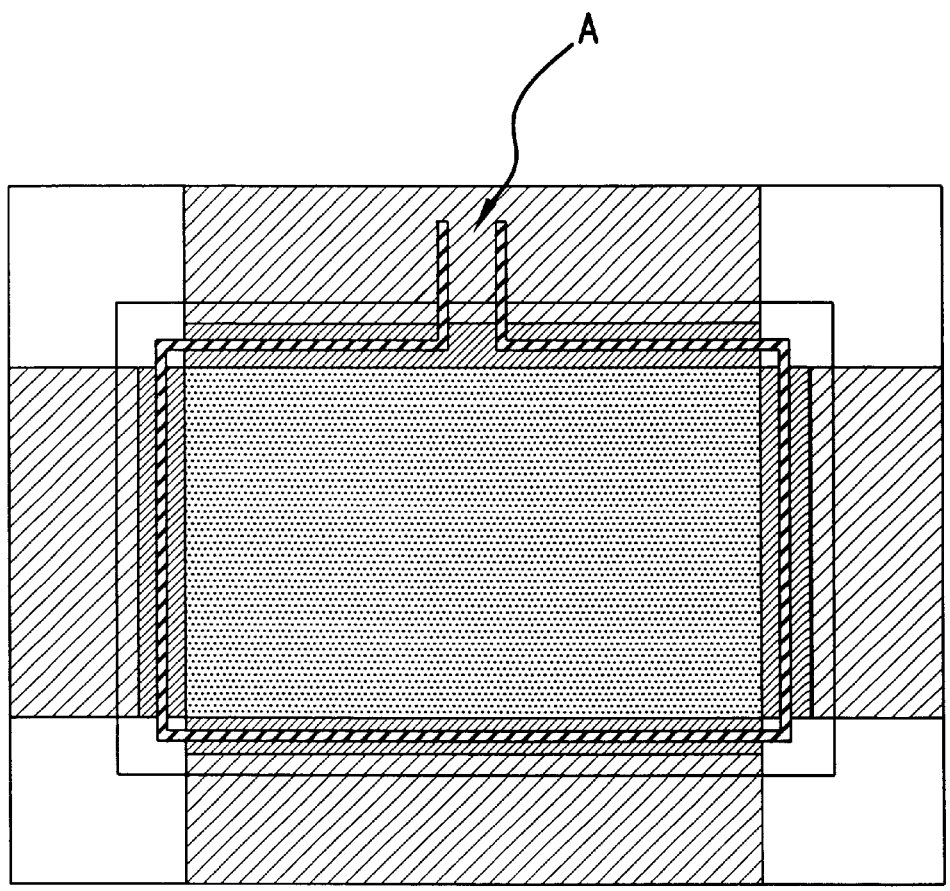
FIG. 46 is a plain view showing the manufacturing method of the fortieth embodiment of the present invention.
Figure 47A:
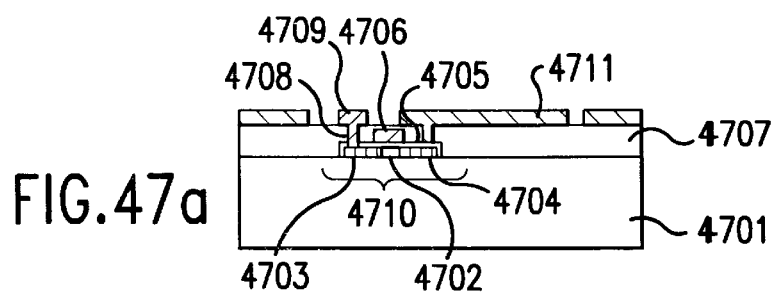
FIGS. 47a–47d are a plain view and process cross-sectional view showing the manufacturing method of the fortieth embodiment of the present invention.
Figure 47B:
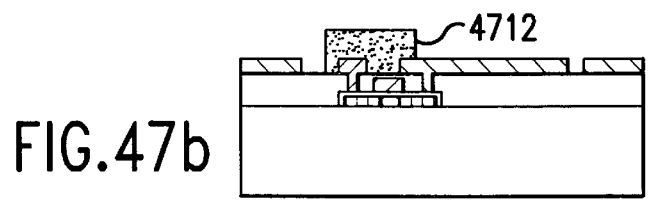
Figure 47C:
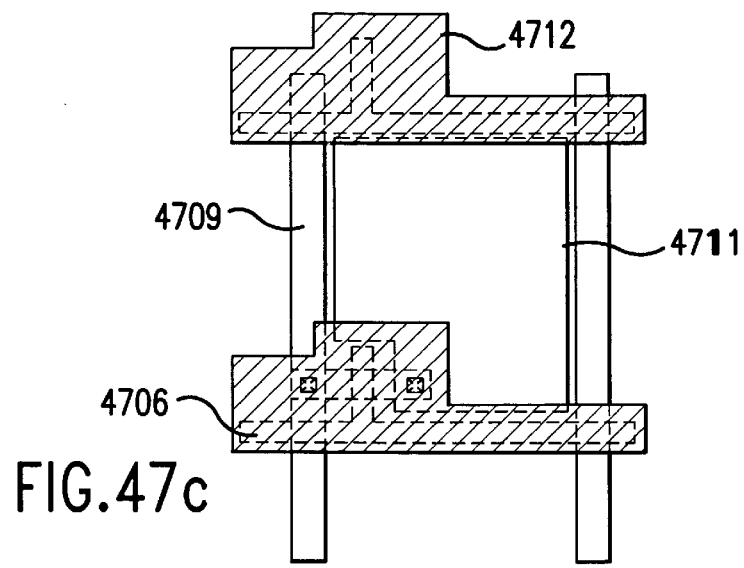
Figure 47D:
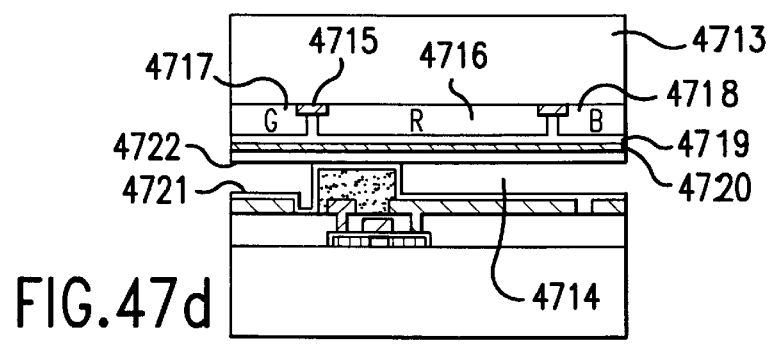
Figure 48A:
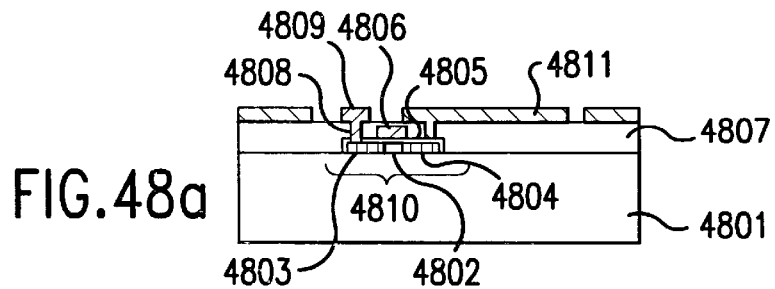
FIGS. 48a–48d are a plain view and process cross-sectional view showing the manufacturing method of the forty-first embodiment of the present invention.
Figure 48B:
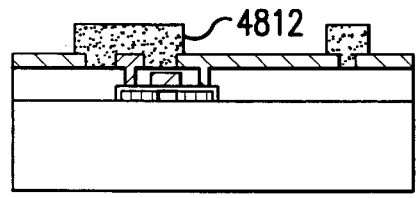
Figure 48C:
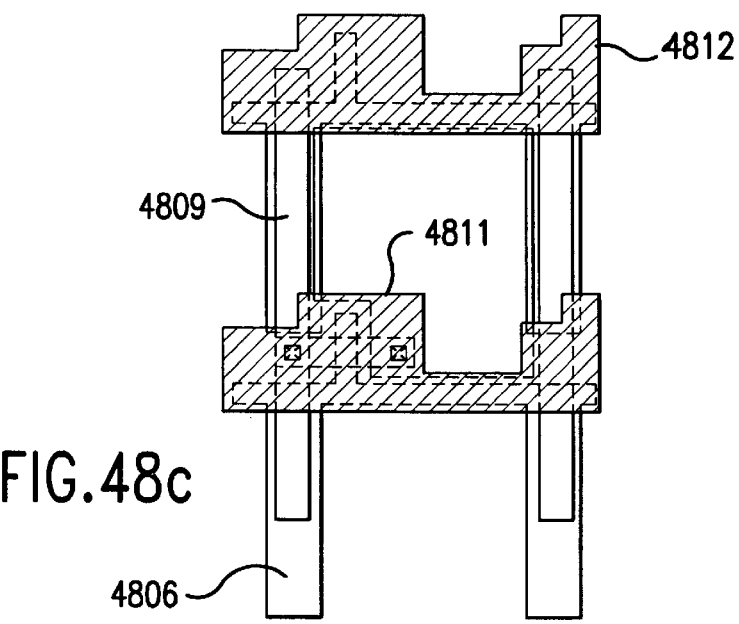
Figure 48D:
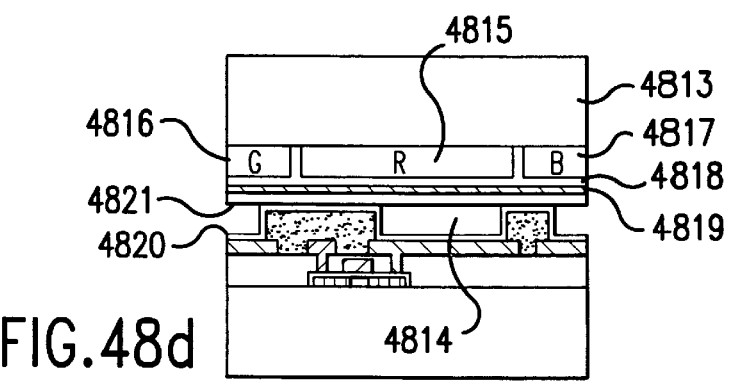
Figure 49A:
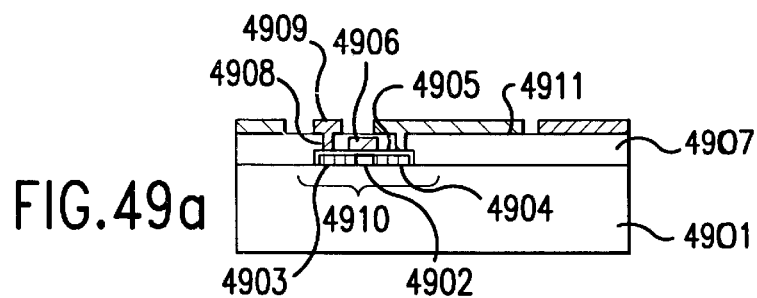
FIGS. 49a–49d are a plain view and process cross-sectional view showing the manufacturing method of the forty-second embodiment of the present invention.
Figure 49B:
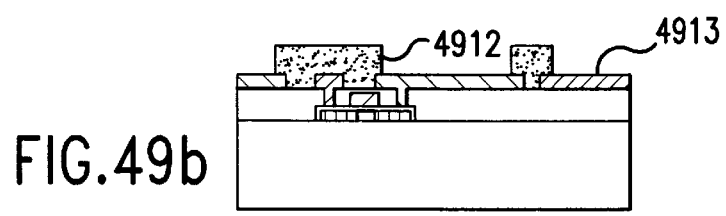
Figure 49C:
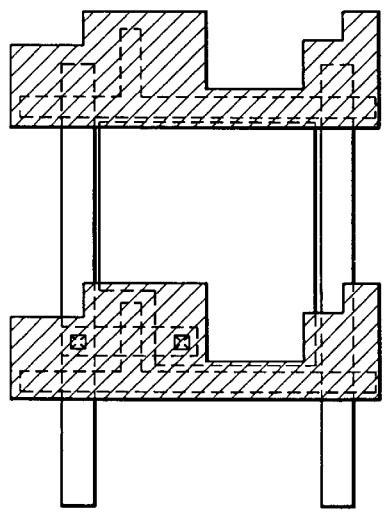
Figure 49D:
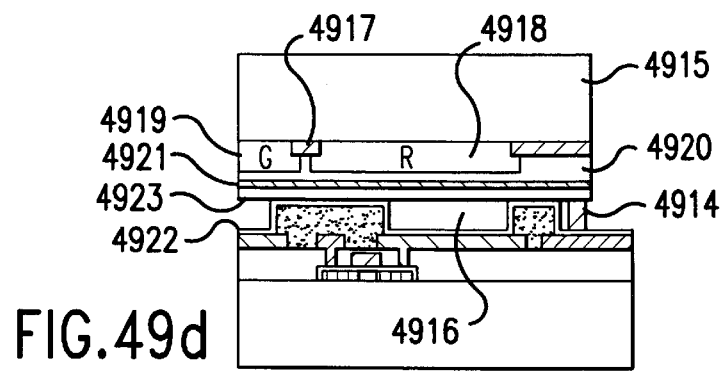

The thirty-ninth embodiment of the present invention is explained in detail using FIGS. 45 and 46 and is a manufacturing method of an active matrix liquid crystal display device including a black matrix formed over the thin film transistor substrate, the pattern of this black matrix serving as a spacer, moreover the black matrix is formed only in the direction of the source line, in the same manner as the thirty-seventh and thirty-eighth embodiments. The difference with the thirty-seventh and thirty-eighth embodiments is in the point that the liquid crystal injection port is formed in the direction of the source lines. FIG. 45 is a process cross-sectional view and plain view showing one example of that, and FIG. 46 is a plain view of FIG. 45(d).

A thin film transistor 4510 is provided over the inner side of thin film transistor substrate 4501. The thin film transistor comprises a channel region 4502, source region 4503, drain region 4504, gate insulation film 4505, gate line 4506, interlevel insulator film 4507, contact hole 4508, and source line 4509, and the like, and a pixel electrode 4511 driven by the thin film transistor 4510, and having a transparent conductive film arranged in a stripe, mosaic, triangle or like pattern. (Refer to FIG. 45(a))

Next, a black matrix 4512 is formed in a pattern that blocks the light in the gap between pixel electrodes 4511 following source lines 4509. The black matrix 4502 also serves as a spacer.

According to the present embodiment, the process of scattering spacers can be omitted, and the improvement of throughput and the reduction of cost become possible. Also, because a high wall can be made on the four sides of pixel electrode 4511 when the black matrix is formed in the direction following the gate lines, there was a previous problem that it was difficult to inject the liquid crystal. However, this problem is solved by the present invention by forming it only in the direction of the source lines. (Refer to FIG. 45(b) and (c))

Next, thin film transistor substrate 4501 is matched with opposing substrate 4514, using a sealant 4513 formed on seal section 4516, and liquid crystal 4515 is interposed between them. At this time, liquid crystal injection port A is formed in the direction of the source lines, as shown in FIG. 46. When the liquid crystal injection port is in the direction of the gate lines, there was a problem that it was difficult to inject the liquid crystal because it was obstructed by black matrix 4512 formed on thin film transistor substrate 4501. However, the present invention solves the above problem by forming the liquid crystal injection port in the direction of the source lines. On opposing substrate 4514, black matrix 4512 formed of a light-blocking film such as chrome at least and arranged in the direction of the gate lines, and red color filter section 4518, green color filter section 4519, and a blue color filter section, not illustrated here, are formed by color resists having distributed red, green, and blue color dye. A protective insulation film 4521 and opposing electrodes 4522 composed of a transparent conductive film are formed over the color filter sections. Alignment films 4523 and 4524 are formed on pixel electrodes 4511 and opposing electrodes 4522, and they are applied with rubbing processing. The distance between pixel electrode and opposing electrode is generally called a cell gap, and it is a parameter that greatly controls optical properties. This cell gap deviates more easily as the liquid crystal panel becomes larger, but because the pattern from the black matrix serves as spacer, uniformity of the cell gap is maintained. (Refer to FIG. 45(d))

In the present embodiment, a situation in which only the black matrix serves as a spacer has been explained. However, even when the an insulation film is provided over the upper layer or lower layer of the black matrix, and spacers are formed with the insulation film and black matrix, in the same manner as explained in Embodiment 35 and Embodiment 36, the main principle of the present invention is maintained.

Also, in the present embodiment, a black matrix was formed over the opposing substrate in the direction of the gate lines. However, even when a gate line or capacitance line serves as the black matrix in the direction of the gate lines, as explained in Embodiment 38, the main principle of the present invention is maintained.

Embodiment 40

The fortieth embodiment of the present invention is explained in detail using FIG. 47 and is a manufacturing method of an active matrix liquid crystal display device including a black matrix formed over a thin film transistor substrate. The pattern of this black matrix serves as a spacer, in the same manner as the thirty-fourth embodiment. The difference with the thirty-fourth embodiment is that the black matrix is formed only in the direction of the gate lines. FIG. 47 is a plain view and process cross-sectional view showing one example of the fortieth embodiment.

A thin film transistor 4710 is provided over the inner side of thin film transistor substrate 4701. The thin film transistor comprises a channel region 4702, source region 4703, drain region 4704, gate insulation film 4705, gate line 4706, interlevel insulator film 4707, contact hole 4708, and source line 4709, and the like, and a pixel electrode 4711 driven by the thin film transistor, and having a transparent conductive film arranged in a stripe, mosaic, triangle or like pattern. (Refer to FIG. 47(*a*))

Next, a black matrix 4712 is formed in a pattern that blocks the light in the gap between pixel electrodes 4711 following source lines 4709, and it serves also as a spacer.

According to the present embodiment, the process of scattering spacers can be omitted, and the improvement of throughput and the reduction of cost become possible. Also, because a high wall can be made on the four sides of pixel electrode 4711 when the black matrix is formed in the direction following the source lines, there was a problem that it was difficult to inject the liquid crystal. However, this problem is solved in the present invention by forming it only in the direction of the gate lines. (Refer to FIG. 47(*b*) and (*c*))

Next, thin film transistor substrate 4701 is matched with opposing substrate 4713, and liquid crystal 4714 is interposed between them. On opposing substrate 4713 are a black matrix 4715 formed of a light-blocking film such as chrome at least in the direction of the gate lines, and red, green, and blue color filter sections 4716, 4717, 4718 formed by color resists having distributed red, green, and blue color dye. Over the color filter sections are formed a protective insulation film 4719 and opposing electrodes 4720 having a transparent conductive film. Alignment films 4721 and 4722 are formed over pixel electrodes 4711 and opposing electrodes 4720, and are applied with rubbing processing. The distance between pixel electrode and opposing electrode is generally called a cell gap, and it is a parameter that greatly controls optical properties. This cell gap deviates more easily as the liquid crystal panel becomes larger, but because the pattern from the black matrix serves as a spacer, uniformity of the cell gap is maintained. (Refer to FIG. 47(*d*))

In the present embodiment, a case in which only the black matrix serves as a spacer has been explained. However, even when an insulation film is provided on the upper layer or lower layer of the black matrix, and spacers are formed with the insulation film and black matrix, in the same manner as explained in Embodiment 35 and Embodiment 36, the main principle of the present invention is maintained.

Embodiment 41

The forty-first embodiment of the present invention is explained in detail using FIG. 48 and is a manufacturing method of an active matrix liquid crystal display device including a black matrix formed over a thin film transistor substrate, the pattern of this black matrix serves as a spacer, and this black matrix is formed only in the direction of the gate lines, in the same manner as the fortieth embodiment. The difference with the fortieth embodiment is that the black matrix in the direction of the source lines is served by a gate line or source line. FIG. 48 is a plain view and process cross-sectional view showing one example of the forty-first embodiment.

A thin film transistor 4810 is provided over the inner side of thin film transistor substrate. The thin film transistor 4810 comprises a channel region 4802, source region 4803, drain region 4804, gate insulation film 4805, gate line 4806, interlevel insulator film 4807, contact hole 4808, and source line 4809, and the like, and a pixel electrode 4811 driven by the thin film transistor, and having a transparent conductive film arranged in a stripe, mosaic, triangle or like pattern. (Refer to FIG. 48(*a*))

Next, a black matrix 4812 is formed in a pattern that blocks the light in the gap between pixel electrodes 4811 following gate lines 4806, and also serving as a spacer. Also, pixel electrode 4811 overlaps with gate line 4806 extended in the direction of source line 4809, and the gate line serves as a part of the black matrix. According to the present embodiment, the process of scattering spacers can be omitted, and the improvement of throughput and the reduction of cost become possible.

Also, because a high wall can be made on the four sides of pixel electrode 4811 when the black matrix is formed in the direction following the source lines, there was a problem that it was difficult to inject the liquid crystal. However, this problem is solved by the present invention by forming it only in the direction of the gate lines. Furthermore, at this time, because the gate line or source line serves as the black matrix in the direction of the source lines, it is no longer necessary to separately form the black matrix in the direction of the source lines, and any increase of cost can be reduced. (Refer to FIG. 48(*b*) and (*c*))

Next, thin film transistor substrate 4801 is matched with opposing substrate 4813, and liquid crystal 4814 is interposed between them. On opposing substrate 4813 are red, green, and blue color filter sections 4815, 4816, 4817 formed by color resists having distributed red, green, and blue color dye. Over the color filter sections are formed a protective insulation film 4818 and opposing electrodes 4819 having a transparent conductive film. Alignment films 4820 and 4821 are formed over pixel electrodes 4811 and opposing electrodes 4819 applied with rubbing processing. The distance between pixel electrode and opposing electrode is generally called a cell gap, and it is a parameter that greatly controls optical properties. This cell gap deviates more easily as the liquid crystal panel becomes larger, but because the pattern from the black matrix serves as a spacer, uniformity of the cell gap is maintained. (Refer to FIG. 48(*d*))

In the present embodiment, a case in which only the black matrix serves the role of a spacer has been explained. However, even when the an insulation film is provided over the upper layer or lower layer of the black matrix, and spacers are formed with the insulation film and black matrix, in the same manner as explained in Embodiment 35 and Embodiment 36, the main principle of the present invention is maintained.

Also, in the present embodiment, a case in which a gate line serves as a portion of the black matrix was explained. However, even when a source line takes the task of a portion of the black matrix, the main principle of the present invention is maintained.

Embodiment 42

Figure 50:
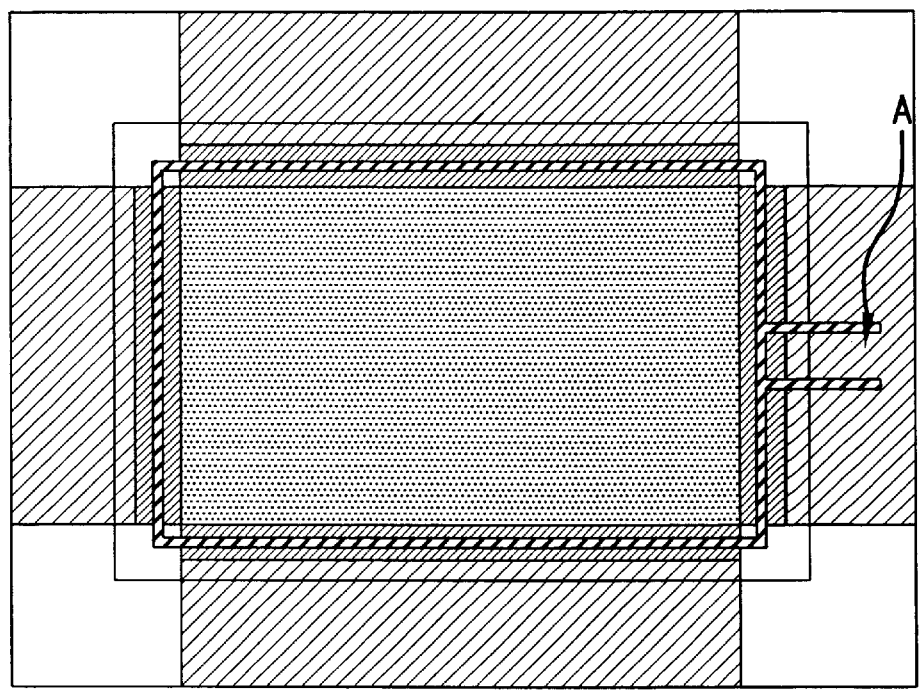
FIG. 50 is a plain view showing the manufacturing method of the forty-second embodiment of the present invention.

The forty-second embodiment of the present invention is explained in detail using FIGS. 49 and 50 and is a manufacturing method of an active matrix liquid crystal display device including a black matrix formed over a thin film transistor substrate, the pattern of this black matrix serving as a spacer. This black matrix is formed only in the direction of the gate lines, in the same manner as the fortieth and forty-first embodiments. The difference with the fortieth and forty-first embodiments is that the liquid crystal injection port is formed in the direction of the gate lines. FIG. 49 is a process cross-sectional view and plain view showing one example of the forty-second embodiment, and FIG. 50 is a plain view of FIG. 49(*d*).

A thin film transistor 4910 is provided over the inner side of thin film transistor substrate 4901. The thin film transistor 4910 comprises a channel region 4902, source region 4903, drain region 4904, gate insulation film 4905, gate line 4906, interlevel insulator film 4907, contact hole 4908, and source line 4909, and the like, and a pixel electrode 4911 driven by the thin film transistor, and having a transparent conductive film and arranged in a stripe, mosaic, triangle or like pattern. (Refer to FIG. 49(*a*))

Next, a black matrix 4912 is formed in a pattern that blocks the light in the gap between pixel electrodes 4911 following gate lines 4906, and also serving as a spacer. According to the present embodiment, the process of scattering spacers can be omitted, and the improvement of throughput and the reduction of cost become possible. Also, because a high wall can be made on the four sides of pixel electrode 4911 when the black matrix is formed in the direction following the gate lines, there was a problem that it was difficult to inject the liquid crystal. However, this problem is solved by the present invention by forming it only in the direction of the source lines. (Refer to FIG. 49(*b*) and (*c*))

Next, thin film transistor substrate 4901 is matched with opposing substrate 4915, using a sealant 4914 formed on seal section 4913, and liquid crystal 4916 is interposed between them. At this time, liquid crystal injection port A is formed in the direction of the gate lines, as shown in FIG. 50. When the liquid crystal injection port is in the direction of the source lines, there was a problem that it was difficult to inject the liquid crystal, it being obstructed by black matrix 4912 formed on thin film transistor substrate 4901. However, it could be solved by forming the liquid crystal injection port in the direction of the gate lines.

On opposing substrate 4915 are a black matrix 4917 formed of a light-blocking film such as chrome at least in the direction of the gate lines, and red color filter section 4918, green color filter section 4919, and a blue color filter section, not illustrated here, formed by color resists having distributed red, green, and blue color dye. A protective insulation film 4920 and opposing electrodes 4921 having a transparent conductive film are formed over the color filter sections. Alignment films 4922 and 4923 are formed over pixel electrodes 4911 and opposing electrodes 4921 applied with rubbing processing.

The distance between pixel electrode and opposing electrode is generally called a cell gap, and it is a parameter that greatly controls optical properties. This cell gap deviates more easily as the liquid crystal panel becomes larger, but because the pattern from the black matrix serves as a spacer, uniformity of the cell gap is maintained. (Refer to FIG. 49(*d*))

In the present embodiment, a case in which only the black matrix serves as a spacer has been explained. However, even when the an insulation film is provided over the upper layer or lower layer of the black matrix, and spacers are formed with the insulation film and black matrix, in the same manner as explained in Embodiment 35 and Embodiment 36, the main principle of the present invention is maintained.

Also, in the present embodiment, a black matrix was formed over the opposing substrate in the direction of the source lines. However, even when a gate line or source line serves as the black matrix in the direction of the source lines, as explained in Embodiment 41, the main principle of the present invention is maintained.

Embodiment 43

Figure 51A:
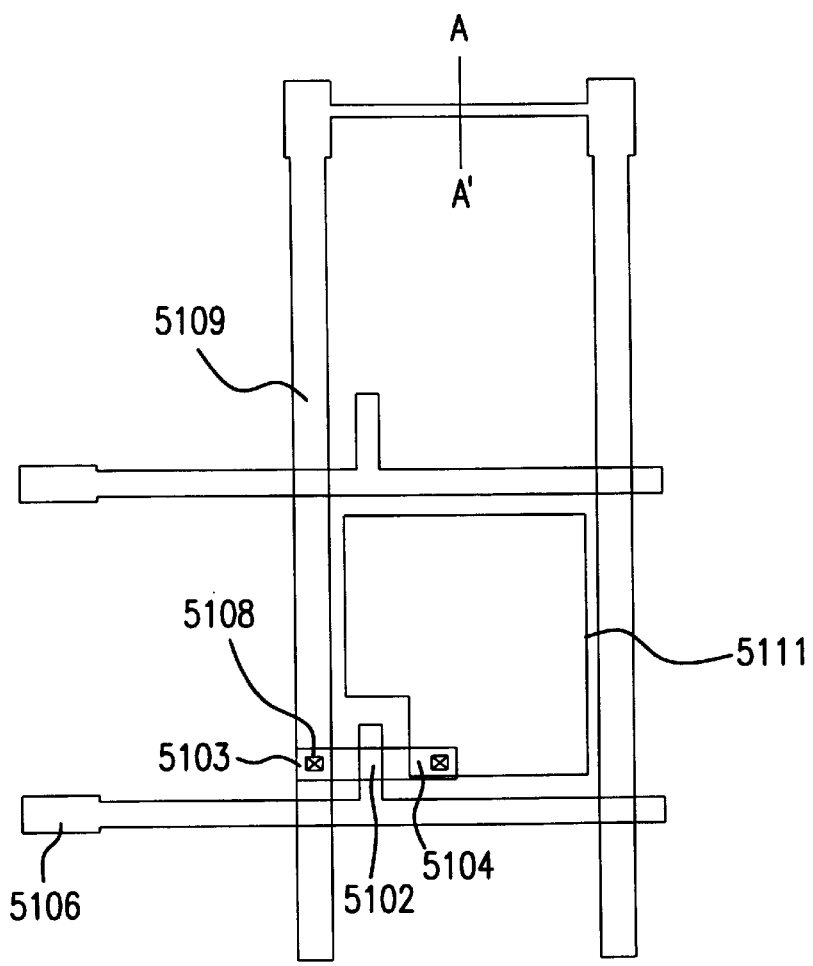
FIGS. 51a–51b are a plain view and process cross-sectional view showing the manufacturing method of the forty-third embodiment of the present invention.
Figure 51B:
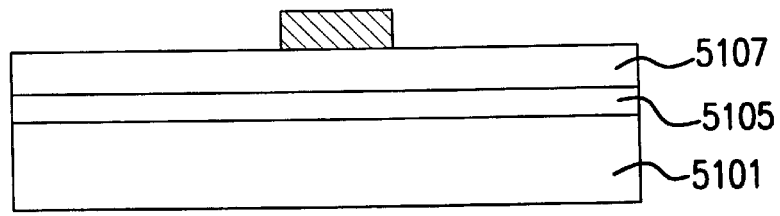
Figure 52A:
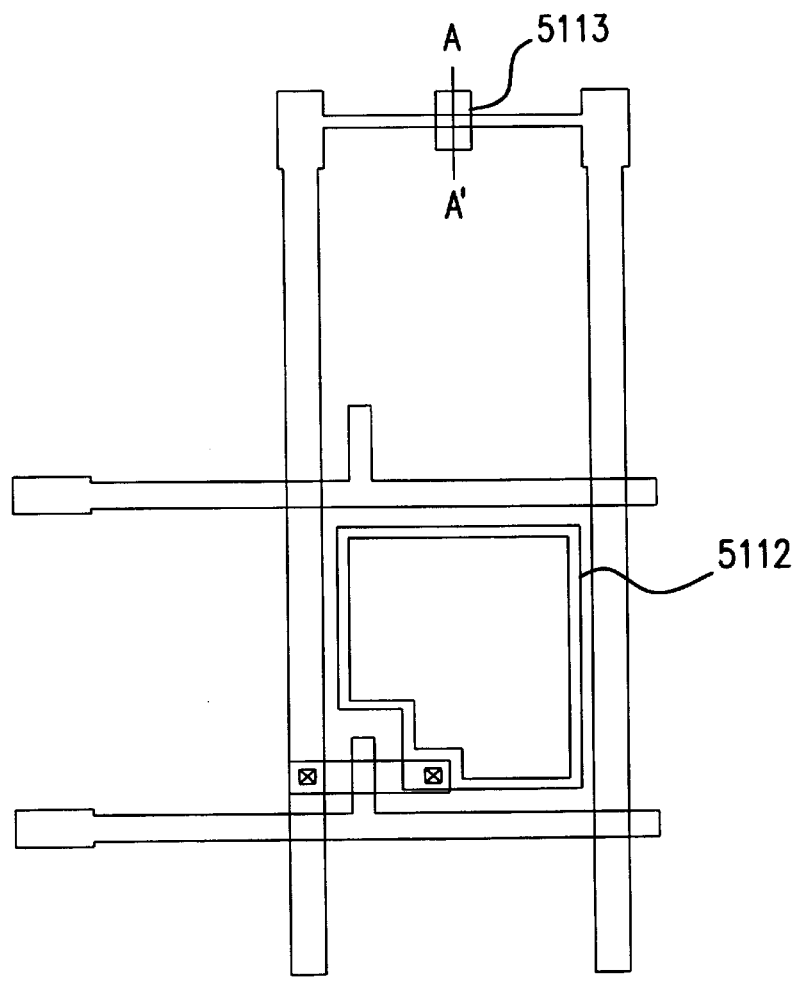
FIGS. 52a–52b are a plain view and process cross-sectional view showing the manufacturing method of the forty-third embodiment of the present invention.
Figure 52B:
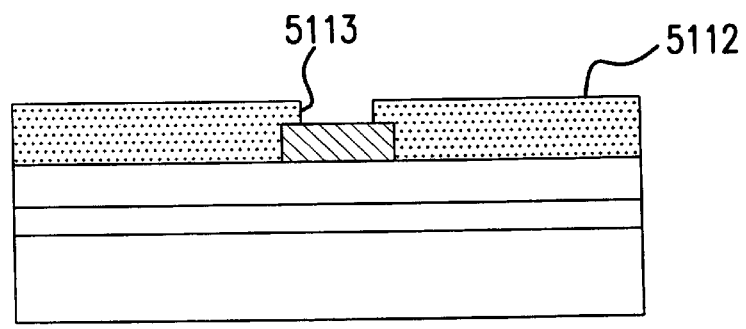
Figure 53A:
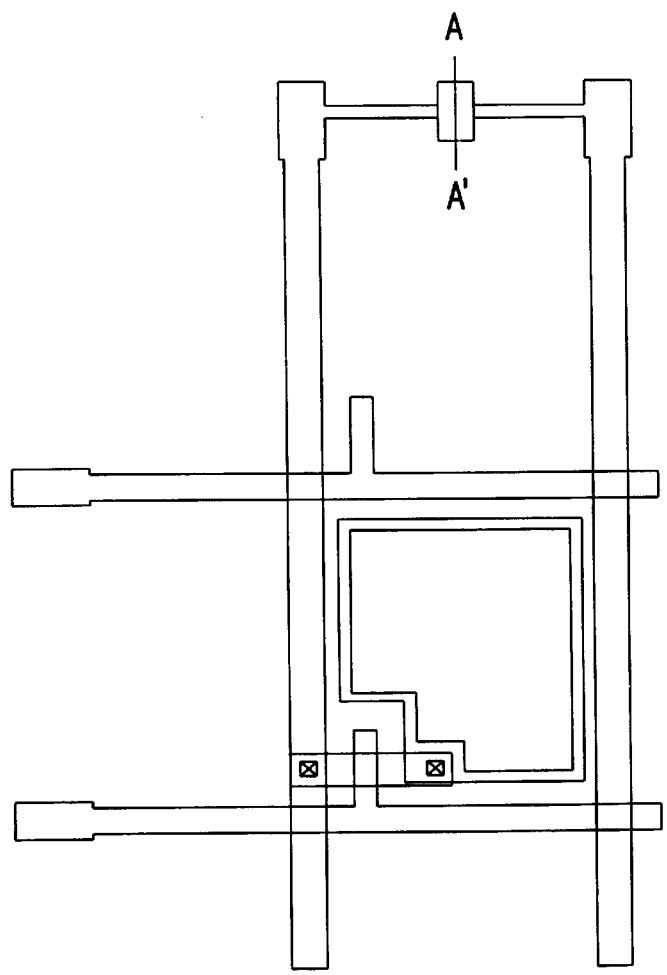
FIGS. 53a–53b is a plain view and process cross-sectional view showing the manufacturing method of the forty-third embodiment of the present invention.
Figure 53B:
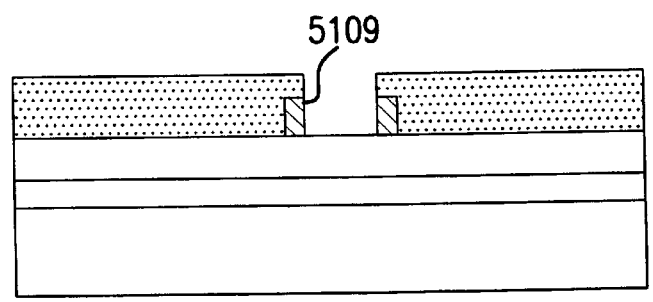

The forty-third embodiment of the present invention is explained in detail using FIGS. 51, 52, and 53. The forty-third embodiment is a manufacturing method of an active matrix liquid crystal display device including a black matrix provided over pixel electrodes, and anti-static wiring separated using this pattern as a mask. FIGS. 51, 52, and 53 are plain views and process cross-sectional views in the A–A' section of the plain views showing one example of the forty-third embodiment.

A thin film transistor is provided over the inner side of thin film transistor substrate 5101. The thin film transistor comprises a channel region 5102, source region 5103, drain region 5104, gate insulation film 5105, gate line 5106, interlevel insulator film 5107, contact hole 5108, and source line 5109, and the like, and a pixel electrode 5111 driven by the thin film transistor, and having a transparent conductive film arranged in a stripe, mosaic, triangle or like pattern. Here, source lines 5109 are mutually shorted at the initial stage in order to prevent damage due to static electricity. (Refer to FIG. 51)

Next, a black matrix 5112 is formed in a pattern that blocks the light in the gap between pixel electrodes 5111. At this time, a window 5113 is opened in the section having source lines 5109 shorted. (Refer to FIG. 52)

Next, separation of source lines 5109 is performed using the pattern 5113 of the black matrix as a mask. Anti-static wiring is generally provided outside the display area. Meanwhile, a black matrix is formed for blocking light in the perimeter of the pixel electrodes. Consequently, even when the pattern of a black matrix is formed for the purpose of separating the anti-static wiring, it does not cause a bad influence in the display properties. By this, it has become possible to reduce the number of processes and the cost. (Refer to FIG. 53)

Embodiment 44

Figure 54A:
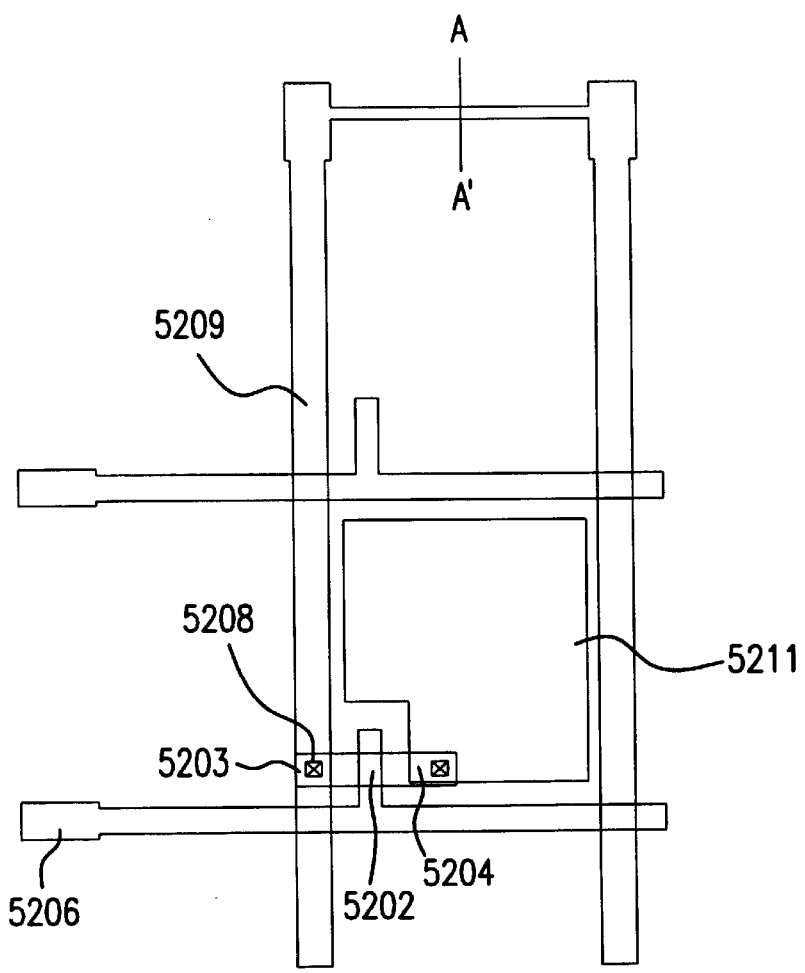
FIGS. 54a–54b are a plain view and process cross-sectional view showing the manufacturing method of the forty-fourth embodiment of the present invention.
Figure 54B:
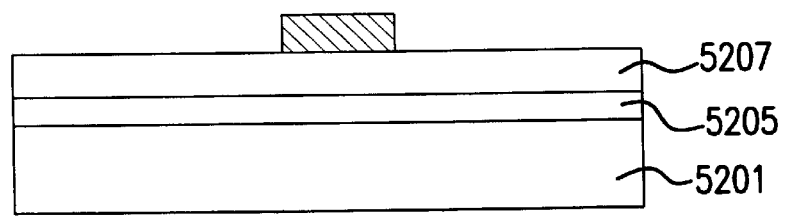
Figure 55A:
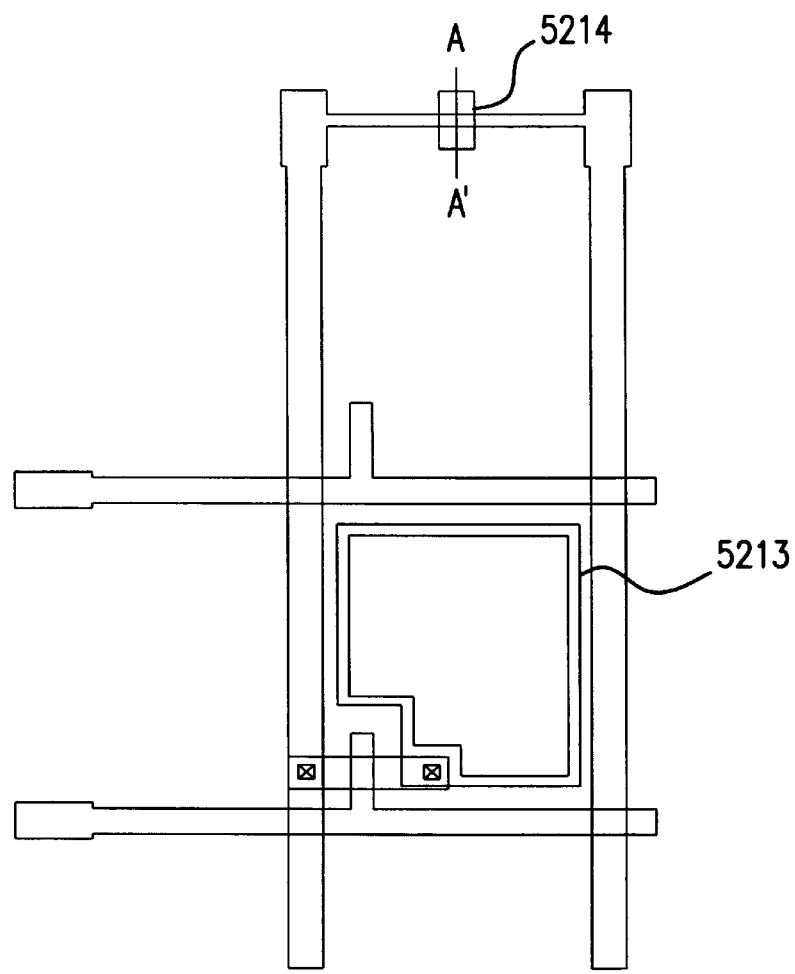
FIGS. 55a–55b are a plain view and process cross-sectional view showing the manufacturing method of the forty-fourth embodiment of the present invention.
Figure 55B:
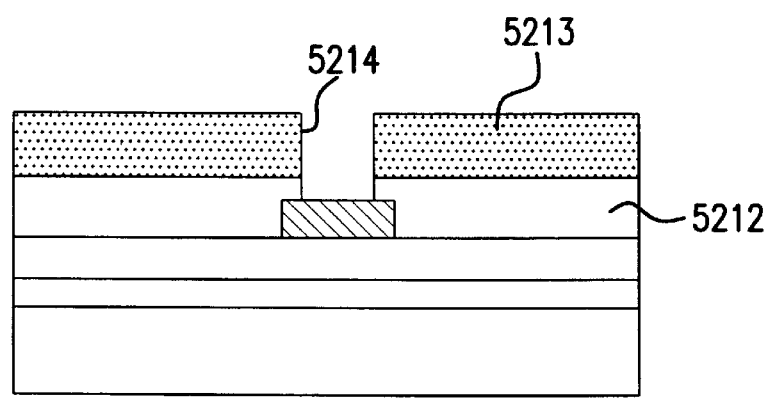
Figure 56A:
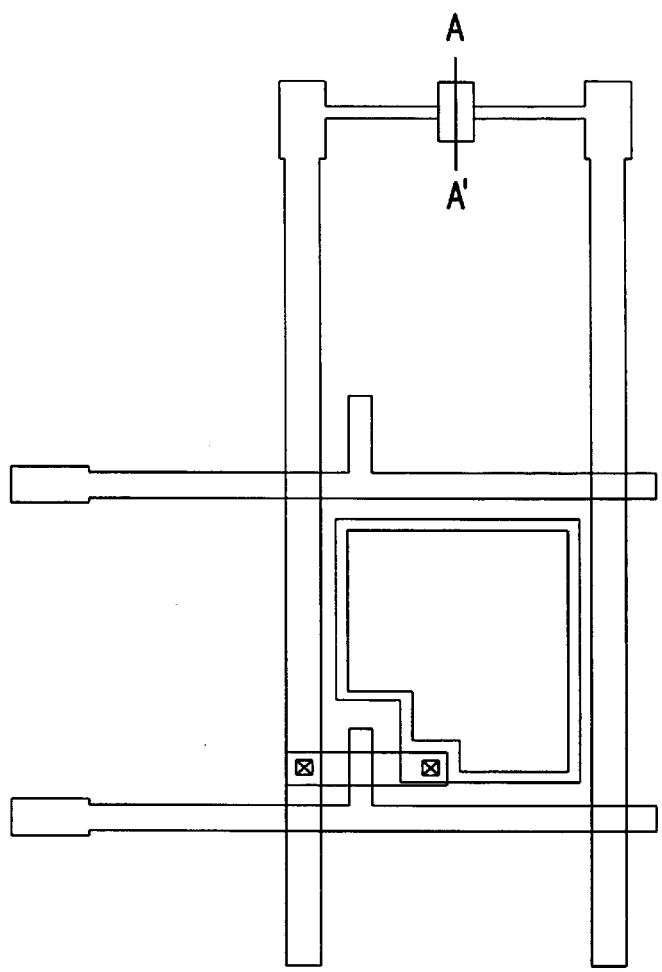
FIGS. 56a–56b are a plain view and process cross-sectional view showing the manufacturing method of the forty-fourth embodiment of the present invention.
Figure 56B:
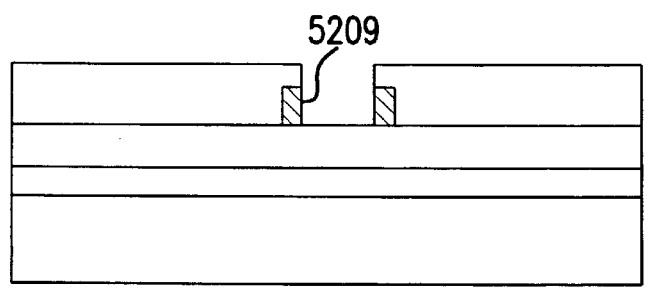

The forty-fourth embodiment of the present invention is explained in detail using FIGS. 54, 55, and 56. The forty-fourth embodiment is a manufacturing method of an active matrix liquid crystal display device including a pattern of a protective film provided over the pixel electrodes, and anti-static wiring separated using this pattern as a mask. FIGS. 54, 55, and 56 are plain views and process cross-sectional views in the A–A' section of the plain views showing one example of the forty-fourth embodiment.

A thin film transistor is provided over the inner side of thin film transistor substrate 5201. The thin film transistor comprises a channel region 5202, source region 5203, drain region 5204, gate insulation film 5205, gate line 5206, interlevel insulator film 5207, contact hole 5208, and source line 5209, and the like, and a pixel electrode 5211 driven by the thin film transistor, and having a transparent conductive film arranged in a stripe, mosaic, triangle or like pattern. Here, source lines 5109 <sic> are mutually shorted at the initial stage in order to prevent damage due to static electricity. (Refer to FIG. 54)

Next, over source lines 5209 is formed an insulation film 5212 as a protective film. A resist pattern 5213 is further formed over this using photolithography technology, and the like. At this time, a window 5214 is opened in the section having source lines 5109 shorted. Next, the insulation film 5212 on pixel electrodes 5211 is removed, using resist pattern 5213 as a mask. Thus, source lines 5209 can be protected, and a reduction in the voltage applied to the liquid crystal due to the existence of this insulation film can be prevented. At this time, insulation film 5212 of the window 5214 part is also removed at the same time, and source lines 5209 are exposed. (Refer to FIG. 55)

Next, source lines 5209 are separated using window 5214 as a mask. Anti-static wiring is generally provided outside the display area. Meanwhile, the pattern of a protective film allows for opening a window on the pixel electrodes. Consequently, even when the pattern of a protective film is formed for the purpose of separating the anti-static wiring, it does not cause a bad influence in the display properties. By the present invention, it has become possible to reduce the number of processes and the cost. (Refer to FIG. 56)

Embodiment 45

Figure 57A:
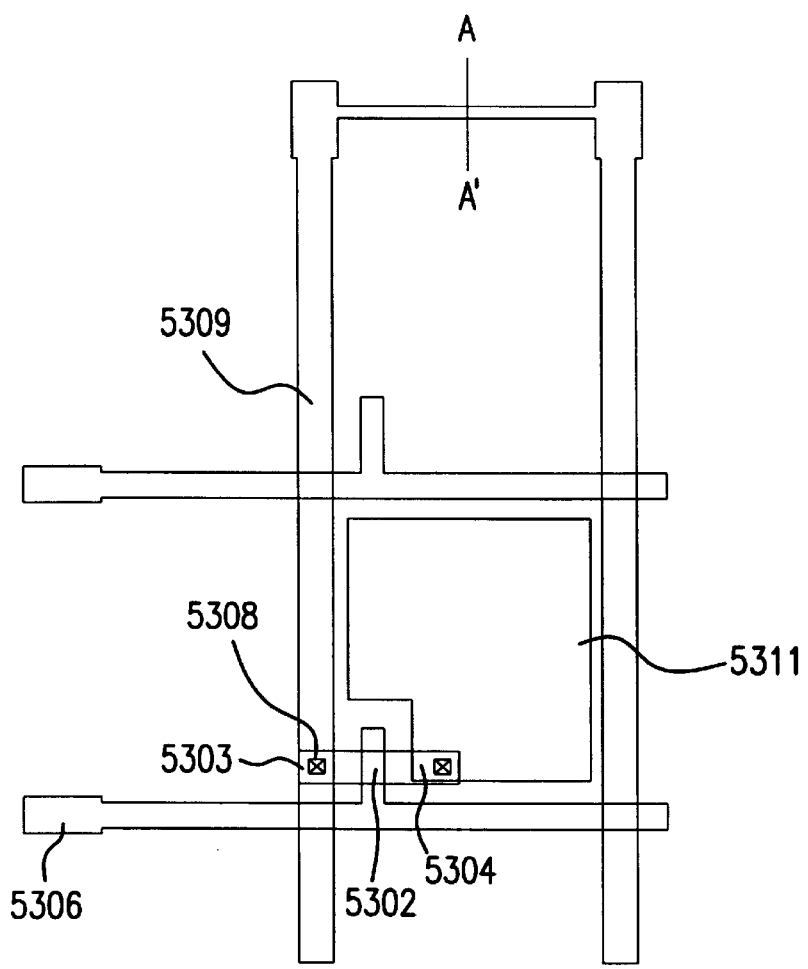
FIGS. 57a–57b are a plain view and process cross-sectional view showing the manufacturing method of the forty-fifth embodiment of the present invention.
Figure 57B:
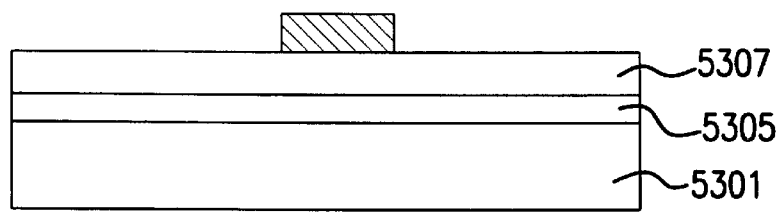
Figure 58A:
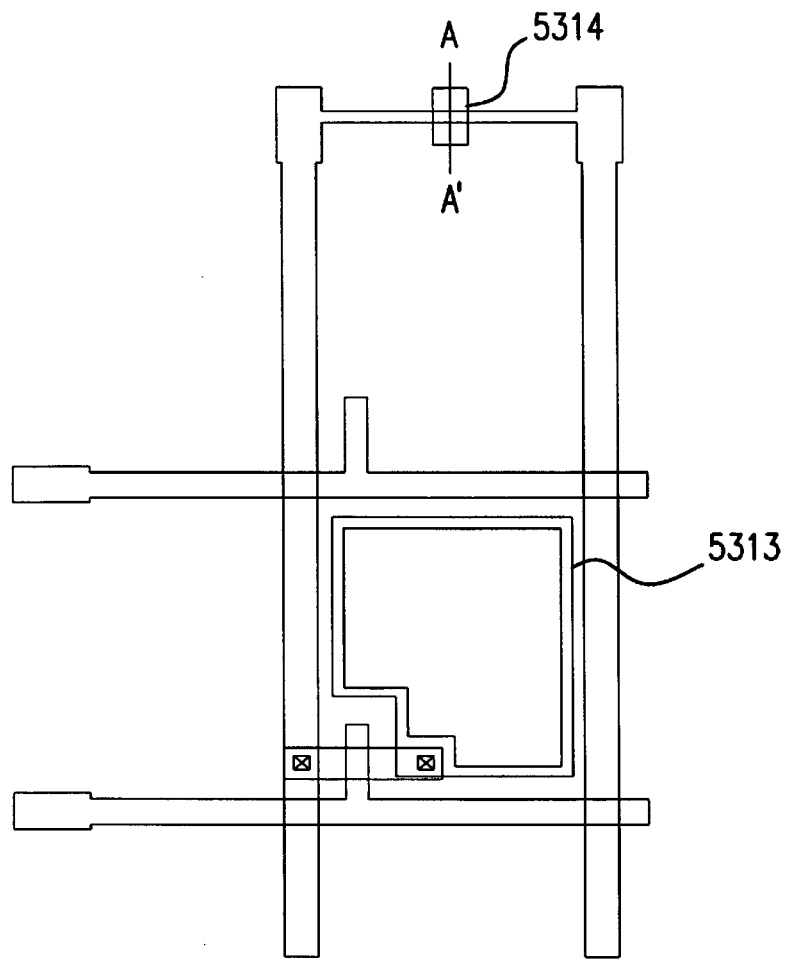
FIGS. 58a–58b are a plain view and process cross-sectional view showing the manufacturing method of the forty-fifth embodiment of the present invention.
Figure 58B:
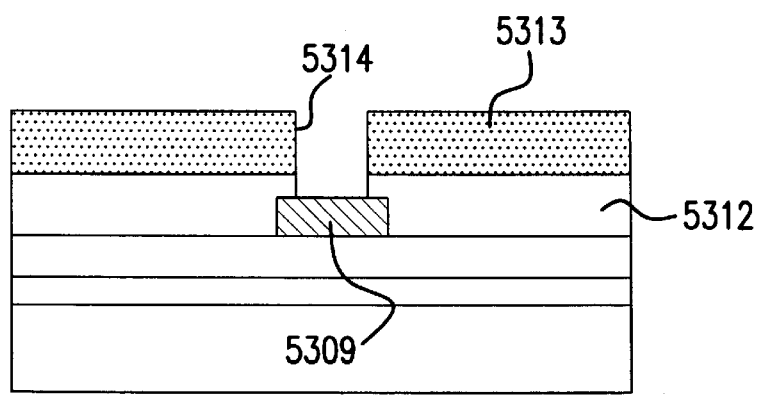
Figure 59A:
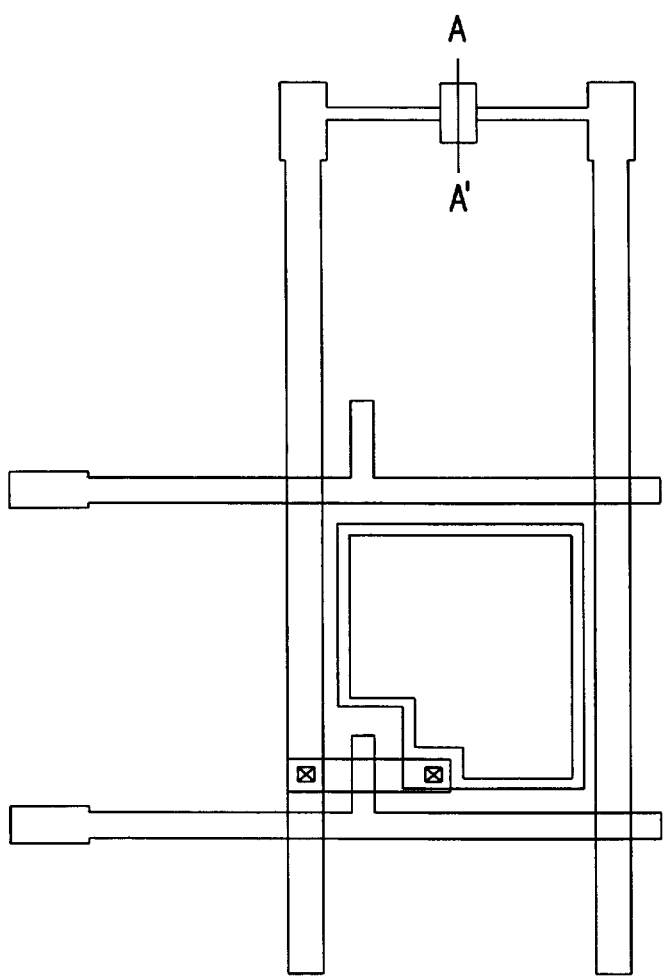
FIGS. 59a–59b are a plain view and process cross-sectional view showing the manufacturing method of the forty-fifth embodiment of the present invention.
Figure 59B:
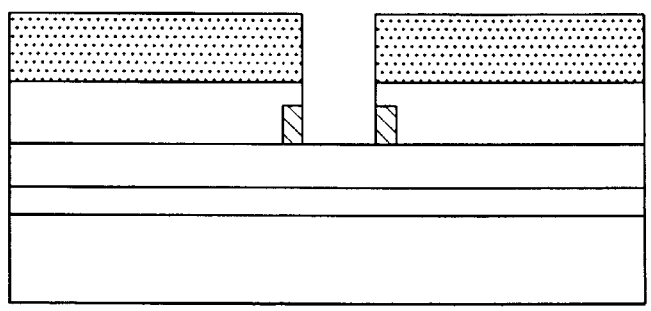

The forty-fifth embodiment of the present invention is explained in detail using FIGS. 57, 58, and 59. The forty-fifth embodiment is a manufacturing method of an active matrix liquid crystal display device including a protective film layer provided over the pixel electrodes. A black matrix is further provided on the protective film layer, which is etched to be self-aligning in relation to the pattern of the black matrix. Furthermore anti-static wiring formed on the lower part of the protective film layer is separated using the pattern as a mask. FIGS. 57, 58, and 59 are plain views and process cross-sectional views in the A–A' section of the plain views showing one example of the forty-fifth embodiment.

A thin film transistor is provided over the inner side of thin film transistor substrate 5301. The thin film transistor comprises a channel region 5302, source region 5303, drain region 5304, gate insulation film 5305, gate line 5306, interlevel insulator film 5307, contact hole 5308, and source line 5309, and the like, and a pixel electrode 5311 driven by the thin film transistor, and having a transparent conductive film arranged in a stripe, mosaic, triangle or like pattern. Here, source lines 5309 are mutually shorted at the initial stage in order to prevent damage due to static electricity. (Refer to FIG. 57)

Next, over source lines 5309 is formed an insulation film 5312 as a protective film. Over protective film 5312 is further formed a black matrix 5313 in a pattern that blocks the light in the gap between pixel electrodes 5311. At this time, a window 5314 is opened in the section having source lines 5309 shorted. Next, said protective film 5312 is etched, for example, by RIE using CHF3 gas, and the like, so as to be self-aligning in relation to the pattern of black matrix 5313. Thus, source line 5309 can be protected, and a reduction in the voltage applied to the liquid crystal due to the existence of this insulation film can be prevented. At this time, insulation film 5312 of the window 5314 part is also removed and source lines 5309 are exposed. (Refer to FIG. 58)

Next, source lines 5309 are separated using window 5314 as a mask. Anti-static wiring is generally provided outside the display area. Meanwhile, the pattern of a protective film is provided for opening a window on the pixel electrodes. Consequently, even when the pattern of a protective film is formed for the purpose of separating the anti-static wiring, it does not cause a bad influence in the display properties. By the present invention, it has become possible to reduce the number of processes and the cost. (Refer to FIG. 59)

Embodiment 46

Figure 60A:
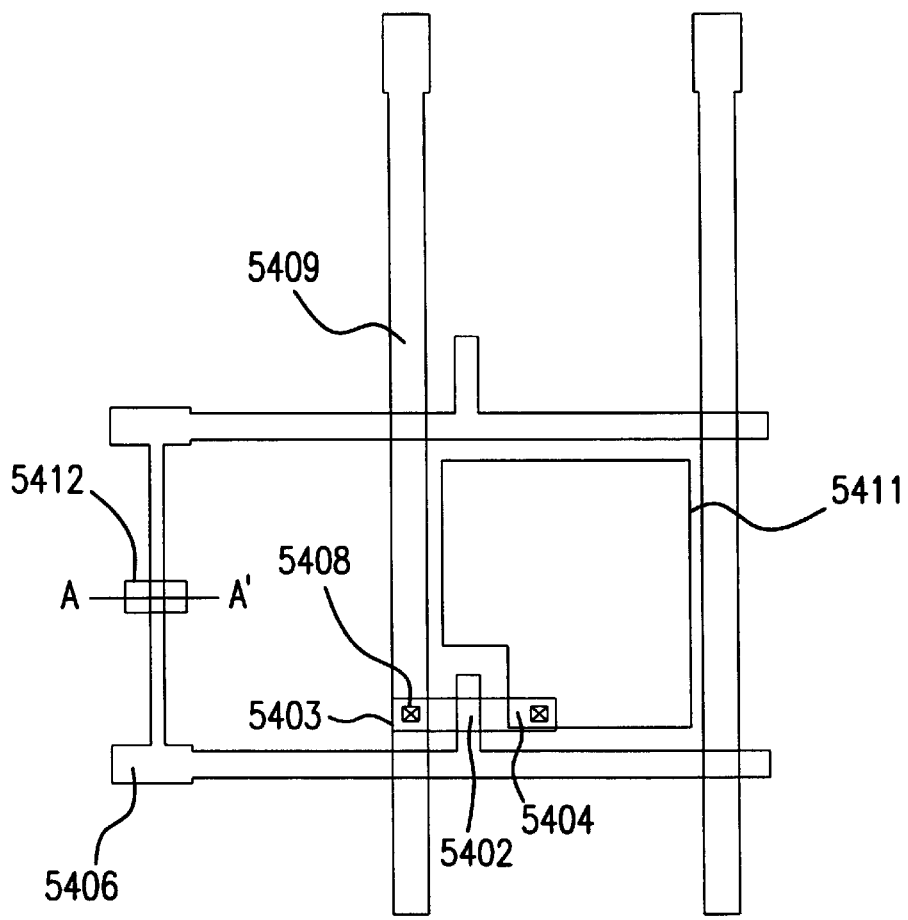
FIGS. 60a–60b are a plain view and process cross-sectional view showing the manufacturing method of the forty-sixth embodiment of the present invention.
Figure 60B:
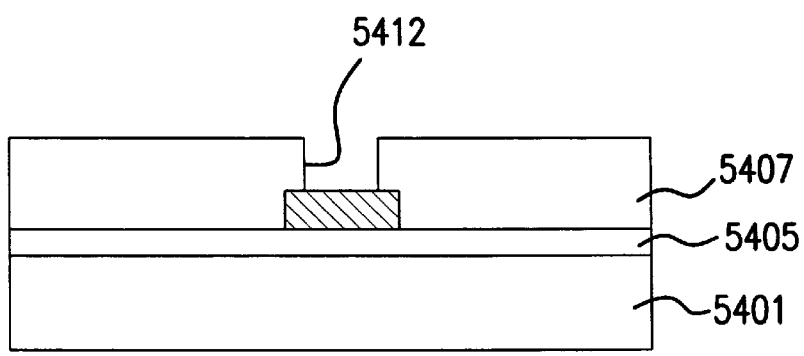
Figure 61A:
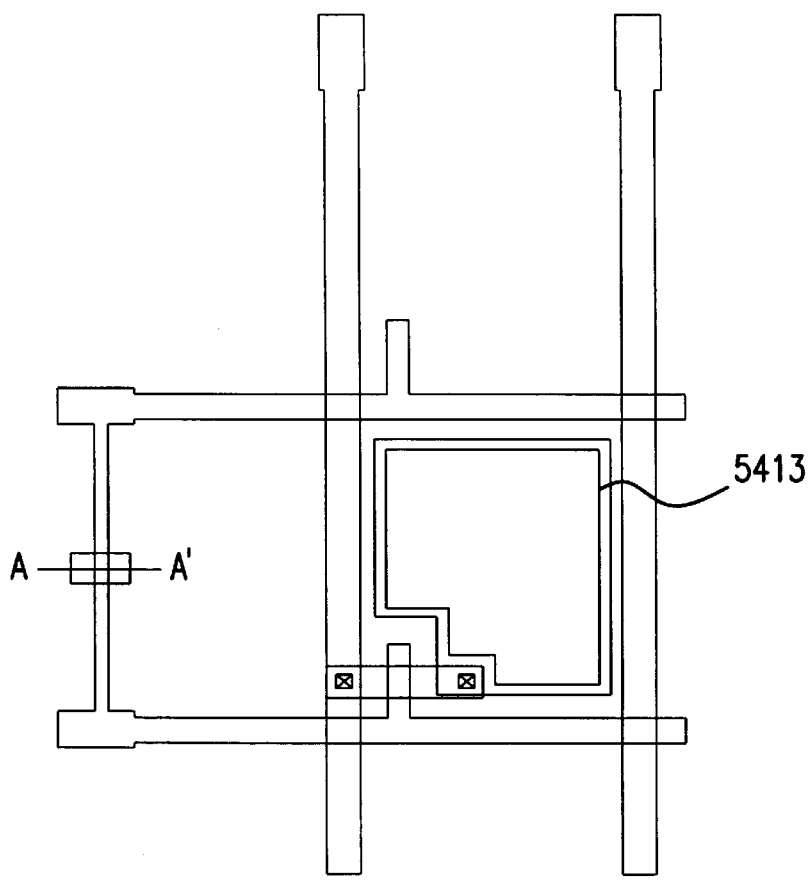
FIGS. 61a–61b are a plain view and process cross-sectional view showing the manufacturing method of the forty-sixth embodiment of the present invention.
Figure 61B:
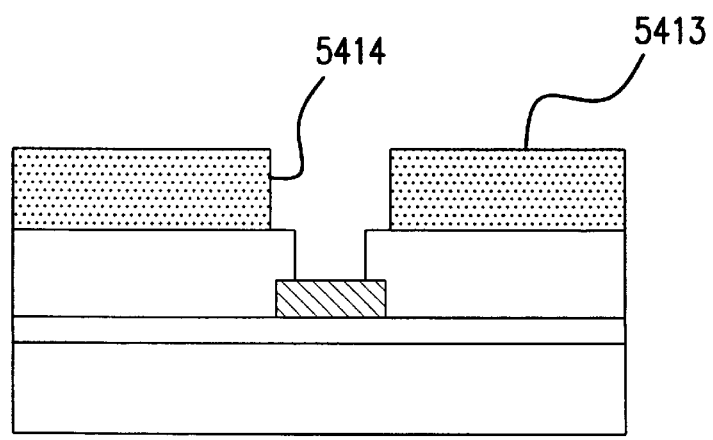
Figure 62A:
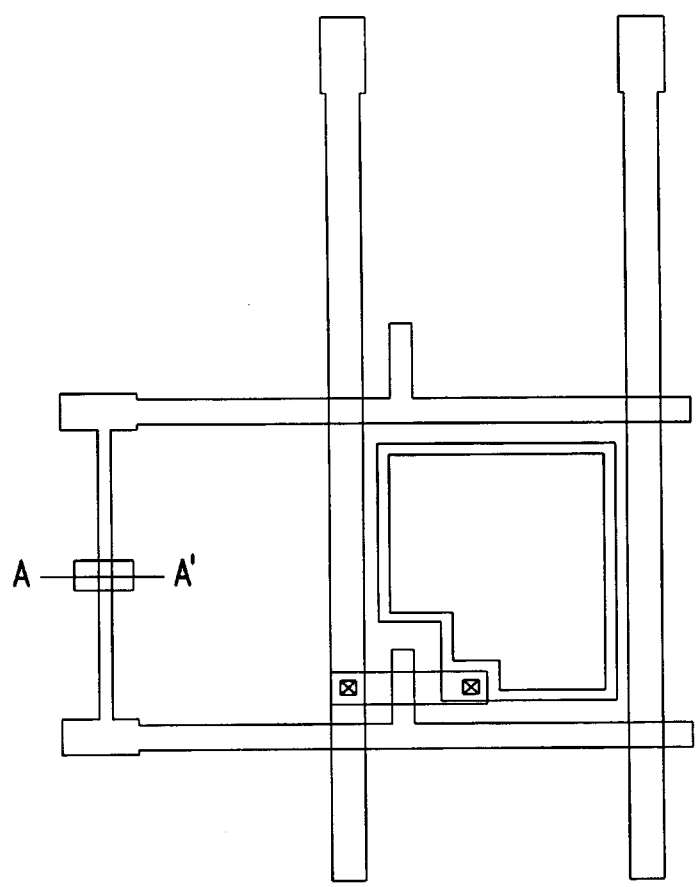
FIGS. 62a–62b are a plain view and process cross-sectional view showing the manufacturing method of the forty-sixth embodiment of the present invention.
Figure 62B:
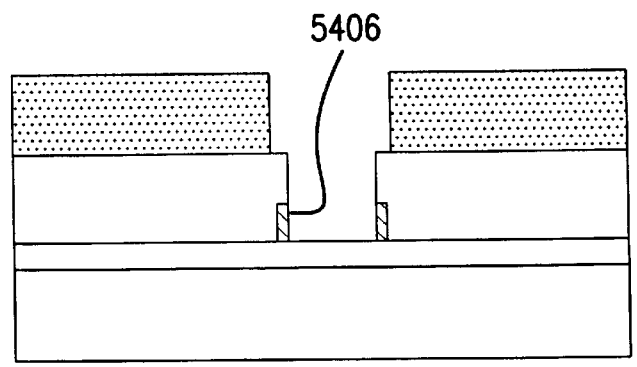

The forty-sixth embodiment of the present invention is explained in detail using FIGS. 60, 61, and 62. The forty-sixth embodiment is a manufacturing method of an active matrix liquid crystal display device including anti-static wiring partially exposed in advance when opening a contact hole for connecting a source line or pixel electrode, then separating the anti-static wiring using the pattern of the black matrix provided on the pixel electrode as a mask. FIGS. 60, 61, and 62 are plain views and process cross-sectional views in the A–A' section of the plain views showing one example of the forty-sixth embodiment.

A thin film transistor 5410 is provided over the inner side of thin film transistor substrate 5401. The thin film transistor 5410 comprises a channel region 5402, source region 5403, drain region 5404, gate insulation film 5405, gate line 5406, interlevel insulator film 5407, contact hole 5408, and source line 5409, and the like, and a pixel electrode 5411 driven by the thin film transistor, and having a transparent conductive film arranged in a stripe, mosaic, triangle or like pattern. Here, gate lines 5406 are mutually shorted at the initial stage in order to prevent damage due to static electricity. Also, when opening said contact hole 5408, a contact hole 5412 is also opened in a part having shorted gate lines, and a part of the gate lines is exposed. (Refer to FIG. 60)

Next, a black matrix 5413 is formed in a shape that blocks the light in the gap between the pixel electrodes 5411. At this time, a window 5414 is opened in the section having gate lines 5406 shorted. (Refer to FIG. 61) Then, gate lines 5406 are separated using the pattern of black matrix 5413 as a mask. (Refer to FIG. 62)

In the present invention, a portion of the anti-static wiring formed with gate lines, and the like, is also exposed when opening a contact hole, and a window is further opened in this portion when forming the pattern of black matrix that is separated using the window as a mask. An interlevel insulator film is generally formed with the gate lines over anti-static wiring and the like. Consequently, a part of the anti-static wiring should first be partially exposed when opening contact holes so that it can be separated without undue trouble. Anti-static wiring is generally provided outside the display area.

Meanwhile, a black matrix is provided for blocking light in the perimeter of the pixel electrodes. Consequently, even when the pattern of a black matrix is formed for the purpose of separating the anti-static wiring, it does not cause a bad influence in the display properties. Thus, it is possible to reduce the number of processes and the cost.

Embodiment 47

Figure 63A:
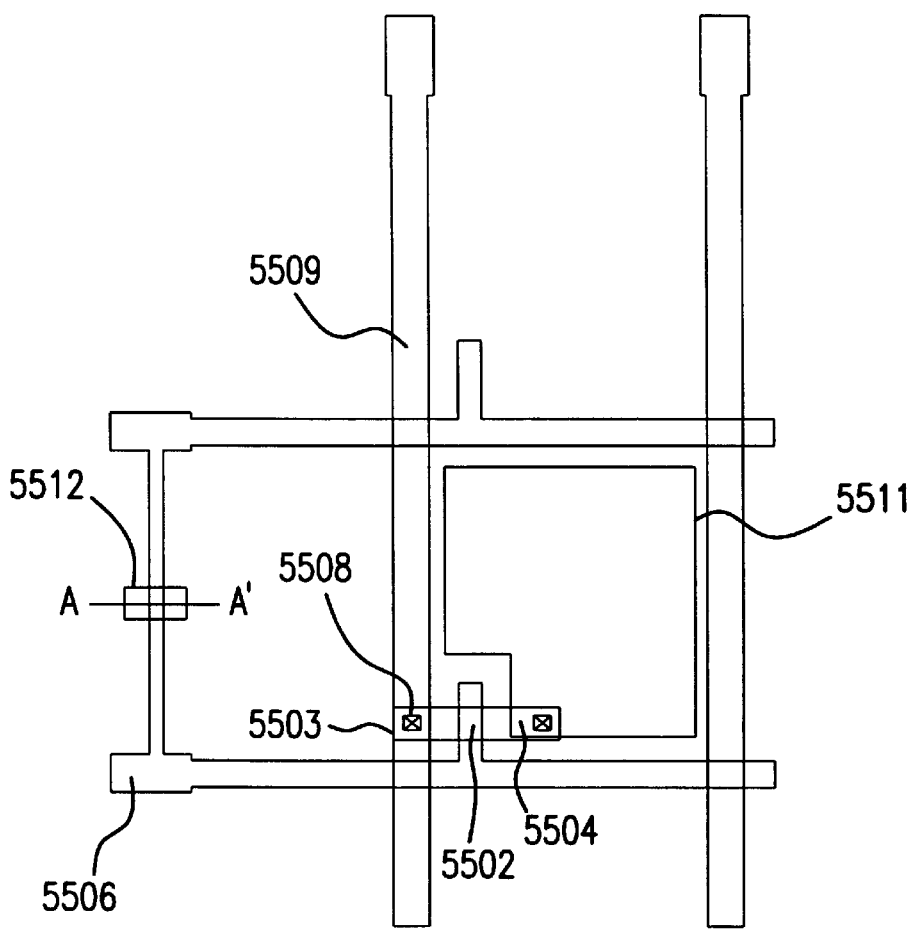
FIGS. 63a–63b are a plain view and process cross-sectional view showing the manufacturing method of the forty-seventh embodiment of the present invention.
Figure 63B:
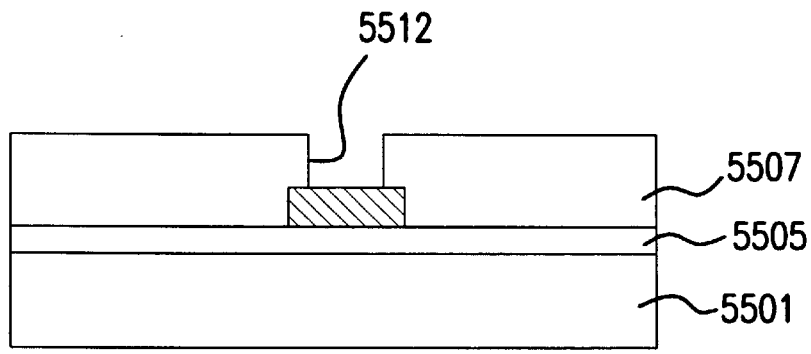
Figure 64A:
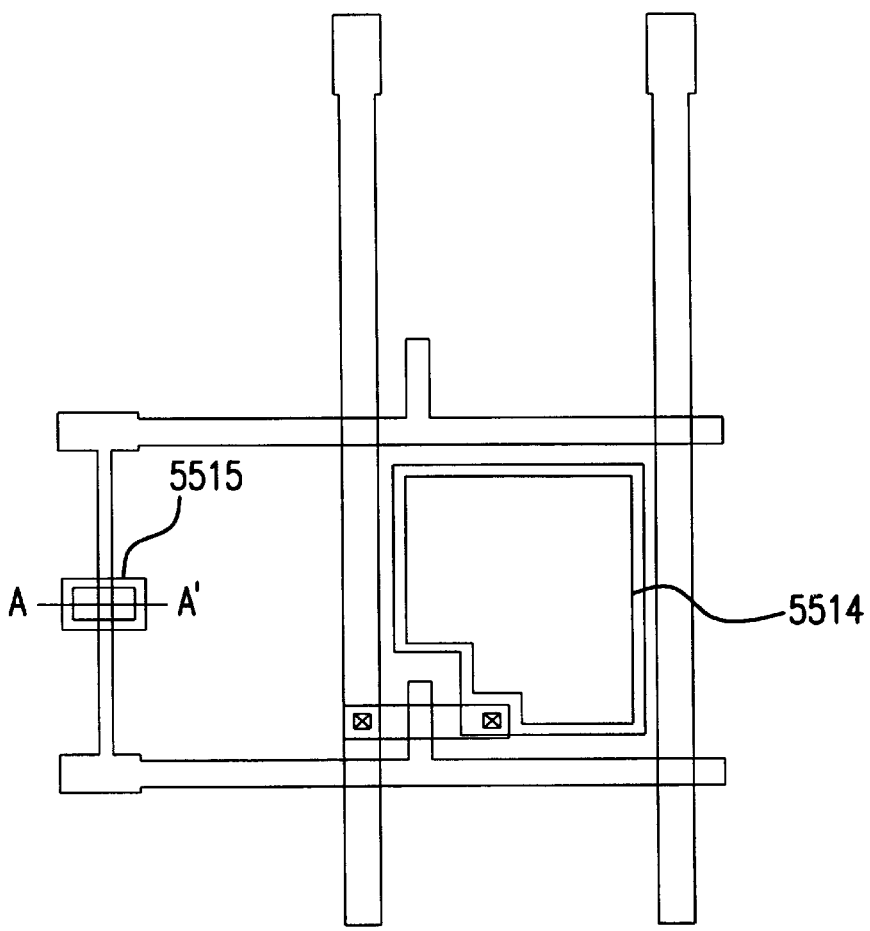
FIGS. 64a–64b are a plain view and process cross-sectional view showing the manufacturing method of the forty-seventh embodiment of the present invention.
Figure 64B:
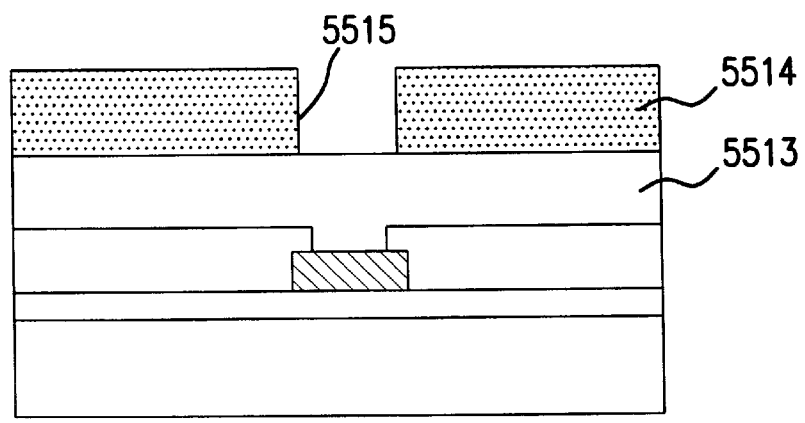
Figure 65A:
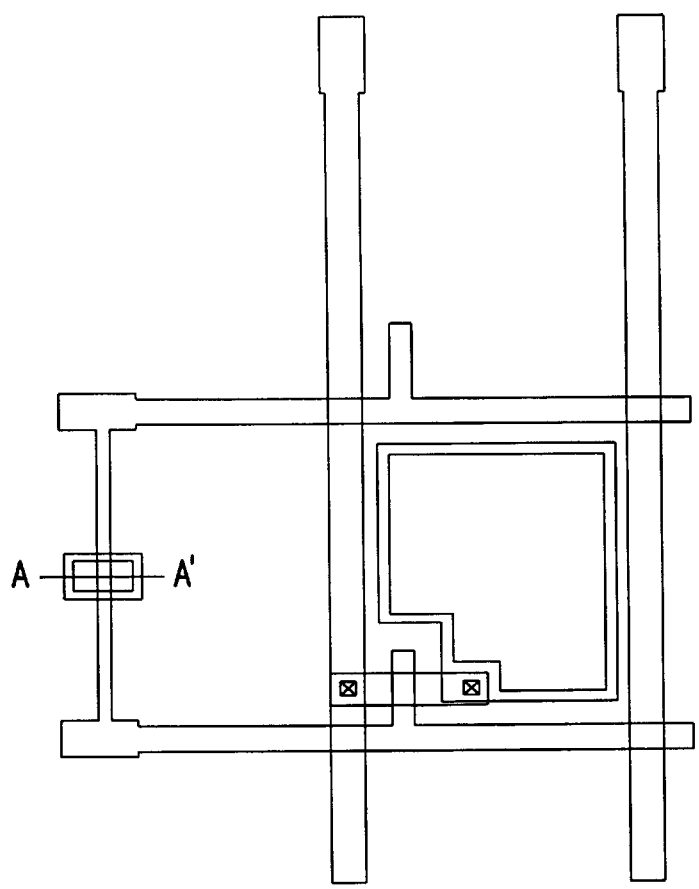
FIGS. 65a–65b are a plain view and process cross-sectional view showing the manufacturing method of the forty-seventh embodiment of the present invention.
Figure 65B:
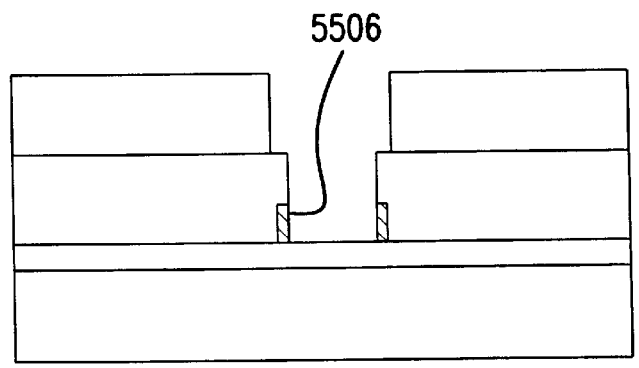

The forty-seventh embodiment of the present invention is explained in detail using FIGS. 63, 64, and 65. The forty-seventh embodiment is a manufacturing method of an active matrix liquid crystal display device including anti-static wiring partially exposed in advance when opening a contact hole for connecting a source line or pixel electrode. The anti-static wiring is separated using the pattern of a protective film provided on the pixel electrode as a mask. FIGS. 63, 64, and 65 are plain views and process cross-sectional views in the A–A' section of the plain views showing one example of the forty-seventh embodiment.

A thin film transistor is provided over the inner side of thin film transistor substrate 5501. The thin film transistor comprises a channel region 5502, source region 5503, drain region 5504, gate insulation film 5505, gate line 5506, interlevel insulator film 5507, contact hole 5508, and source line 5509, and the like, and a pixel electrode 5511 driven by the thin film transistor, and having a transparent conductive film arranged in a stripe, mosaic, triangle or like pattern. Here, gate lines 5506 are mutually shorted at the initial stage in order to prevent damage due to static electricity. When opening said contact hole 5508, a contact hole 5512 is also opened in the part having the gate lines shorted, and a part of the gate lines is exposed. (Refer to FIG. 63)

Next, an insulation film 5513 is formed over source lines 5509 as a protective film. A resist pattern 5514 is further formed over the insulation film using photolithography technology, and the like. At this time, a window 5515 is opened in the section having gate lines 5506 shorted. (Refer to FIG. 64)

Next, the insulation film 5513 over pixel electrodes 5511 is removed, using resist pattern 5514 as a mask. Accordingly, source lines 5509 can be protected, and reductions in the voltage applied to the liquid crystal due to the existence of this insulation film can be prevented. At this time, insulation film 5513 of the window 5515 part is also removed and gate lines 5506 are exposed. Next, gate lines 5506 are separated using window 5515 as a mask. (Refer to FIG. 65)

In the present invention, a portion of the anti-static wiring formed with gate lines, and the like, is also exposed when opening a contact hole, and a window is further opened in this portion when forming the pattern for removing the protective film, and it is separated using the window as a mask.

An interlevel insulator film is generally formed on anti-static wiring formed with the gate lines, and the like. Consequently, a part of the anti-static wiring should first be partially exposed when opening contact holes so that it can be separated without undue trouble. Anti-static wiring is generally provided outside the display area. Meanwhile, the pattern of the protective film is for opening a window on the pixel electrodes. Consequently, even when the pattern of the protective film is formed for the purpose of separating the anti-static wiring, it does not cause a bad influence in the display properties. Thus, by the present invention, it is possible to reduce the number of processes and the cost.

Embodiment 48

Figure 66A:
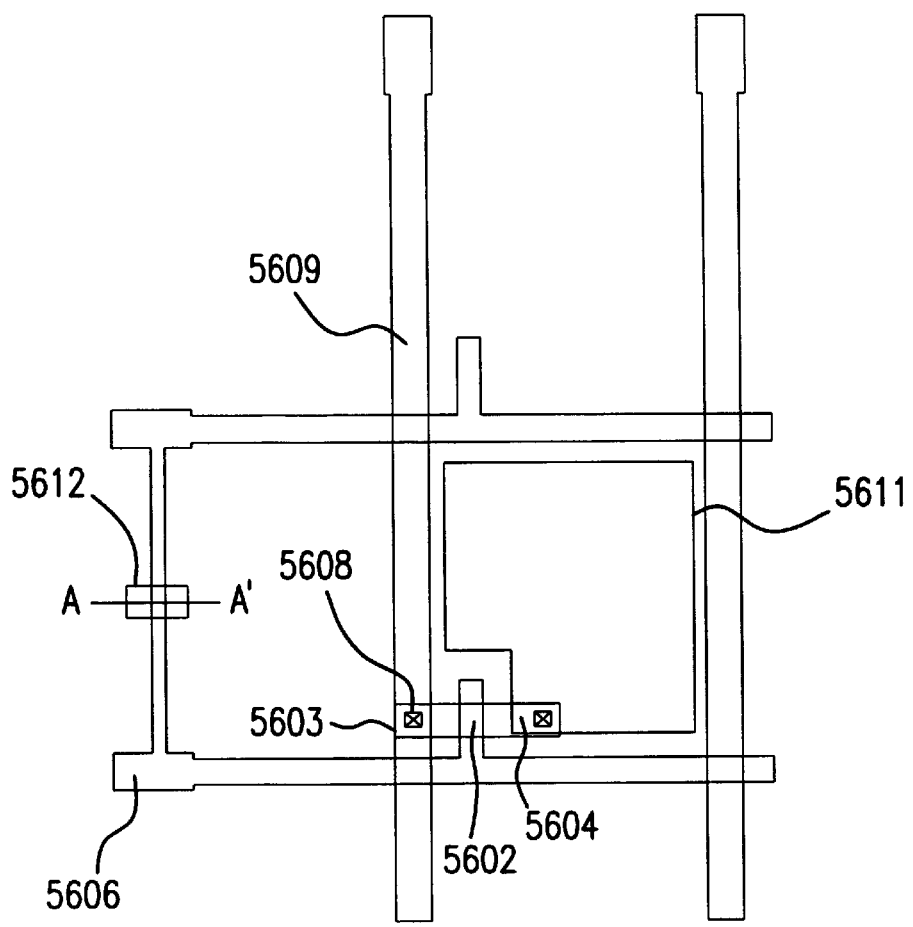
FIGS. 66a–66b are a plain view and process cross-sectional view showing the manufacturing method of the forty-eighth embodiment of the present invention.
Figure 66B:
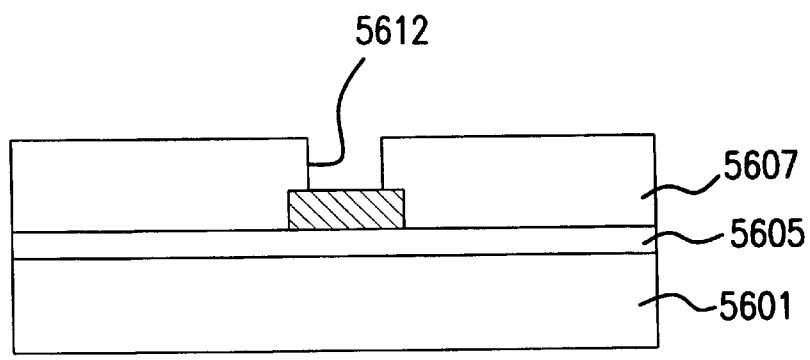
Figure 67A:
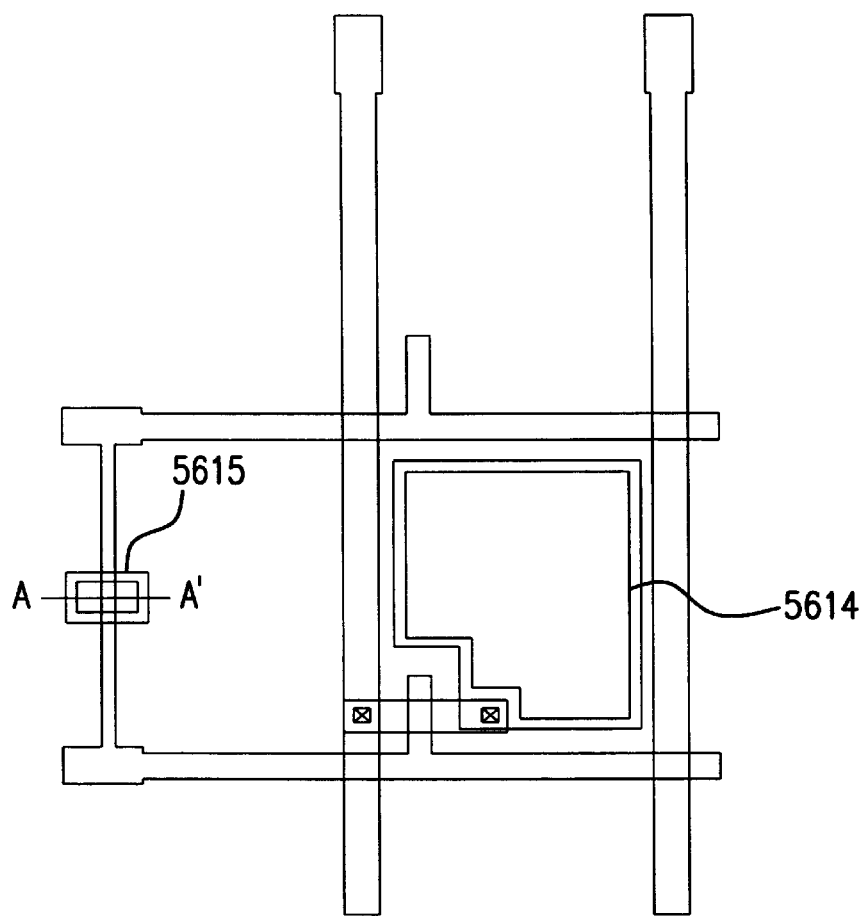
FIGS. 67a–67b are a plain view and process cross-sectional view showing the manufacturing method of the forty-eighth embodiment of the present invention.
Figure 67B:
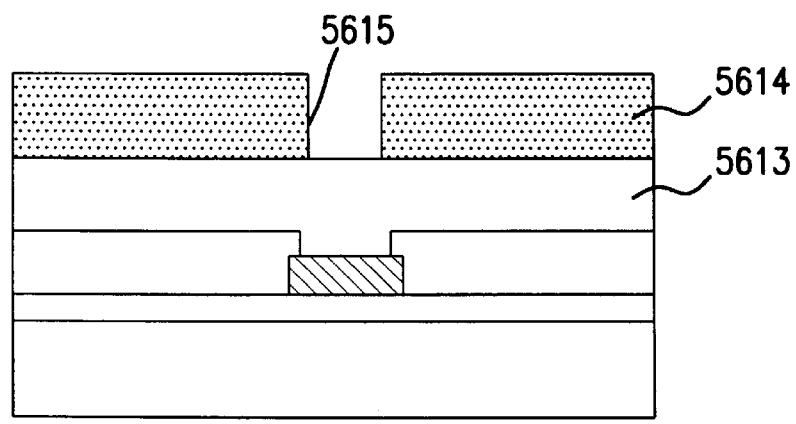
Figure 68A:
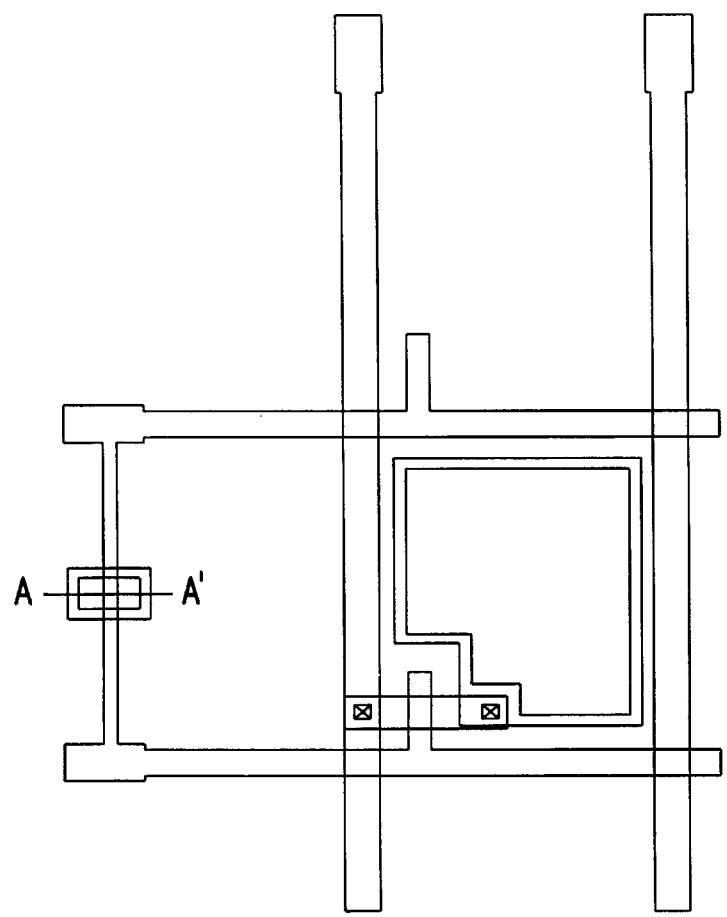
FIGS. 68a–68b are a plain view and process cross-sectional view showing the manufacturing method of the forty-eighth embodiment of the present invention.
Figure 68B:
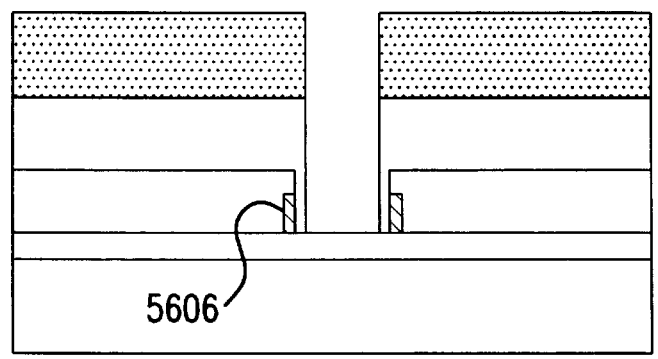

The forty-eighth embodiment of the present invention is explained in detail using FIGS. 66, 67, and 68. The forty-eighth embodiment is a manufacturing method of an active matrix liquid crystal display device including anti-static wiring partially exposed in advance when opening a contact hole for connecting a source line or pixel electrode. A protective film layer is then provided over the pixel electrodes, a black matrix is provided on the protective film layer, etched to be self-aligning in relation to the pattern of the black matrix. Furthermore, anti-static wiring formed on the lower part of the protective film layer is separated using the pattern as a mask. FIGS. 66, 67, and 68 are plain views and process cross-sectional views in the A–A' section of the plain views showing one example of the forty-eighth embodiment.

A thin film transistor is provided over the inner side of thin film transistor substrate 5601. The thin film transistor comprises a channel region 5602, source region 5603, drain region 5604, gate insulation film 5605, gate line 5606, interlevel insulator film 5607, contact hole 5608, and source line 5609, and the like, and a pixel electrode 5611 driven by the thin film transistor, and having a transparent conductive film arranged in a stripe, mosaic, triangle or like pattern. Here, gate lines 5606 are mutually shorted at the initial stage to prevent damage due to static electricity. Also, when opening said contact hole 5608, a contact hole 5612 is opened in the part of the thin film transistors having the gate lines shorted. Thus, a part of the gate lines is exposed. (Refer to FIG. 66)

Next, over source lines 5609 is formed an insulation film 5613 as a protective film. Over protective film 5613 is formed a black matrix 5614 in a pattern that blocks the light in the gap between pixel electrodes 5611. At this time, a window 5615 is opened in the section having gate lines 5606 shorted. (Refer to FIG. 67)

Next, said protective film 5613 is etched, for example, by RIE using CHF3 gas, and the like, to be self-aligning in relation to the pattern of black matrix 5614. Thus, source line 5609 can be protected, and reductions in the voltage applied to the liquid crystal due to the existence of this insulation film can be prevented. At this time, insulation film 5613 of the window 5615 part is also removed, and gate lines 5606 are exposed.

Next, gate lines 5606 are separated using window 5615 as a mask. (Refer to FIG. 68)

In the present invention, a portion of the anti-static wiring formed with gate lines, and the like, is exposed in advance when opening a contact hole. In addition, a window is opened in this portion when forming the pattern of black matrix, protective film is etched using this black matrix as a mask, and then the shorted portion is separated. An interlevel insulator film is generally formed over anti-static wiring formed with the gate lines, and the like. Consequently, a part of the anti-static wiring should first be partially exposed when opening contact holes so that it can be separated without undue trouble. Also, anti-static wiring is generally provided outside the display area.

The patterns of a black matrix and a protective film are formed for blocking the light in the perimeter of the pixel electrodes and for opening a window on the pixel electrodes. Consequently, even when the pattern of a black matrix is formed for the purpose of separating the anti-static wiring, it does not cause a bad influence in the display properties. By this, it is possible to reduce the number of processes and the cost.

Embodiments of the present invention were explained above, but whether the thin film transistors used in them are monocrystalline thin film transistors, or whether they are non-crystalline thin film transistors, the main principle of the present invention is maintained. Furthermore, whether they are amorphous silicon thin film transistors among the non-crystalline thin film transistors, or whether they are polycrystalline thin film transistors, the main principle of the present invention is maintained.

The thin film transistors in the present embodiment have a coplanar structure, but even when the structure is, for example, a staggered structure or a reverse-staggered structure, the main principle of the present invention is maintained.

Also, even if the thin film transistors are polycrystalline thin film transistors formed by a process at or below about 600° C., the main principle of the present invention is maintained.

Furthermore, even if the thin film transistors are polycrystalline silicon thin film transistors formed by a process at or below 450° C., the main principle of the present invention is maintained.

An electronic apparatus having a liquid crystal display device of the embodiments described above includes a display information output source 6000, a display information processing circuit 6002, a display drive circuit 6004, a display panel 6006 such as a liquid crystal panel, or the like, a clock generation circuit 6008, and a power supply circuit 6010. Display information output source 6000 includes memory such as ROM and RAM, and the like, and a synchronizing circuit, and the like, that synchronizes and outputs television signals, and outputs display information such as video signals, and the like, based on clock pulses from clock generation circuit 6008. Display information processing circuit 6002 outputs display information processed based on clock pulses from clock generation circuit 6008. This display information processing circuit 6002 can include such circuits as, for example, an amplifier/polarity-reversing circuit, a phase extension circuit, a rotation circuit, a gamma correction circuit, or a graph circuit. Drive circuit 6004 includes a scan side drive circuit and a data side drive circuit, and it drives the display of liquid crystal panel 6006. Power supply circuit 6010 supplies electrical power to each of the above circuits.

Figure 70:
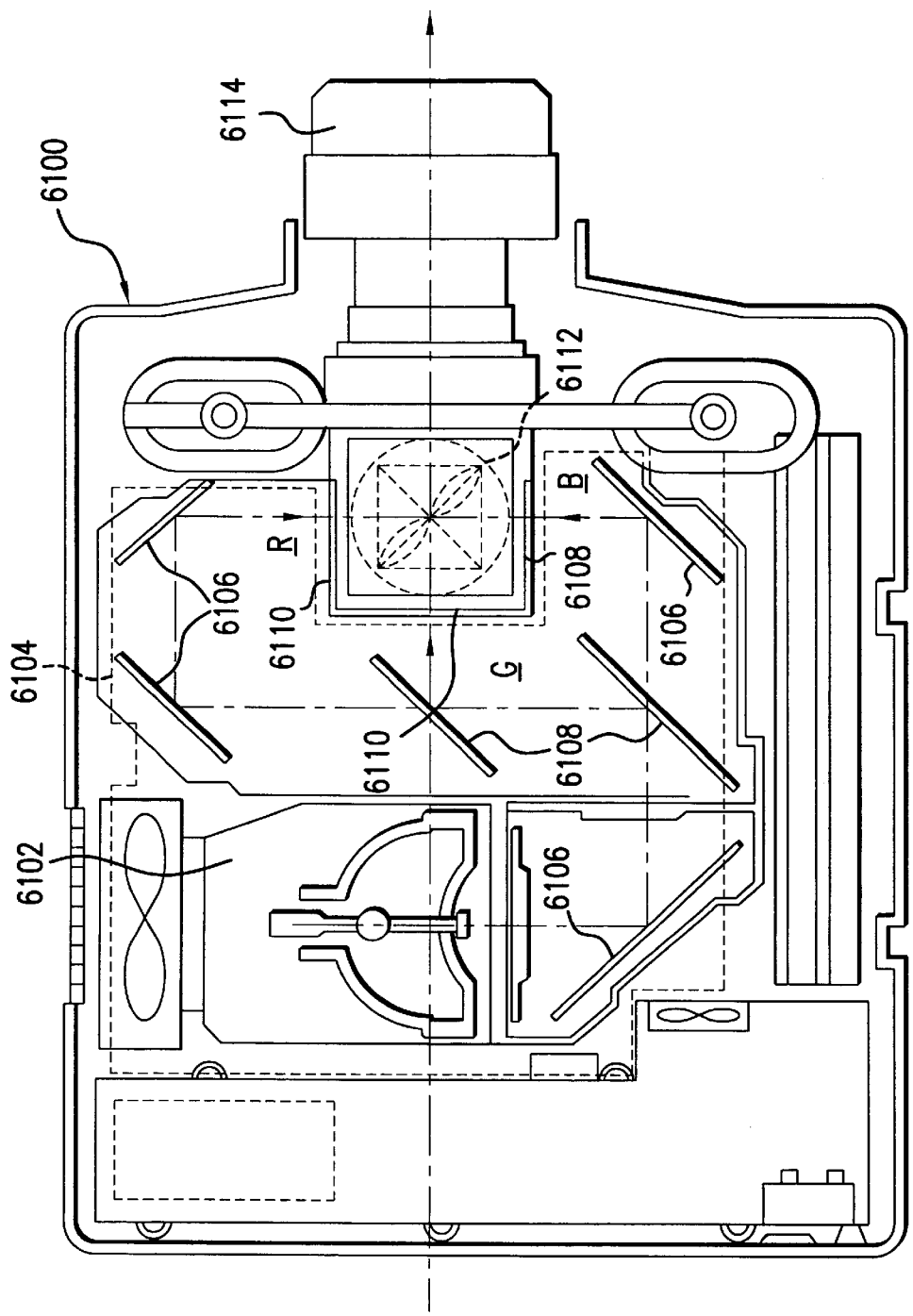
FIG. 70 shows a structural example of a liquid crystal projector using the present invention.
Figure 71:
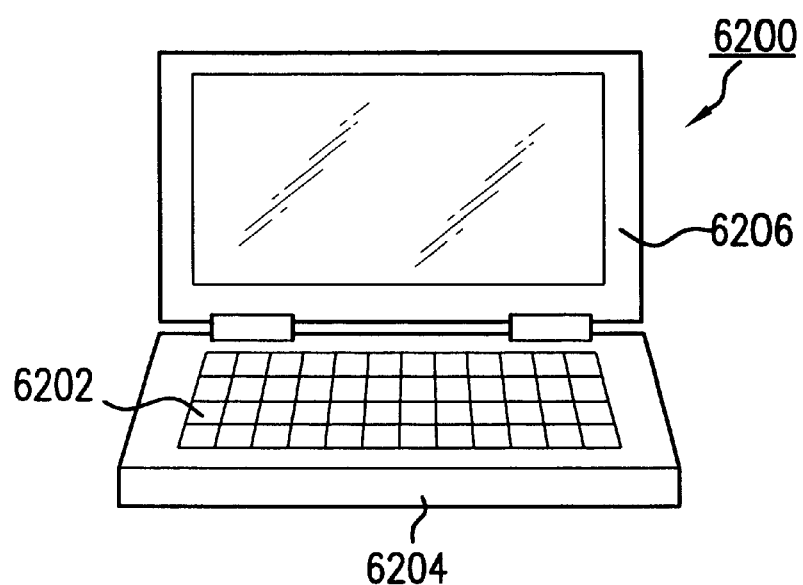
FIG. 71 shows a structural example of a personal computer using the present invention.
Figure 72:
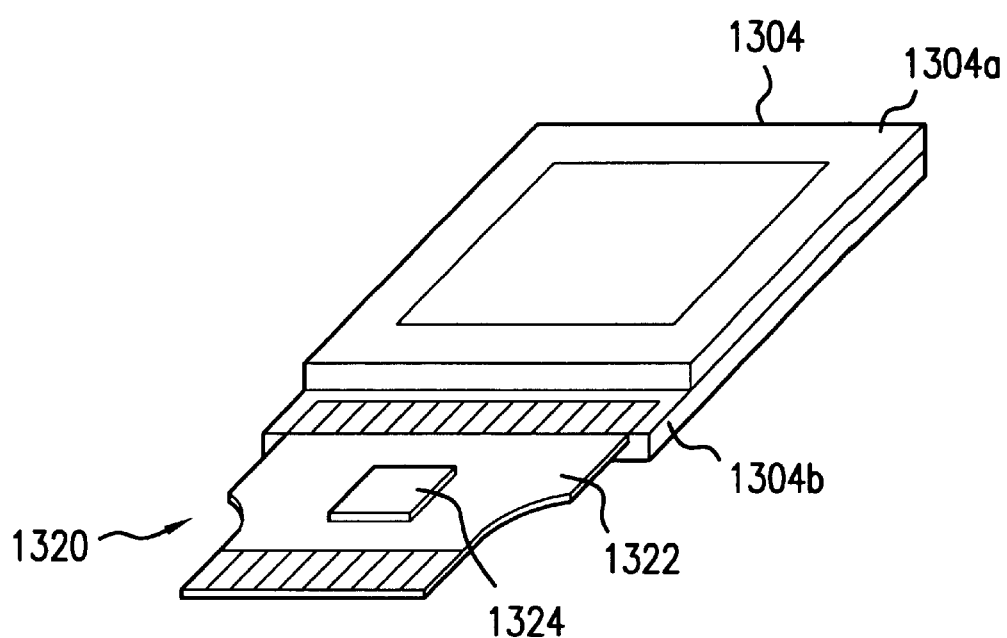
FIG. 72 shows a structural example of a pager using the present invention.

Examples of an electronic apparatus include the liquid crystal projector shown in FIG. 70, the multimedia personal computer (PC) and engineering workstation (EWS) shown in FIG. 71, the pager shown in FIG. 72, or a portable telephone, a word processor, a television, a viewfinder-type or direct sight-type video tape recorder, an electronic notebook, an electronic desktop computer, a car navigation apparatus, a POS terminal, or an apparatus having a touch panel.

The projector shown in FIG. 70 is a projection-type projector using a transmissive-type liquid crystal panel as a light valve. It has an optical system such as, for example, one using a three-prism method. In projector 6100 in FIG. 70, the projected light having emerged from white light source lamp unit 6102 is separated into the three primary colors, red, green, and blue (RGB) by a plurality of mirrors 6106 and two dichroic mirrors 6108 inside light guide 6104. The light is led to three active matrix liquid crystal panels 6110R, 6110G, and 6110B for displaying images of the various colors. Also, the light modulated by the various liquid crystal panels 6110R, 6110G, and 6110B is introduced from three directions into a dichroic prism 6112. In dichroic prism 6112, the red R and blue B light is bent 90°, the green G light proceeds directly, the images of each color are composed, and the color image is projected onto a screen, or the like, passing through a projection lens 6114.

The personal computer 6200 shown in FIG. 71 has a main body 6204 equipped with a keyboard 6202, and a liquid crystal display screen 6206.

The pager 6300 shown in FIG. 72 has inside a metallic frame 6302 a liquid crystal display substrate 6304, a light guide 6306 equipped with a backlight 6306a, a circuit board 6308, a first and second shielding plate 6310 and 6312, two flexible conductive members 6314 and 6316, and a film carrier tape 6318. The two flexible conductive members 6314 and 6316, and film carrier tape 6318 connect liquid crystal display substrate 6304 with circuit board 6308.

Figure 69:
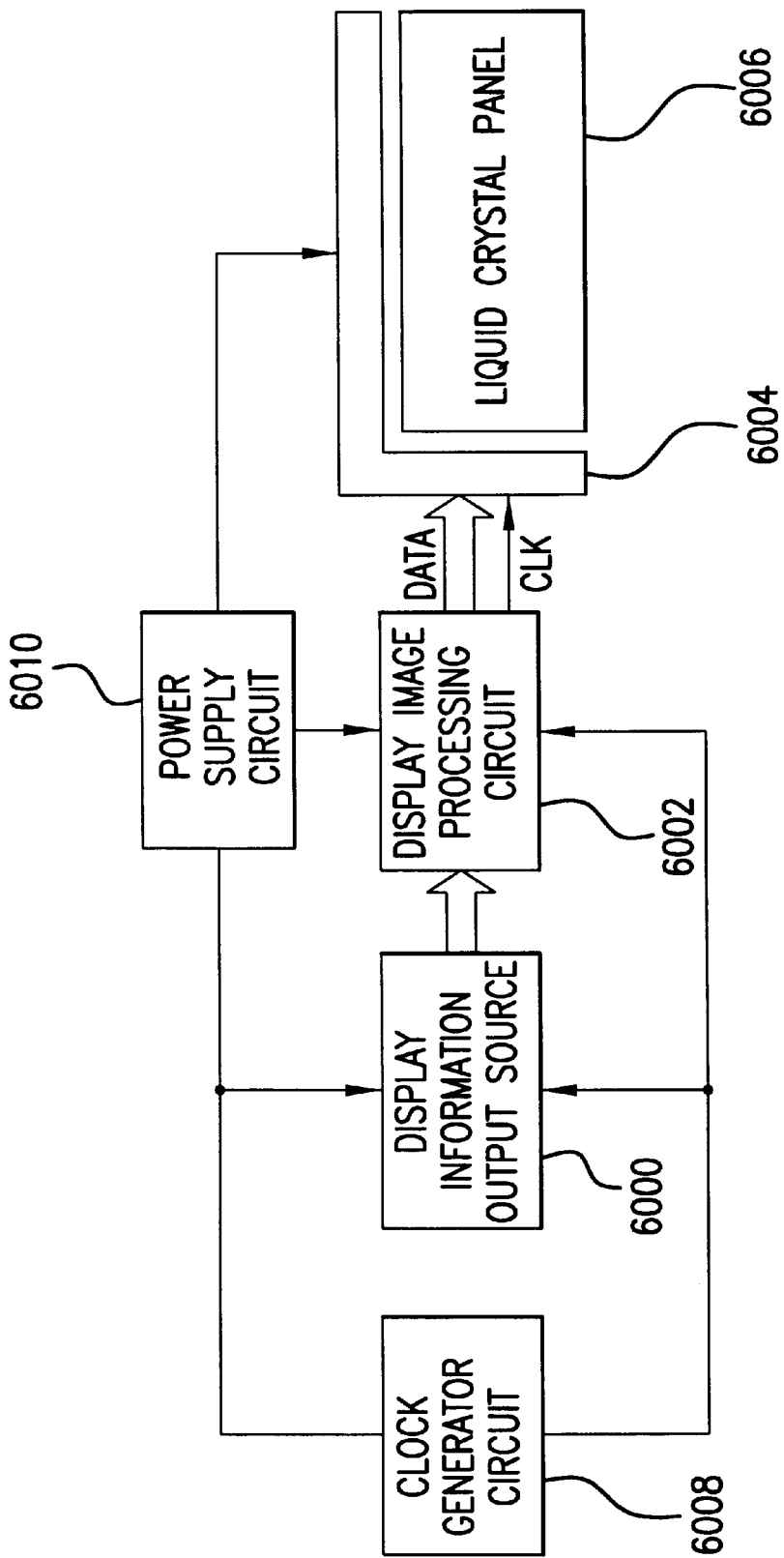
FIG. 69 is a structural view of an electronic apparatus constructed using a liquid crystal device of the present invention.

Here, liquid crystal display substrate 6304 has liquid crystal enclosed between two transparent substrates 6304a and 6304b, and at least a dot matrix-type liquid crystal display panel using this configuration. The drive circuit 6004 shown in FIG. 69 or a display information processing circuit 6002, can be formed, for example, over one of the transparent substrates. The circuits not mounted on liquid crystal display substrate 6304 can be circuits externally attached to the liquid crystal display substrate, and in the case of FIG. 73, they can be mounted on circuit board 6308.

Because FIG. 72 shows the configuration of a pager, a circuit board 6308 is required in addition to liquid crystal substrate 6304. However, when the liquid crystal display device is used as a component for an electronic apparatus and a display drive circuit is mounted on a transparent substrate, then, at a minimum, the liquid crystal display device would include the liquid crystal display substrate 6304. In another case, a liquid crystal display substrate 6304 is fixed to a metallic frame 6302 as a housing can be used as a liquid crystal display device, as a component for electronic equipment. Furthermore, in the case of a backlight-type device, the liquid crystal display device can be configured by assembling liquid crystal display substrate 6304 and light guide 6306 equipped with backlight 6306a inside metallic frame 6302.

Figure 73:
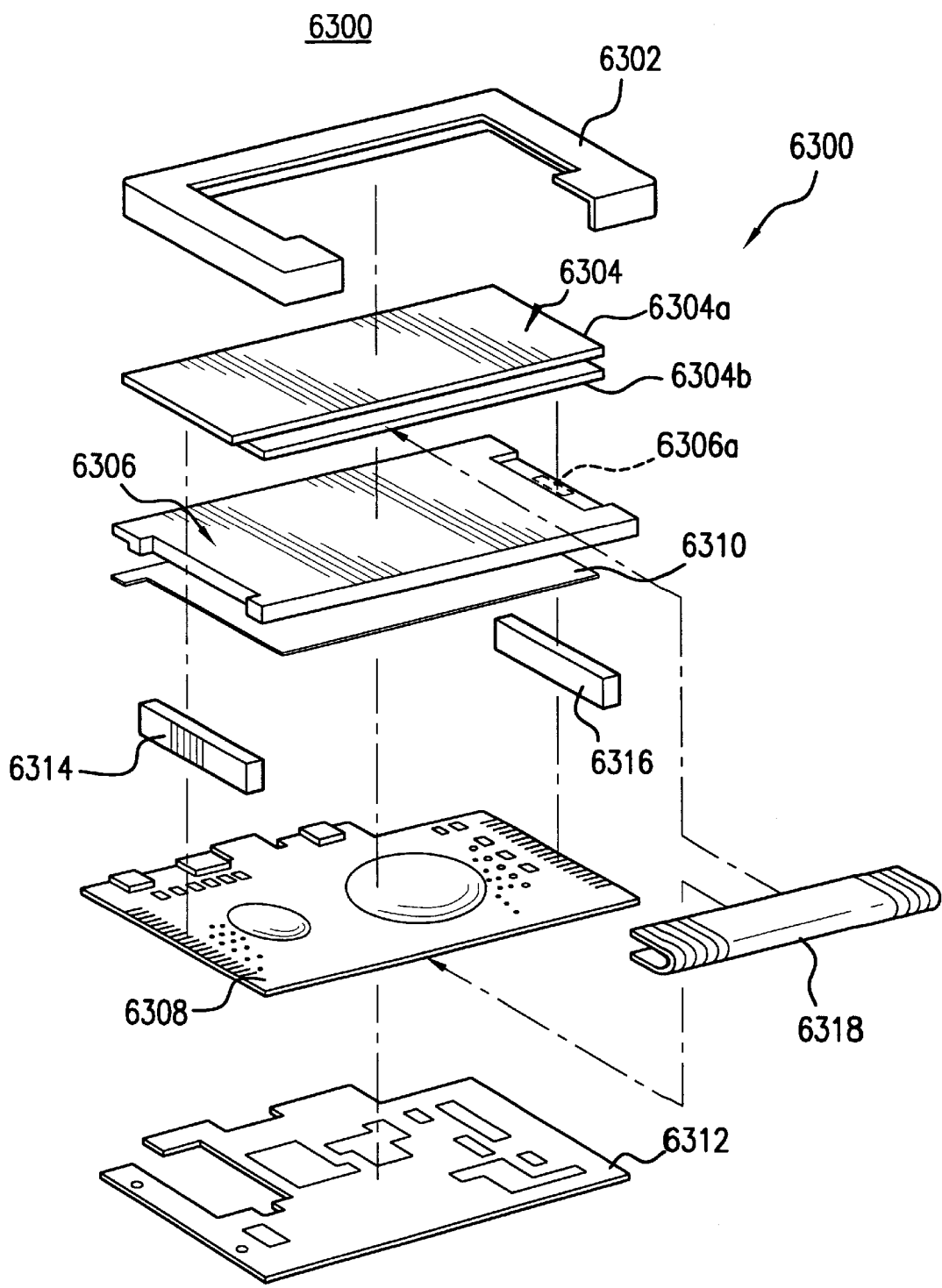
FIG. 73 shows a liquid crystal display device being one part of an electronic apparatus having TCP connected using the present invention.

As shown in FIG. 73, by connecting a TCP (Tape Carrier Package) 6320 having an IC chip 6324 mounted on a polyimide tape 6322 formed of a metallic conductive film. The TCP is connected to one of the two transparent substrates 6304a and 6304b having liquid crystal display substrate 6304. Thus, it can be used as a liquid crystal display device as one component for an electronic apparatus.

The present invention is not limited to the Embodiments described above, and various modified embodiments are within the scope of the substance of the present invention. For example, the present invention is not limited to being applied to the driving of the various liquid crystal panels described above, and it can be applied also to electroluminescence and plasma display devices.

What is claimed is:

1. A liquid crystal device, comprising:
   a liquid crystal layer;
   a thin film transistor substrate;
   a first light-blocking layer that is above the thin film transistor substrate; and
   a second light-blocking layer that is above the first light-blocking layer,
   at least a portion of the second light-blocking layer overlaying a portion of the first light-blocking layer in a direction perpendicular to the surface of the substrate.

2. The liquid crystal device according to claim 1, the first light-blocking layer being disposed below at least a part of the liquid crystal layer.

3. The liquid crystal device according to claim 1, further comprising an insulation film that is above the first light-blocking layer and below the second light-blocking layer.

4. The liquid crystal device according to claim 1, further comprising a thin film transistor disposed above the thin film transistor substrate and an interlevel insulator film that is above the thin film transistor and below the first light-blocking layer.

5. The liquid crystal device according to claim 4, further comprising a pixel electrode, the interlevel insulator film defining a contact hole so that the thin film transistor electrically connects with the pixel electrode via the contact hole.

6. An electronic apparatus, comprising:
the liquid crystal device according to claim 1.

7. A liquid crystal projector, comprising:
the liquid crystal device according to claim 1.

8. A personal computer, comprising:
the liquid crystal device according to claim 1.

9. An electroluminescence device, comprising:
a thin film transistor substrate where a thin film transistor is arranged;
a pixel electrode which is driven by the thin film transistor;
a first light-blocking layer that is above the thin film transistor substrate; and
a second light-blocking layer that is above the first light-blocking layer,
at least a portion of the second light-blocking layer overlaying a portion of the first light-blocking layer in a direction perpendicular to the surface of the substrate.

10. The electroluminescence device according to claim 9, further comprising an insulation film that is above the first light-blocking layer and below the second light-blocking layer.

11. The electroluminescence device according the claim 9, further comprising an interlevel insulator film that is above the thin film transistor and below the first light-blocking layer.

12. The electroluminescence device according the claim 11, the interlevel insulator film defining a contact hole so that the thin film transistor electrically connects with the pixel electrode via the contacts hole.

13. An electronic apparatus, comprising:

the electroluminescence device according to claim 9.

14. A projector, comprising:

the electroluminescence device according to claim 9.

15. A personal computer, comprising:

the electroluminescence device according to claim 9.

* * * * *